(12) United States Patent
Flynn et al.

(10) Patent No.: US 8,527,693 B2
(45) Date of Patent: Sep. 3, 2013

(54) APPARATUS, SYSTEM, AND METHOD FOR AUTO-COMMIT MEMORY

(75) Inventors: David Flynn, Sandy, UT (US); David Nellans, Salt Lake City, UT (US); John Strasser, Syracuse, UT (US); James G. Peterson, San Jose, CA (US); Robert Wipfel, Draper, UT (US)

(73) Assignee: Fusion IO, Inc., Salt Lake City, UT (US)

( * ) Notice: Subject to any disclaimer, the term of this patent is extended or adjusted under 35 U.S.C. 154(b) by 22 days.

(21) Appl. No.: 13/324,942

(22) Filed: Dec. 13, 2011

(65) Prior Publication Data
US 2012/0151118 A1 Jun. 14, 2012

Related U.S. Application Data

(60) Provisional application No. 61/422,635, filed on Dec. 13, 2010.

(51) Int. Cl.
*G06F 12/00* (2006.01)
(52) U.S. Cl.
USPC ............ 711/103; 711/104; 711/118; 711/173
(58) Field of Classification Search
None
See application file for complete search history.

(56) References Cited

U.S. PATENT DOCUMENTS

| | | |
|---|---|---|
| 4,980,861 A | 12/1990 | Herdt et al. |
| 5,193,184 A | 3/1993 | Belsan et al. |
| 5,261,068 A | 11/1993 | Gaskins et al. |
| 5,325,509 A | 6/1994 | Lautzenheiser |
| 5,404,485 A | 4/1995 | Ban |
| 5,438,671 A | 8/1995 | Miles |
| 5,504,882 A | 4/1996 | Chai et al. |
| 5,535,399 A | 7/1996 | Blitz et al. |
| 5,553,261 A | 9/1996 | Hasbun et al. |
| 5,594,883 A | 1/1997 | Pricer |
| 5,598,370 A | 1/1997 | Niijima et al. |
| 5,651,133 A | 7/1997 | Burkes et al. |
| 5,682,497 A | 10/1997 | Robinson |
| 5,682,499 A | 10/1997 | Bakke et al. |
| 5,701,434 A | 12/1997 | Nakagawa |
| 5,754,563 A | 5/1998 | White |
| 5,799,200 A | 8/1998 | Brant et al. |

(Continued)

FOREIGN PATENT DOCUMENTS

| | | |
|---|---|---|
| CN | 1771495 | 5/2006 |
| EP | 0747822 | 12/1996 |

(Continued)

OTHER PUBLICATIONS

U.S. Appl. No. 11/952,113, Office Action, Dec. 15, 2010.

(Continued)

*Primary Examiner* — Shawn X Gu
(74) *Attorney, Agent, or Firm* — Kunzler Law Group, PC

(57) ABSTRACT

An auto-commit memory is capable of implementing a pre-configured, triggered commit action in response to a failure condition, such as a loss of power, invalid shutdown, fault, or the like. A computing device may access the auto-commit memory using memory access semantics (using a memory mapping mechanism or the like), bypassing system calls typically required in virtual memory operations. Since the auto-commit memory is pre-configured to commit data stored thereon in the event of a failure, users of the auto-commit memory may view these memory semantic operations as being instantly committed. Operations to commit the data are taken out of the write-commit path.

20 Claims, 18 Drawing Sheets

(56) References Cited

U.S. PATENT DOCUMENTS

| | | |
|---|---|---|
| 5,802,602 A | 9/1998 | Rahman et al. |
| 5,812,457 A | 9/1998 | Arase |
| 5,845,329 A | 12/1998 | Onishi et al. |
| 5,960,462 A | 9/1999 | Solomon et al. |
| 6,000,019 A | 12/1999 | Dykstal et al. |
| 6,014,724 A | 1/2000 | Jenett |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,205,521 B1 | 3/2001 | Schumann |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,278,633 B1 | 8/2001 | Wong et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,515,928 B2 | 2/2003 | Sato et al. |
| 6,523,102 B1 | 2/2003 | Dye et al. |
| 6,552,955 B1 | 4/2003 | Miki |
| 6,564,285 B1 | 5/2003 | Mills et al. |
| 6,587,915 B1 | 7/2003 | Kim |
| 6,601,211 B1 | 7/2003 | Norman |
| 6,608,793 B2 | 8/2003 | Park et al. |
| 6,625,685 B1 | 9/2003 | Cho et al. |
| 6,629,112 B1 | 9/2003 | Shank et al. |
| 6,633,956 B1 | 10/2003 | Mitani |
| 6,655,758 B2 | 12/2003 | Pasotti et al. |
| 6,658,438 B1 | 12/2003 | Moore et al. |
| 6,671,757 B1 | 12/2003 | Cash et al. |
| 6,683,810 B2 | 1/2004 | Sakamoto |
| 6,715,027 B2 | 3/2004 | Kim et al. |
| 6,715,046 B1 | 3/2004 | Shoham et al. |
| 6,735,546 B2 | 5/2004 | Scheuerlein |
| 6,751,155 B2 | 6/2004 | Gorobets |
| 6,754,774 B2 | 6/2004 | Gruner et al. |
| 6,760,806 B2 | 7/2004 | Jeon |
| 6,775,185 B2 | 8/2004 | Fujisawa et al. |
| 6,779,088 B1 | 8/2004 | Benveniste et al. |
| 6,785,785 B2 | 8/2004 | Piccirillo et al. |
| 6,807,097 B2 | 10/2004 | Takano et al. |
| 6,845,053 B2 | 1/2005 | Chevallier |
| 6,849,480 B1 | 2/2005 | Low et al. |
| 6,877,076 B1 | 4/2005 | Cho et al. |
| 6,880,049 B2 | 4/2005 | Gruner et al. |
| 6,883,079 B1 | 4/2005 | Priborsky |
| 6,887,058 B2 | 5/2005 | Fujiwara |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo et al. |
| 7,010,652 B2 | 3/2006 | Piccirillo et al. |
| 7,010,662 B2 | 3/2006 | Aasheim et al. |
| 7,042,664 B2 | 5/2006 | Gill et al. |
| 7,043,599 B1 | 5/2006 | Ware et al. |
| 7,050,337 B2 | 5/2006 | Iwase et al. |
| 7,057,936 B2 | 6/2006 | Yaegashi et al. |
| 7,058,769 B1 | 6/2006 | Danilak |
| 7,064,994 B1 | 6/2006 | Wu |
| 7,076,599 B2 | 7/2006 | Aasheim et al. |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,167,944 B1 | 1/2007 | Estakhri |
| 7,167,953 B2 | 1/2007 | Megiddo et al. |
| 7,173,852 B2 | 2/2007 | Gorobets et al. |
| 7,177,197 B2 | 2/2007 | Cernea |
| 7,181,572 B2 | 2/2007 | Walmsley |
| 7,194,577 B2 | 3/2007 | Johnson et al. |
| 7,194,740 B1 | 3/2007 | Frank et al. |
| 7,215,580 B2 | 5/2007 | Gorobets |
| 7,219,238 B2 | 5/2007 | Saito et al. |
| 7,227,777 B2 | 6/2007 | Roohparvar |
| 7,243,203 B2 | 7/2007 | Scheuerlein |
| 7,246,179 B2 | 7/2007 | Camara et al. |
| 7,257,129 B2 | 8/2007 | Lee et al. |
| 7,263,591 B2 | 8/2007 | Estakhri et al. |
| 7,275,135 B2 | 9/2007 | Coulson |
| 7,305,520 B2 | 12/2007 | Voigt et al. |
| 7,328,307 B2 | 2/2008 | Hoogterp |
| 7,340,558 B2 | 3/2008 | Lee et al. |
| 7,340,566 B2 | 3/2008 | Voth et al. |
| 7,340,581 B2 | 3/2008 | Gorobets et al. |
| 7,395,384 B2 | 7/2008 | Sinclair et al. |
| 7,398,348 B2 | 7/2008 | Moore et al. |
| 7,424,593 B2 | 9/2008 | Estakhri et al. |
| 7,441,090 B2 | 10/2008 | Estakhri et al. |
| 7,450,420 B2 | 11/2008 | Sinclair et al. |
| 7,460,432 B2 | 12/2008 | Warner |
| 7,463,521 B2 | 12/2008 | Li |
| 7,464,240 B2 | 12/2008 | Caulkins et al. |
| 7,487,320 B2 | 2/2009 | Bansal et al. |
| 7,516,267 B2 | 4/2009 | Coulson et al. |
| 7,529,905 B2 | 5/2009 | Sinclair |
| 7,548,464 B2 | 6/2009 | Kim |
| 7,552,271 B2 | 6/2009 | Sinclair et al. |
| 7,599,967 B2 | 10/2009 | Girkar et al. |
| 7,603,532 B2 | 10/2009 | Rajan et al. |
| 7,610,348 B2 | 10/2009 | Kisley et al. |
| 7,644,239 B2 | 1/2010 | Ergan et al. |
| 7,725,628 B1 | 5/2010 | Phan et al. |
| 7,752,360 B2 | 7/2010 | Galles |
| 7,777,652 B2 | 8/2010 | Lee et al. |
| 7,818,525 B1 | 10/2010 | Frost et al. |
| 7,873,782 B2 | 1/2011 | Terry et al. |
| 7,898,867 B2 | 3/2011 | Hazama et al. |
| 7,903,468 B2 | 3/2011 | Litsyn et al. |
| 7,908,501 B2 | 3/2011 | Kim et al. |
| 7,944,762 B2 | 5/2011 | Gorobets |
| 7,978,541 B2 | 7/2011 | Sutardja |
| 8,001,334 B2 | 8/2011 | Lee |
| 8,055,922 B2 | 11/2011 | Brittain et al. |
| 2002/0066047 A1 | 5/2002 | Olarig et al. |
| 2002/0069318 A1 | 6/2002 | Chow et al. |
| 2002/0103819 A1 | 8/2002 | Duvillier et al. |
| 2002/0133743 A1 | 9/2002 | Oldfield et al. |
| 2002/0181134 A1 | 12/2002 | Bunker et al. |
| 2003/0028704 A1 | 2/2003 | Mukaida et al. |
| 2003/0061296 A1 | 3/2003 | Craddock et al. |
| 2003/0126475 A1 | 7/2003 | Bodas |
| 2003/0145230 A1 | 7/2003 | Chiu et al. |
| 2003/0163630 A1 | 8/2003 | Aasheim et al. |
| 2003/0163663 A1 | 8/2003 | Aasheim et al. |
| 2003/0198084 A1 | 10/2003 | Fujisawa et al. |
| 2004/0003002 A1 | 1/2004 | Adelmann |
| 2004/0148360 A1 | 7/2004 | Mehra et al. |
| 2004/0186946 A1 | 9/2004 | Lee |
| 2004/0225719 A1 | 11/2004 | Kisley et al. |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0141313 A1 | 6/2005 | Gorobets et al. |
| 2005/0144361 A1 | 6/2005 | Gonzalez et al. |
| 2005/0172099 A1 | 8/2005 | Lowe |
| 2005/0193166 A1 | 9/2005 | Johnson et al. |
| 2005/0240713 A1 | 10/2005 | Wu et al. |
| 2005/0246510 A1 | 11/2005 | Retnamma et al. |
| 2005/0246558 A1 | 11/2005 | Ku |
| 2005/0257017 A1 | 11/2005 | Yagi |
| 2005/0262150 A1 | 11/2005 | Krishnaswamy |
| 2005/0270927 A1 | 12/2005 | Hayashi |
| 2005/0273476 A1 | 12/2005 | Wertheimer et al. |

| | | |
|---|---|---|
| 2006/0004955 A1 | 1/2006 | Ware et al. |
| 2006/0020744 A1 | 1/2006 | Sinclair et al. |
| 2006/0059326 A1 | 3/2006 | Aasheim et al. |
| 2006/0064556 A1 | 3/2006 | Aasheim et al. |
| 2006/0075057 A1 | 4/2006 | Gildea et al. |
| 2006/0106990 A1 | 5/2006 | Benhase et al. |
| 2006/0136779 A1 | 6/2006 | Lee et al. |
| 2006/0149893 A1 | 7/2006 | Barfuss et al. |
| 2006/0149916 A1 | 7/2006 | Nase |
| 2006/0179263 A1 | 8/2006 | Song et al. |
| 2006/0184722 A1 | 8/2006 | Sinclair |
| 2006/0184736 A1 | 8/2006 | Benhase et al. |
| 2006/0190552 A1 | 8/2006 | Henze et al. |
| 2006/0230295 A1 | 10/2006 | Schumacher et al. |
| 2006/0248387 A1 | 11/2006 | Nicholson et al. |
| 2006/0265624 A1 | 11/2006 | Moshayedi et al. |
| 2006/0265636 A1 | 11/2006 | Hummler |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura et al. |
| 2007/0061508 A1 | 3/2007 | Zweighaft |
| 2007/0086260 A1 | 4/2007 | Sinclair |
| 2007/0088666 A1 | 4/2007 | Saito |
| 2007/0118713 A1 | 5/2007 | Guterman et al. |
| 2007/0143560 A1 | 6/2007 | Gorobets |
| 2007/0143566 A1 | 6/2007 | Gorobets |
| 2007/0147356 A1 | 6/2007 | Malas et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0208790 A1 | 9/2007 | Reuter et al. |
| 2007/0230253 A1 | 10/2007 | Kim |
| 2007/0233937 A1 | 10/2007 | Coulson et al. |
| 2007/0233938 A1 | 10/2007 | Cho et al. |
| 2007/0234021 A1 | 10/2007 | Ruberg et al. |
| 2007/0245094 A1 | 10/2007 | Lee et al. |
| 2007/0260608 A1 | 11/2007 | Hertzberg et al. |
| 2007/0260821 A1 | 11/2007 | Zeffer et al. |
| 2007/0266037 A1 | 11/2007 | Terry et al. |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052483 A1 | 2/2008 | Rangarajan et al. |
| 2008/0059820 A1 | 3/2008 | Vaden et al. |
| 2008/0080243 A1 | 4/2008 | Edahiro et al. |
| 2008/0104344 A1 | 5/2008 | Shimozono et al. |
| 2008/0117686 A1 | 5/2008 | Yamada |
| 2008/0126507 A1 | 5/2008 | Wilkinson |
| 2008/0126686 A1 | 5/2008 | Sokolov et al. |
| 2008/0140737 A1 | 6/2008 | Garst et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0266973 A1 | 10/2008 | Sekar et al. |
| 2008/0301475 A1 | 12/2008 | Felter et al. |
| 2009/0031098 A1 | 1/2009 | Sartore |
| 2009/0037778 A1 | 2/2009 | Resnick |
| 2009/0091979 A1 | 4/2009 | Shalvi |
| 2009/0091996 A1 | 4/2009 | Chen et al. |
| 2009/0106479 A1 | 4/2009 | Okin et al. |
| 2009/0125700 A1 | 5/2009 | Kisel |
| 2009/0150599 A1 | 6/2009 | Bennett |
| 2009/0150621 A1 | 6/2009 | Lee |
| 2009/0248763 A1 | 10/2009 | Rajan et al. |
| 2009/0287887 A1 | 11/2009 | Matsuki et al. |
| 2009/0292861 A1 | 11/2009 | Kanevsky et al. |
| 2010/0005228 A1 | 1/2010 | Fukutomi et al. |
| 2010/0023682 A1 | 1/2010 | Lee et al. |
| 2010/0095059 A1 | 4/2010 | Kisley et al. |
| 2010/0102999 A1 | 4/2010 | Lee et al. |
| 2010/0106917 A1 | 4/2010 | Ruberg et al. |
| 2010/0110748 A1 | 5/2010 | Best |
| 2010/0124123 A1 | 5/2010 | Lee |
| 2010/0131826 A1 | 5/2010 | Shalvi et al. |
| 2010/0153680 A1 | 6/2010 | Baum et al. |
| 2010/0205335 A1 | 8/2010 | Phan et al. |
| 2010/0211737 A1 | 8/2010 | Flynn et al. |
| 2010/0228936 A1 | 9/2010 | Wright et al. |
| 2010/0250831 A1 | 9/2010 | O'Brien et al. |
| 2010/0257304 A1 | 10/2010 | Rajan et al. |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0268974 A1 | 10/2010 | Floyd et al. |
| 2010/0287347 A1 | 11/2010 | Cameron et al. |
| 2010/0332871 A1 | 12/2010 | Allalouf et al. |
| 2010/0332897 A1 | 12/2010 | Wilson |
| 2011/0208911 A1 | 8/2011 | Taguchi et al. |
| 2012/0239868 A1 | 9/2012 | Ryan et al. |

FOREIGN PATENT DOCUMENTS

| | | |
|---|---|---|
| GB | 0123416 | 9/2001 |
| KR | 200000026300 | 5/2000 |
| KR | 20010034476 | 4/2001 |
| KR | 20050024278 | 3/2005 |
| KR | 20060107728 | 10/2006 |
| WO | 0201365 | 1/2002 |
| WO | WO0201365 | 1/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | 2010053756 | 5/2010 |
| WO | 2011106394 | 9/2011 |
| WO | WO2011106394 | 9/2011 |

OTHER PUBLICATIONS

Application No. 07865345.8, Office Action, Nov. 17, 2010.
Application No. 07865345.8, Office Action, Jan. 30, 2012.
Wright, Charles P., "Extending ACID Semantics to the File System", ACM Transactions on storage, May 2007, pp. 40, vol. 3, No. 2.
Application No. PCT/US2011/025885, International Preliminary Report on Patentability, Sep. 7, 2012.
Application No. PCT/US2007/086687, International Search Report and Written Opinion, May 9, 2008.
"SCSI Object-Based Storage Device Commands (OSD)", ANSI, Jul. 30, 2004, pp. 187, Information Technology, Revision 10, Reference No. ISO/IEC 14776-391.
Application No. PCT/US20071086687, International Preliminary Report on Patentability, Mar. 18, 2009.
Application No. PCT1US20071086691, International Search Report and Written Opinion, May 8, 2008.
Application No. PCT/US2007/086691, International Preliminary Report on Patentability, Feb. 16, 2009.
U.S. Appl. No. 11/952,109, Office Action, Mar. 17, 2011.
U.S. Appl. No. 11/952,109, Office Action, Jul. 1, 2011.
Application No. PCT/US2011/064728, International Search Report and Written Opinion, Jul. 31, 2012.
AgigaRAM Company review, Feb. 17, 2010, p. 1.
"Finding the Perfect Memory", AGIGATech, Sep. 3, 2009, pp. 15, Agiga Tech White Paper.
"Bulletproof Memory for Raid Servers, Part 1", AGIGATEch, 2009, pp. 4, http://agigatech.com/blog/bulletproof-memory-for-raid-servers-part-1/.
Ajanovic, Jasmin, "PCI Express* (PCIe*) 3.0 Accelerator Features," Intel Corporation, Aug. 2008 (10 pgs.).
Malventano, Allyn, "DDRdrive hits the ground running—PCI-E RAM-based SSD," PC Perspective, Web page at http://www.pcper.com/article.php?aid=704, as available via the Internet, May 4, 2009 (2 pgs.).

Shrout, Ryan, "Gigabyte iRAM Solid State SATA Storage Review," PC Perspective, Web page at http://www.pcper.comiarticle.php?aid=224&type=expert, as available via the Internet, Apr. 5, 2006 (2 pgs.).
Shrout, Ryan, "Gigabyte iRAM Solid State Sata Storage Review," PC Perspective, Web page at http://www.pcper.com/article.php?aid=224&type=expert&pid=3, as available via the Internet, Apr. 5, 2006 (4 pgs.).
Hutsell, Woody, "An In-depth Look at the RamSan-500 Cached Flash Solid State Disk," Texas Memory Systems, Mar. 2008 (16 pgs.).
Condit, Jeremy, et al., "Better I/O Through Byte-Addressable, Persistent Memory," Microsoft Research, UCLA, Oct. 11-14, 2009 (14 pgs.).
Wu, Michael and Zwaenepoel, Willy, "eNVy: A Non-Volatile, Main Memory Storage System," Rice University, 1994 (12 pgs.).
Magenheimer, Dan, "(Take 2): transcendent memory ("tmem") for Linux," Web page at http://lwn.net/Articles/340409/, as available via the Internet, Jul. 7, 2009 (3 pgs.).
Lottiaux, Renaud, et al., "OpenMosix, OpenSSI and Kerrighed: A Comparative Study," ISRN INRIA/RR-5399-FR+ENG, Nov. 2004 (22 pgs.).
Rose, Mike, "FPGA PCIe Bandwidth," University of California San Diego, Jun. 9, 2010 (7 pgs.).
Mellor, Chris, "New RAM shunts data into flash in power cuts," Web page at http://www.channelregister.co.uk/2011/10/19/viking_hybrid_dram_nand/, Oct. 19, 2011 (3 pgs.).
State Intellectual Property Office, Office Action, CN Application No. 200780050983.8, issued May 18, 2011.
State Intellectual Property Office, Office Action, CN Application No. 200780050970.0, issued Oct. 28, 2010.
State Intellectual Property Office, Office Action, CN Application No. 200780050970.0, issued Jun. 29, 2011.
State Intellectual Property Office, Office Action, CN Application No. 200780050970.0, issued Jan. 5, 2012.
State Intellectual Property Office, Office Action, CN Application No. 200780051020.X, issued Nov. 11, 2010.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
European Patent Office, Office Action, EP Application No. 07865345.8, issued Nov. 17, 2010.
United States Patent Office, Final Office Action, U.S. Appl. No. 11/952,109, mailed Nov. 29, 2011.
United States Patent Office, Office Action, U.S. Appl. No. 11/952,113, mailed Mar. 6, 2012.
United States Patent Office, Office Action, U.S. Appl. No. 11/952,113, mailed Dec. 15, 2010.
United States Patent Office, Office Action, U.S. Appl. No. 11/952,109, issued May 1, 2012.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Gutmann, "Secure Deletion of Data from Magnetic and Solid-State Memory", Usenix, 14 pages, San Jose, CA, published Jul. 1, 1996.
Brandon, Jr., "Sparse Matrices in CS Education," Journal of Computing Sciences in Colleges, vol. 24 Issue 5, May 2009, pp. 93-98.
Kawaguchi, "A Flash-Memory Based File System," TCON'95 Proceedings of the USENIX 1995 Technical Conference Proceedings, p. 13.
Gal, "A Transactional Flash File System for Microcontrollers," 2005 USENIX Annual Technical Conference, published Apr. 10, 2009.
Plank, "A Tutorial on Reed-Solomon Coding for Fault Tolerance in RAID-like System," Department of Computer Science, University of Tennessee, pp. 995-1012, Sep. 1997.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.

Asine, "ASPMC-660 Rugged IDE Flash Drive PMC Module ", http://www.asinegroup.com/products/aspmc660.html, copyright 2002, visited Nov. 8, 2009.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Spansion, "Data Management Software (DMS) for AMD Simultaneous Read/Write Flash Memory Devices", published Jul. 7, 2003.
Van Hensbergen, "Dynamic Policy Disk Caching for Storage Networking," IBM Research Division, RC24123 (W0611-189), Nov. 2006.
Spillane, "Enabling Transactional File Access via Lightweight Kernel Extensions", Stony Brook University, IBM T. J. Watson Research Center, published Feb. 25, 2009.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Wright, "Extending ACID Semantics to the File System", ACM Transactions on Storage, vol. 3, No. 2, published May 1, 2011, pp. 1-40.
Seltzer, "File System Performance and Transaction Support", University of California at Berkeley, published Jan. 1, 1992.
Novell, "File System Primer", http://wiki.novell.com/index.php/File_System_Primer, 2006, visited Oct. 18, 2006.
Dan, "Implementing MLC NAND Flash for Cost-Effective, High-Capacity Memory," M-Systems, White Paper, 91-SR-014-02-8L, Rev 1.1, Sep. 2003.
Samsung Electronics, "Introduction to Samsung's Linux Flash File System—RFS Application Note", Version 1.0, Nov. 2006.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Anonymous, "Method for Fault Tolerance in Nonvolatile Storage", http://ip.com, IP.com No. IPCOM000042269D, 2005.
Volos, "Mnemosyne: Lightweight Persistent Memory", ACM 978-1-4503-0266-1/11/03, published Mar. 5, 2011.
Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand_101.pdf, 2006, visited May 10, 2010.
ELNEC, "NAND Flash Memories and Programming NAND Flash Memories Using ELNEC Device Programmers, Application Note," published Mar. 1, 2007.
Tal, "NAND vs. NOR Flash Technology," M-Systems, www2.electronicproducts.com/PrintArticle.aspx?ArticleURL=FEBMSY1.feb2002.html, visited Nov. 22, 2010.
Coburn, "NV-Heaps: Making Persistent Objects Fast and Safe with Next-Generation, Non-Volatile Memories", ACM 978-1-4503-0266-1/11/0, published Mar. 5, 2011.
Mesnier, "Object-Based Storage," IEEE Communications Magazine, Aug. 2003, pp. 84-90.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Porter, "Operating System Transactions," ACM 978-1-60558-752-3/09/10, published Oct. 1, 2009.
Sears, "Stasis: Flexible Transactional Storage," OSDI '06: 7th USENIX Symposium on Operating Systems Design and Implementation, published Nov. 6, 2006.
Rosenblum, "The Design and Implementation of a Log-Structured File System," ACM Transactions on Computer Systems, vol. 10 Issue 1, Feb. 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.

Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Terry et al., U.S. Appl. No. 60/797,127, "Filesystem-aware Block Storage System, Apparatus, and Method," filed May 3, 2006.
WIPO, International Search Report and Written Opinion for PCT/US2011/025885, mailed Sep. 28, 2011.
WIPO, International Search Report and Written Opinion for PCT/US2007/025048, mailed May 27, 2008.
WIPO, International Preliminary Report on Patentability for PCT/US2007/025048, mailed Jun. 10, 2009.
WIPO, International Preliminary Report on Patentability for PCT/US2007/059048, mailed Oct. 20, 2009.
WIPO, International Search Report and Written Opinion for PCT/US2007/059048, mailed Aug. 25, 2008.
WIPO, International Preliminary Report on Patentability for PCT/US2007/086687, mailed Mar. 18, 2009.
WIPO, International Search Report and Written Opinion for PCT/US2007/086687, mailed Sep. 5, 2008.
WIPO, International Preliminary Report on Patentability for PCT/US2007/086688, mailed Mar. 16, 2009.
WIPO, International Search Report and Written Opinion for PCT/US2007/086691, mailed May 8, 2008.
WIPO, International Preliminary Report on Patentability for PCT/US2007/086691, mailed Feb. 16, 2009 (PCT/US2007/086691).
WIPO, International Search Report and Written Opinion for PCT/US2007/086701, mailed Jun. 5, 2008.
WIPO, International Preliminary Report on Patentability for PCT/US2007/086701, Mar. 16, 2009.
PCT/US2011/064728, International Search Report and Written Opinion, Jul. 31, 2012.
PCT/US2010/048321, International Search Report and Written Opinion, Apr. 28, 2011.
U.S. Appl. No. 12/878,981, Notice of Allowance, Aug. 28, 2012.
PCT/US2010/048320, International Search Report and Written Opinion, Apr. 28, 2011.
Leventhal, Adam, "Flash Storage Memory", Communications of the ACM, Jul. 2008, pp. 5, vol. 51, No. 7.
PCT/US2007/025049, IPRP, Mar. 11, 2009.
Application No. 07865334.2, OA, Jan. 30, 2012.
Application No. 11952101, OA, Jan. 6, 2011.
U.S. Appl. No. 13/015,458, NOA, Sep. 19, 2012.
Application No. 12176826.1, Search Report, Dec. 10, 2012.
U.S. Appl. No. 13/189,402, Notice of Allowance, Nov. 15, 2012.
PCT/US2007/086688, ISR, Apr. 28, 2008.
Application No. PCT/US2011/053795, ISR, May 4, 2012.
U.S. Appl. No. 11/953,109, Office Action, May 1, 2012.
PCT/US2007/086691, IPRP, Feb. 16, 2006.
PCT/US2007/086691, ISR, May 8, 2008.
U.S. Appl. No. 11/952,113, Office Action, Mar. 6, 2012.
PCT/US2007/086702, International Search Report, Nov. 4, 2009.
PCT/US2007/086702, International Preliminary Report on Patentability, Nov. 19, 2009.
Suh, Kang-Deog, "A 3.3 V 32 Mb NAND Flash Memory with Incremental Step Pulse Programming Scheme", IEEE Journal of Solid-State Circuits, Nov. 30, 1995, pp. 8, No. 11, New York, US.
"File Level Caching", ADABAS Caching Facility, May 11, 2004, pp. 9, PCF0002,1-4244-0753.
Kim, Jin-Ki, "Low Stress Program and Single Wordline Erase Schemes for NAND Flash Memory", MOSAID Technologies Incorporated, 2007.
Arpai-Dusseau, Andrea C. "Removing the Costs of Indirection in Flash-based SSDs with Nameless Writes", University of Wisconsin_Madison, Microsoft Research, Jun. 2010, pp. 5.

APPARATUS, SYSTEM, AND METHOD FOR AUTO-COMMIT MEMORY

CROSS-REFERENCES TO RELATED APPLICATIONS

This application claims priority to U.S. Provisional Patent Application No. 61/422,635 entitled, "APPARATUS, SYSTEM, AND METHOD FOR AUTO COMMIT MEMORY," filed on Dec. 13, 2010, which is incorporated herein by reference.

FIELD OF THE INVENTION

This invention relates to auto-commit memory and more particularly to exposing auto-commit memory to applications and/or operating systems.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
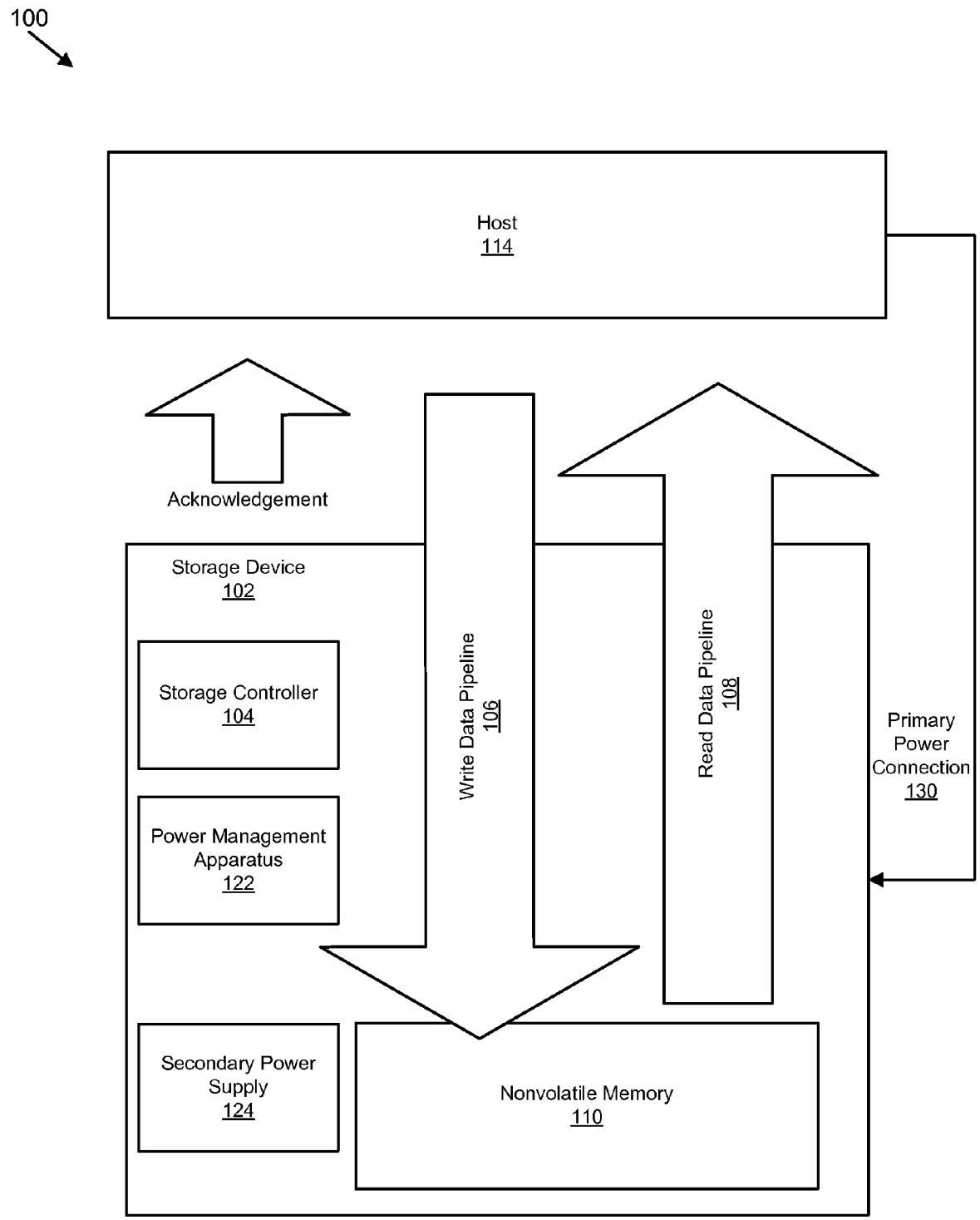
FIG. 1 is a schematic block diagram illustrating one embodiment of a system including a storage device with a power management apparatus enabling improved data handling in the event of an unexpected power failure.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Power Reduction Management

FIG. 1 depicts one embodiment of a system 100 for improved data management in the event of a power failure, power reduction, or other power loss. In the depicted embodiment, the system 100 includes a host computing device 114 and a storage device 102. The host 114 may be a computer such as a server, laptop, desktop, or other computing device known in the art. The host 114 typically includes components such as memory, processors, buses, and other components as known to those of skill in the art.

The host 114 stores data in the storage device 102 and communicates data with the storage device 102 via a communications connection (not shown). The storage device 102 may be internal to the host 114 or external to the host 114. The communications connection may be a bus, a network, or other manner of connection allowing the transfer of data between the host 114 and the storage device 102. In one embodiment, the storage device 102 is connected to the host 114 by a PCI connection such as PCI express ("PCI-e"). The storage device 102 may be a card that plugs into a PCI-e connection on the host 114.

The storage device 102 also has a primary power connection 130 that connects the storage device 102 with a primary power source that provides the storage device 102 with the power that it needs to perform data storage operations such as reads, writes, erases, etc. The storage device 102, under normal operating conditions, receives the necessary power from the primary power source over the primary power connection 130. In certain embodiments, such as the embodiment shown in FIG. 1, the primary power connection 130 connects the storage device 102 to the host 114, and the host 114 acts as the primary power source that supplies the storage device 102 with power. In certain embodiments, the primary power connection 130 and the communications connection discussed above are part of the same physical connection between the host 114 and the storage device 102. For example, the storage device 102 may receive power over a PCI connection.

In other embodiments, the storage device 102 may connect to an external power supply via the primary power connection 130. For example, the primary power connection 130 may connect the storage device 102 with a primary power source that is a power converter (often called a power brick). Those in the art will appreciate that there are various ways by which a storage device 102 may receive power, and the variety of devices that can act as the primary power source for the storage device 102.

The storage device 102 provides nonvolatile storage for the host 114. FIG. 1 shows the storage device 102 comprising a write data pipeline 106, a read data pipeline 108, nonvolatile memory 110, a storage controller 104, a power management apparatus 122, and a secondary power supply 124. The storage device 102 may contain additional components that are not shown in order to provide a simpler view of the storage device 102.

The nonvolatile memory 110 stores data such that the data is retained even when the storage device 102 is not powered. Examples of nonvolatile memory 110 include solid state memory (such as Flash), hard disk, tape, or others. The storage device 102 also includes a storage controller 104 that coordinates the storage and retrieval of data in the nonvolatile memory 110. The storage controller 104 may use one or more indexes to locate and retrieve data, and perform other operations on data stored in the storage device 102. For example, the storage controller 104 may include a groomer for performing data grooming operations such as garbage collection.

As shown, the storage device 102, in certain embodiments, implements a write data pipeline 106 and a read data pipeline 108, an example of which is described in greater detail below with regard to FIG. 3. The write data pipeline 106 may perform certain operations on data as the data is transferred from the host 114 into the nonvolatile memory 110. These operations may include, for example, error correction code (ECC) generation, encryption, compression, and others. The read data pipeline 108 may perform similar and potentially inverse operations on data that is being read out of nonvolatile memory 110 and sent to the host 114.

The storage device 102 also includes a secondary power supply 124 that provides power in the event of a complete or partial power disruption resulting in the storage device 102 not receiving enough electrical power over the primary power connection 130. A power disruption is any event that unexpectedly causes the storage device 102 to stop receiving power over the primary power connection 130, or causes a significant reduction in the power received by the storage device 102 over the primary power connection 130. A significant reduction in power, in one embodiment, includes the power falling below a predefined threshold. The predefined threshold, in a further embodiment, is selected to allow for normal fluctuations in the level of power from the primary power connection 130. For example, the power to a building where the host 114 and the storage device 102 may go out. A user action (such as improperly shutting down the host 114 providing power to the storage device 102), a failure in the primary power connection 130, or a failure in the primary power supply may cause the storage device 102 to stop receiving power. Numerous, varied power disruptions may cause unexpected power loss for the storage device 102.

The secondary power supply 124 may include one or more batteries, one or more capacitors, a bank of capacitors, a separate connection to a power supply, or the like. In one embodiment, the secondary power supply 124 provides power to the storage device 102 for at least a power hold-up time during a power disruption or other reduction in power from the primary power connection 130. The secondary power supply 124, in a further embodiment, provides a power hold-up time long enough to enable the storage device 102 to flush data that is not in nonvolatile memory 110 into the nonvolatile memory 110. As a result, the storage device 102 can preserve the data that is not permanently stored in the storage device 102 before the lack of power causes the storage device 102 to stop functioning. In certain implementations, the secondary power supply 124 may comprise the smallest capacitors possible that are capable of providing a predefined power hold-up time to preserve space, reduce cost, and simplify the storage device 102. In one embodiment, one or more banks of capacitors are used to implement the secondary power supply 124 as capacitors are generally more reliable, require less maintenance, and have a longer life than other options for providing secondary power.

In one embodiment, the secondary power supply 124 is part of an electrical circuit that automatically provides power to the storage device 102 upon a partial or complete loss of power from the primary power connection 130. Similarly, the system 100 may be configured to automatically accept or receive electric power from the secondary power supply 124 during a partial or complete power loss. For example, in one embodiment, the secondary power supply 124 may be electrically coupled to the storage device 102 in parallel with the primary power connection 130, so that the primary power connection 130 charges the secondary power supply 124 during normal operation and the secondary power supply 124 automatically provides power to the storage device 102 in response to a power loss. In one embodiment, the system 100 further includes a diode or other reverse current protection between the secondary power supply 124 and the primary power connection 130, to prevent current from the secondary power supply 124 from reaching the primary power connection 130. In another embodiment, the power management apparatus 122 may enable or connect the secondary power supply 124 to the storage device 102 using a switch or the like in response to reduced power from the primary power connection 130.

An example of data that is not yet in the nonvolatile memory 110 may include data that may be held in volatile memory as the data moves through the write data pipeline 106. If data in the write data pipeline 106 is lost during a power outage (i.e., not written to nonvolatile memory 110 or otherwise permanently stored), corruption and data loss may result.

In certain embodiments, the storage device 102 sends an acknowledgement to the host 114 at some point after the storage device 102 receives data to be stored in the nonvolatile memory 110. The write data pipeline 106, or a sub-component thereof, may generate the acknowledgement. It is advantageous for the storage device 102 to send the acknowledgement as soon as possible after receiving the data.

In certain embodiments, the write data pipeline 106 sends the acknowledgement before data is actually stored in the nonvolatile memory 110. For example, the write data pipeline 106 may send the acknowledgement while the data is still in transit through the write data pipeline 106 to the nonvolatile memory 110. In such embodiments, it is highly desirable that the storage device 102 flush all data for which the storage controller 104 has sent an acknowledgement to the nonvolatile memory 110 before the secondary power supply 124 loses sufficient power in order to prevent data corruption and maintain the integrity of the acknowledgement sent.

In addition, in certain embodiments, some data within the write data pipeline 106 may be corrupted as a result of the power disruption. A power disruption may include a power failure as well as unexpected changes in power levels supplied. The unexpected changes in power levels may place data that is in the storage device 102, but not yet in nonvolatile memory 110, at risk. Data corruption may begin to occur before the power management apparatus 122 is even aware (or notified) that there has been a disruption in power.

For example, the PCI-e specification indicates that, in the event that a power disruption is signaled, data should be assumed corrupted and not stored in certain circumstances. Similar potential corruption may occur for storage devices 102 connected to hosts 114 using other connection types, such as PCI, serial advanced technology attachment ("serial ATA" or "SATA"), parallel ATA ("PATA"), small computer system interface ("SCSI"), IEEE 1394 ("FireWire"), Fiber Channel, universal serial bus ("USB"), PCIe-AS, or the like. A complication may arise when a power disruption occurs (meaning that data received from that point to the present time may be presumed corrupt), a period of time passes, the disruption is sensed and signaled, and the power management apparatus 122 receives the signal and becomes aware of the power disruption. The lag between the power disruption occurring and the power management apparatus 122 discovering the power disruption can allow corrupt data to enter the write data pipeline 106. In certain embodiments, this corrupt data should be identified and not stored to the nonvolatile memory 110. Alternately, this corrupt data can be stored in the nonvolatile memory 110 and marked as corrupt as described below. For simplicity of description, identifying corrupt data and not storing the data to the nonvolatile memory 110 will be primarily used to describe the functions and features herein. Furthermore, the host 114 should be aware that this data was not stored, or alternatively data for which integrity is a question is not acknowledged until data integrity can be verified. As a result, corrupt data should not be acknowledged.

The storage device 102 also includes a power management apparatus 122. In certain embodiments, the power management apparatus 122 is implemented as part of the storage controller 104. The power management apparatus 122 may be, for instance, a software driver or be implemented in firmware for the storage device 102. In other embodiments, the power management apparatus 122 may be implemented partially in a software driver and partially in the storage controller 104, or the like. In one embodiment, at least a portion of the power management apparatus 122 is implemented on the storage device 102, as part of the storage controller 104, or the like, so that the power management apparatus 122 continues to function during a partial or complete power loss using power from the secondary power supply 124, even if the host 114 is no longer functioning.

In one embodiment, the power management apparatus 122 initiates a power loss mode in the storage device 102 in response to a reduction in power from the primary power connection 130. During the power loss mode, the power management apparatus 122, in one embodiment flushes data that is in the storage device 102 that is not yet stored in nonvolatile memory 110 into the nonvolatile memory 110. In particular embodiments, the power management apparatus 122 flushes the data that has been acknowledged and is in the storage device 102 that is not yet stored in nonvolatile memory 110 into the nonvolatile memory 110. In certain embodiments, described below, the power management apparatus 122 may adjust execution of data operations on the storage device 102 to ensure that essential operations complete before the secondary power supply 124 loses sufficient power to complete the essential operations, i.e. during the power hold-up time that the secondary power supply 124 provides.

In certain embodiments, the essential operations comprise those operations for data that has been acknowledged as having been stored, such as acknowledged write operations. In other embodiments, the essential operations comprise those operations for data that has been acknowledged as having been stored and erased. In other embodiments, the essential operations comprise those operations for data that have been acknowledged as having been stored, read, and erased. The power management apparatus 122 may also terminate non-essential operations to ensure that those non-essential operations do not consume power unnecessarily and/or do not block essential operations from executing; for example, the power management apparatus 122 may terminate erase operations, read operations, unacknowledged write operations, and the like.

In one embodiment, terminating non-essential operations preserves power from the secondary power supply 124, allowing the secondary power supply 124 to provide the power hold-up time. In a further embodiment, the power management apparatus 122 quiesces or otherwise shuts down operation of one or more subcomponents of the storage device 102 during the power loss mode to conserve power from the secondary power supply 124. For example, in various embodiments, the power management apparatus 122 may quiesce operation of the read data pipeline 108, a read direct memory access ("DMA") engine, and/or other subcomponents of the storage device 102 that are associated with non-essential operations.

The power management apparatus 122 may also be responsible for determining what data was corrupted by the power disruption, preventing the corrupt data from being stored in nonvolatile memory 110, and ensuring that the host 114 is aware that the corrupted data was never actually stored on the storage device 102. This prevents corruption of data in the storage device 102 resulting from the power disruption.

In one embodiment, the system 100 includes a plurality of storage devices 102. The power management apparatus 122, in one embodiment, manages power loss modes for each storage device 102 in the plurality of storage devices 102, providing a system-wide power loss mode for the plurality of storage devices 102. In a further embodiment, each storage device 102 in the plurality of storage devices 102 includes a separate power management apparatus 122 that manages a separate power loss mode for each individual storage device 102. The power management apparatus 122, in one embodiment, may quiesce or otherwise shut down one or more storage devices 102 of the plurality of storage devices 102 to conserve power from the secondary power supply 124 for executing essential operations on one or more other storage devices 102.

In one embodiment, the system 100 includes one or more adapters for providing electrical connections between the host 114 and the plurality of storage devices 102. An adapter, in various embodiments, may include a slot or port that receives a single storage device 102, an expansion card or daughter card that receives two or more storage devices 102, or the like. For example, in one embodiment, the plurality of storage devices 102 may each be coupled to separate ports or slots of the host 114. In another example embodiment, one or more adapters, such as daughter cards or the like, may be electrically coupled to the host 114 (i.e. connected to one or more slots or ports of the host 114) and the one or more adapters may each provide connections for two or more storage devices 102.

In one embodiment, the system 100 includes a circuit board, such as a motherboard or the like, that receives two or more adapters, such as daughter cards or the like, and each adapter receives two or more storage devices 102. In a further embodiment, the adapters are coupled to the circuit board using PCI-e slots of the circuit board and the storage devices 102 are coupled to the adapters using PCI-e slots of the adapters. In another embodiment, the storage devices 102 each comprise a dual in-line memory module ("DIMM") of non-volatile solid-state storage, such as Flash memory, or the like. In one embodiment, the circuit board, the adapters, and the storage devices 102 may be external to the host 114, and may include a separate primary power connection 130. For example, the circuit board, the adapters, and the storage devices 102 may be housed in an external enclosure with a power supply unit ("PSU") and may be in communication with the host 114 using an external bus such as eSATA, eSATAp, SCSI, FireWire, Fiber Channel, USB, PCIe-AS, or the like. In another embodiment, the circuit board may be a motherboard of the host 114, and the adapters and the storage devices 102 may be internal storage of the host 114.

In view of this disclosure, one of skill in the art will recognize many configurations of adapters and storage devices 102 for use in the system 100. For example, each adapter may receive two storage devices 102, four storage devices 102, or any number of storage devices. Similarly, the system 100 may include one adapter, two adapters, three adapters, four adapters, or any supported number of adapters. In one example embodiment, the system 100 includes two adapters and each adapter receives four storage devices 102, for a total of eight storage devices 102.

In one embodiment, the secondary power supply 124 provides electric power to each of a plurality of storage devices 102. For example, the secondary power supply 124 may be disposed in a circuit on a main circuit board or motherboard and may provide power to several adapters. In a further embodiment, the system 100 includes a plurality of secondary power supplies that each provide electric power to a subset of a plurality of storage devices 102. For example, in one embodiment, each adapter may include a secondary power supply 124 for storage devices 102 of the adapter. In a further embodiment, each storage device 102 may include a secondary power supply 124 for the storage device 102. In view of this disclosure, one of skill in the art will recognize different arrangements of secondary power supplies 124 for providing power to a plurality of storage devices 102.

Figure 2:
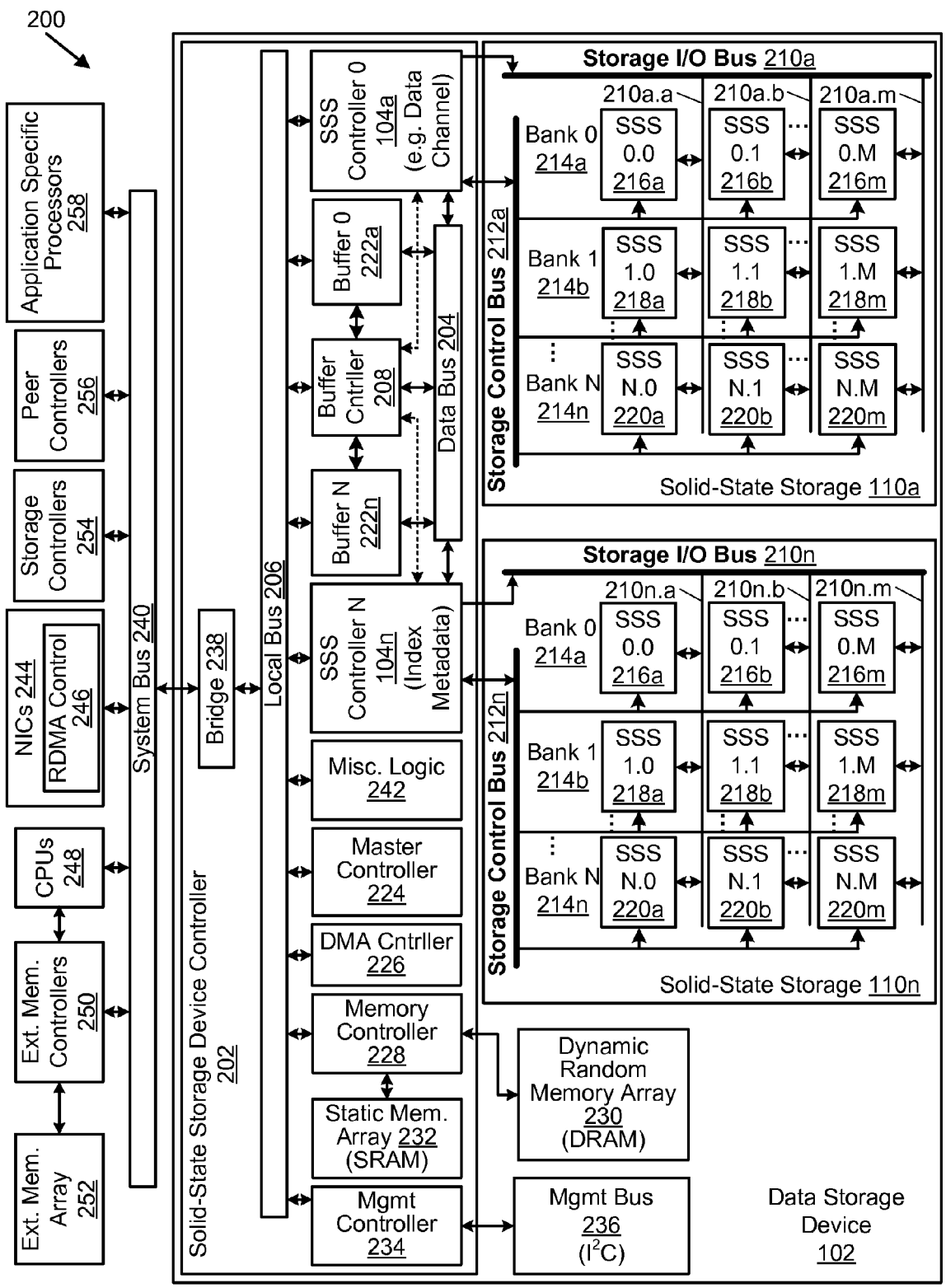
FIG. 2 is a schematic block diagram illustrating one embodiment of a solid-state storage device controller for a data storage device.

FIG. 2 is a schematic block diagram illustrating one embodiment 200 of a solid-state storage device controller 202 that includes a write data pipeline 106 and a read data pipeline 108 in a solid-state storage device 102 in accordance with the present invention. The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controlling respective solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is a field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g., SSS 0.0 216a) is typically configured as a chip (a package of one or more dies) or a die on a circuit board. As depicted, a solid-state storage element (e.g., 216a) operates independently or semi-independently of other solid-state storage elements (e.g., 218a) even if these several elements are packaged together in a chip package, a stack of chip packages, or some other package element. As depicted, a row of solid-state storage elements 216a, 216b, 216m is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. Of course, different embodiments may include different values for n and m. In one embodiment, a solid-state storage media 110a includes twenty solid-state storage elements 216a-216m per bank 214 with eight banks 214. In one embodiment, the solid-state storage media 110a includes twenty-four solid-state storage elements 216a-216m per bank 214 with eight banks 214. In addition to the n×m storage elements 216a-216m, 218a-218m, 220a-220m, one or more additional columns (P) may also be addressed and operated in parallel with other solid-state storage elements 216a, 216b, 216m for one or more rows. The added P columns in one embodiment, store parity data for the portions of an ECC chunk (i.e., an ECC codeword) that span m storage elements for a particular bank. In one embodiment, each solid-state storage element 216, 218, 220 is comprised of single-level cell ("SLC") devices. In another embodiment, each solid-state storage element 216, 218, 220 is comprised of multi-level cell ("MLC") devices.

In one embodiment, solid-state storage elements that share a common line 211 on the storage I/O bus 210a (e.g., 216b, 218b, 220b) are packaged together. In one embodiment, a solid-state storage element 216, 218, 220 may have one or more dies per package with one or more packages stacked vertically and each die may be accessed independently. In another embodiment, a solid-state storage element (e.g., SSS 0.0 216a) may have one or more virtual dies per die and one or more dies per package and one or more packages stacked vertically and each virtual die may be accessed independently. In another embodiment, a solid-state storage element SSS 0.0 216a may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216a, 218a ... 220a, each in a separate bank 214a, 214b ... 214n. In another embodiment, 24 storage elements (e.g., SSS 0.0-SSS 0.24) 216a, 216b, ... 216m form a logical bank 214a so that each of the eight logical banks has 24 storage elements (e.g., SSS0.0-SSS 8.24) 216, 218, 220. Data is sent to the solid-state storage media 110 over the storage I/O bus 210 to all storage elements of a particular group of storage elements (SSS 0.0-SSS 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In one embodiment, the storage I/O bus 210 is comprised of one or more independent I/O buses ("IIOBa-m" comprising 210a.a-m ... 210n.a-m) wherein the solid-state storage elements within each column share one of the independent I/O buses that are connected to each solid-state storage element 216, 218, 220 in parallel. For example, one independent I/O bus 210a.a of the storage I/O bus 210a may be physically connected to a first solid-state storage element 216a, 218a, 220a of each bank 214a-n. A second independent I/O bus 210a.b of the storage I/O bus 210b may be physically connected to a second solid-state storage element 216b, 218b, 220b of each bank 214a-n. Each solid-state storage element 216a, 216b, 216m in a bank 214a (a row of solid-state storage elements as illustrated in FIG. 2) may be accessed simultaneously and/or in parallel. In one embodiment, where solid-state storage elements 216, 218, 220 comprise stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214*a-n* are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Solid-state storage elements 216, 218, 220 may also be selected through a combination of control signals and address information transmitted on storage I/O bus 210 and the storage control bus 212.

In one embodiment, each solid-state storage element 216, 218, 220 is partitioned into erase blocks and each erase block is partitioned into pages. An erase block on a solid-state storage element 216, 218 220 may be called a physical erase block or "PEB." A typical page is 2048 bytes ("2 kB"). In one example, a solid-state storage element (e.g., SSS 0.0) includes two registers and can program two pages so that a two-register solid-state storage element 216, 218, 220 has a capacity of 4 kB. A bank 214 of 20 solid-state storage elements 216*a*, 216*b*, 216*m* would then have an 80 kB capacity of pages accessed with the same address going out the independent I/O buses of the storage I/O bus 210.

This group of pages in a bank 214 of solid-state storage elements 216*a*, 216*b*, . . . 216*m* of 80 kB may be called a logical page or virtual page. Similarly, an erase block of each storage element 216*a*, 216*b*, . . . 216*m* of a bank 214*a* may be grouped to form a logical erase block (which may also be called a virtual erase block). In one embodiment, an erase block of pages within a solid-state storage element is erased when an erase command is received within the solid-state storage element. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the solid-state storage element 216 to direct the packet to the designated location within the page. Since all storage elements in a column of storage elements (e.g., SSS 0.0-SSS N.0 216*a*, 218*a*, . . . 220*a*) are connected to the same independent I/O bus (e.g., 210.*a.a*) of the storage I/O bus 210*a*, to reach the proper page and to avoid writing the data packet to similarly addressed pages in the column of storage elements (SSS 0.0-SSS N.0 216*a*, 218*a*, . . . 220*a*), the bank 214*a* that includes the solid-state storage element SSS 0.0 216*a* with the correct page where the data packet is to be written is selected by the storage control bus 212*a* and other banks 214*b* . . . 214*n* of the solid-state storage 110*a* are deselected.

Similarly, satisfying a read command on the storage I/O bus 210 requires a signal on the storage control bus 212 to select a single bank 214*a* and the appropriate page within that bank 214*a*. In one embodiment, a read command reads an entire page, and because there are multiple solid-state storage elements 216*a*, 216*b*, . . . 216*m* in parallel in a bank 214*a*, an entire logical page is read with a read command. However, the read command may be broken into subcommands, as will be explained below with respect to bank interleave. Similarly, an entire logical page may be written to the solid-state storage elements 216*a*, 216*b*, . . . 216*m* of a bank 214*a* in a write operation.

An erase block erase command may be sent out to erase an erase block over the storage I/O bus 210 with a particular erase block address to erase a particular erase block. Typically, storage controller 104*a* may send an erase block erase command over the parallel paths (independent I/O buses 210*a-n.a-m*) of the storage I/O bus 210 to erase a logical erase block, each with a particular erase block address to erase a particular erase block. Simultaneously, a particular bank (e.g., Bank 0 214*a*) is selected over the storage control bus 212 to prevent erasure of similarly addressed erase blocks in non-selected banks (e.g., Banks 1-N 214*b-n*). Alternatively, no particular bank (e.g., Bank 0 214*a*) is selected over the storage control bus 212 (or all of the banks are selected) to enable erasure of similarly addressed erase blocks in all of the banks (Banks 1-N 214*b-n*) in parallel. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the solid-state storage media 110. For example, storage controller 104*a* streams packets to storage write buffers of a bank 214*a* of storage elements 216 and, when the buffers are full, the packets are programmed to a designated logical page. Storage controller 104*a* then refills the storage write buffers with packets and, when full, the packets are written to the next logical page. The next logical page may be in the same bank 214*a* or another bank (e.g., 214*b*). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the solid-state storage media 110. When a copy is made, a new copy of the requested data is created and a new entry is created in the index mapping the new copy of the requested data to the original packets. The new copy of the requested data is also written to the solid-state storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the solid-state storage media 110 and allows the solid-storage device controller 202 to monitor storage hot spots and level usage of the various logical pages in the solid-state storage media 110. Sequentially writing packets also facilitates a powerful, efficient garbage collection system, which is described in detail below. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically, the solid-state storage controller(s) 104 communicate data to the solid-state storage media 110 over a storage I/O bus 210. In a typical embodiment where the solid-state storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216a, 218a, 220a) may include a logical-to-physical mapping for storage divisions (e.g., erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n-1 and associated solid-state storage media 110a-110n-1 while at least one channel (solid-state storage controller 104n, solid-state storage media 110n) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage media 110a-n, the master controller 224 divides the work load among internal controllers, such as the solid-state storage controllers 104a-n. For example, the master controller 224 may divide an object to be written to the data storage devices (e.g., solid-state storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple logical devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition, the DMA controller 226 may also control RDMA operations with requesting devices through a NIC 244 and associated RDMA controller 246.

In one embodiment, the solid-state storage device controller 202 includes a management controller 234 connected to a management bus 236. Typically, the management controller 234 manages environmental metrics and status of the storage device/solid-state storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the storage device/solid-state storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically, where the solid-state device controller 202 or master controller 224 is/are configured using a FPGA or other configurable controller, custom logic may be included based on a particular application, customer requirement, storage requirement, etc.

Data Pipeline

Figure 3:
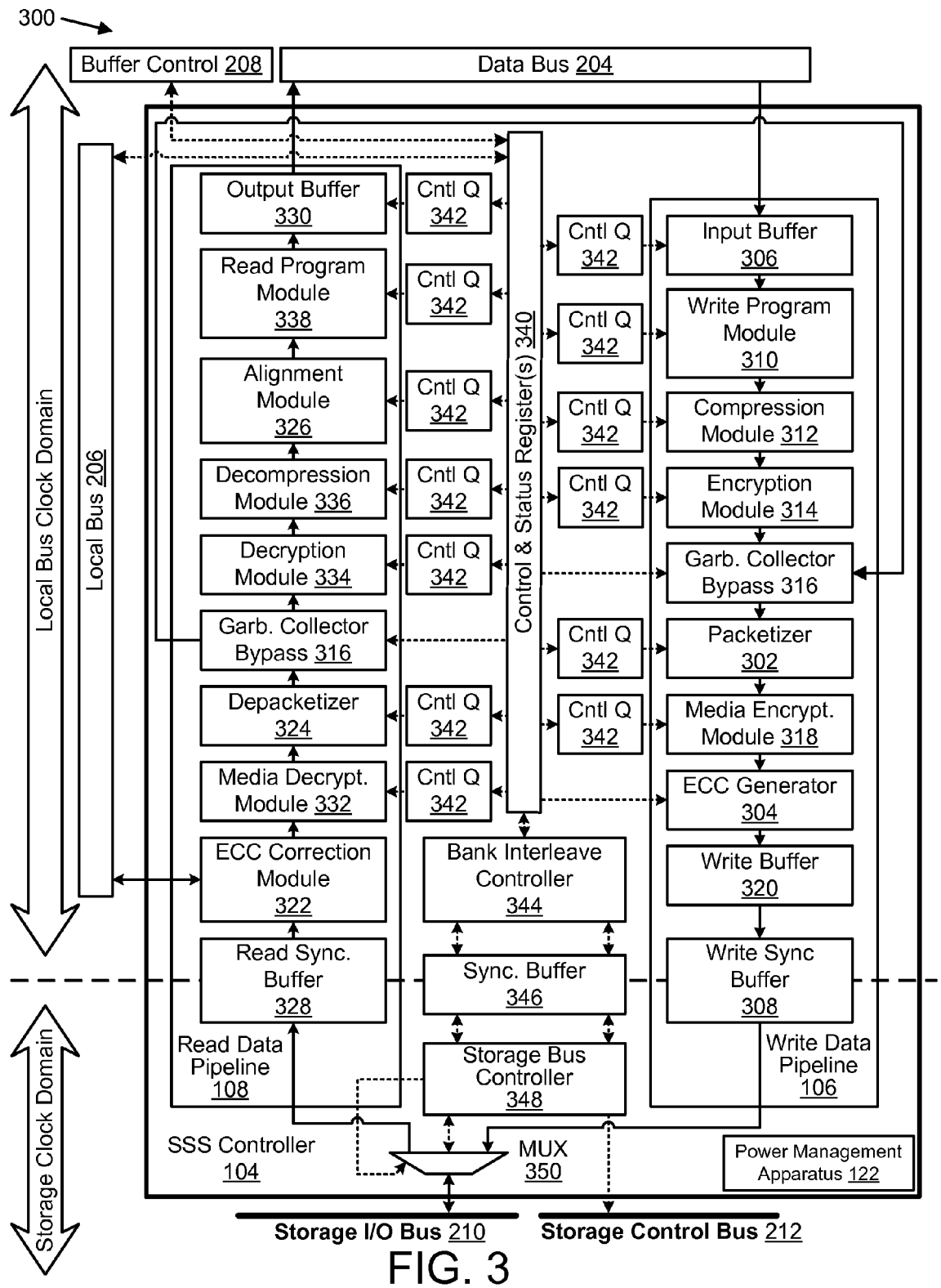
FIG. 3 is a schematic block diagram illustrating one embodiment of a solid-state storage controller with a write data pipeline and a read data pipeline in a data storage device.

FIG. 3 is a schematic block diagram illustrating one embodiment 300 of a solid-state storage controller 104 with a write data pipeline 106 and a read data pipeline 108 in a solid-state storage device 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host 114, or other computer or device and is transmitted to the solid-state storage device 102 in data segments streamed to the solid-state storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicates the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the ECC algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the solid-state storage device 102 but outside the write data pipeline 106, in the host 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synchronization buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-sate storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host 114, another computer, key manager, or other device that holds the encryption key to be used to encrypt the data segment. In one embodiment, encryption keys are transferred to the solid-state storage controller 104 from one of a solid-state storage device 102, host 114, computer, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102, if the solid-state storage media 110 is connected to a different solid-state storage controller 104, solid-state storage device 102, or host 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that hosts 114 or other devices writing data to the solid-state storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by hosts 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the logical page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one logical page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full logical page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the solid-state storage media 110.

In another embodiment, the write buffer 320 is sized smaller than a logical page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a logical page prior to programming the data. In this way a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error.

The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the solid-state storage device 102 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host 114, a computer, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
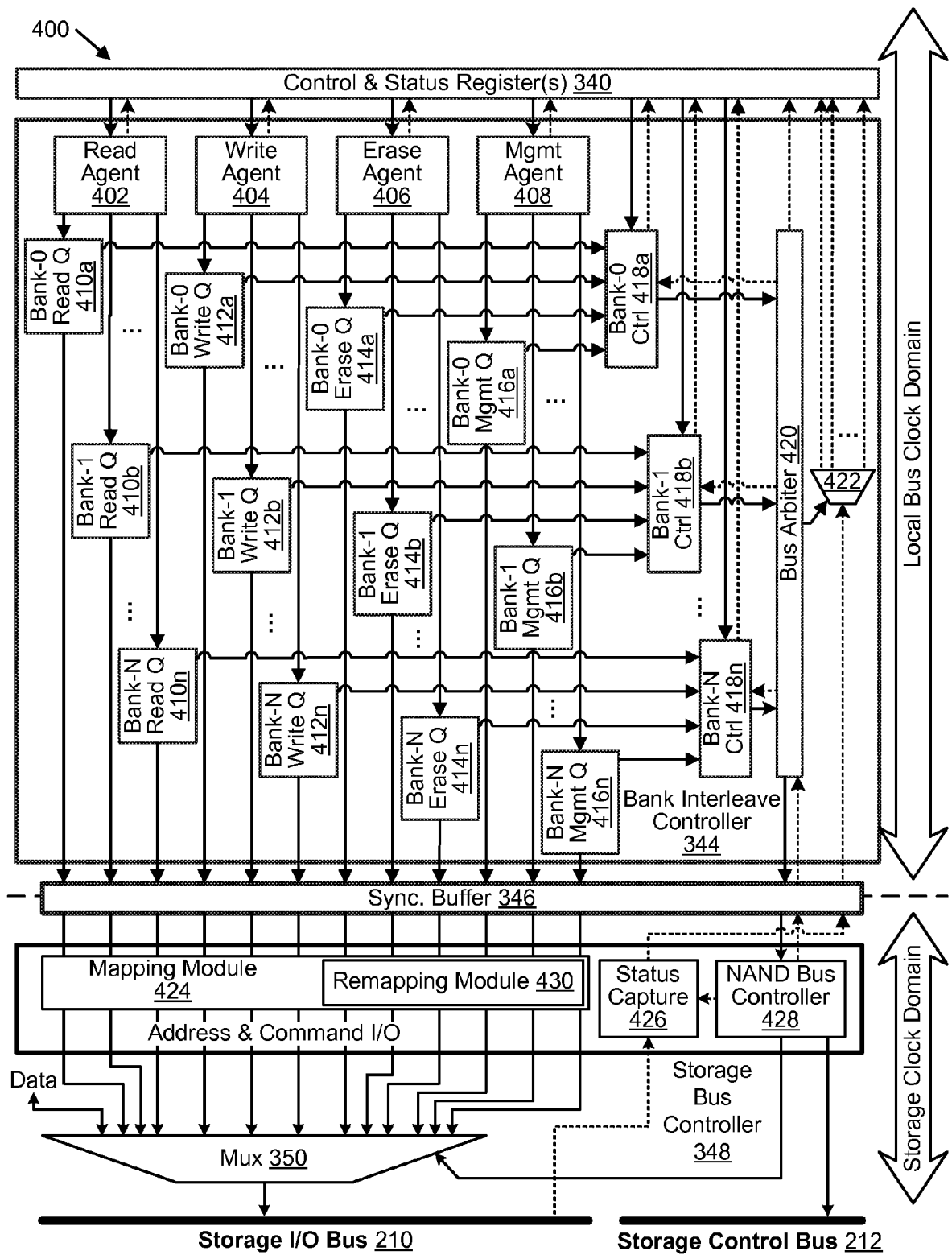
FIG. 4 is a schematic block diagram illustrating one embodiment of a bank interleave controller in a solid-state storage controller.

The solid-state storage controller 104 and or solid-state storage device 102 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write synchronization buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While Bank 0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS N.0 216a, 218a, . . . 220a, a second bank interleave controller 344 serves a second column of storage elements SSS 0.1-SSS N.1 216b, 218b, . . . 220b etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each column of solid-state storage elements (e.g. SSS 0.0 216a, SSS 1.0 218a, SSS N.0 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each column of solid-state storage elements (SSS 0.x to SSS N.x 216, 218, 220) to the MUX 350 for each column of solid-state storage elements (SSS 0.x to SSS N.x 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS 0.M 216) per bank 214a may have a logical address for a particular erase block mapped to twenty physical addresses of the erase block, one physical address per storage element. Because the storage elements are accessed in parallel, erase blocks at the same position in each storage element in a column of storage elements 216a, 218a, 220a will share a physical address. To select one erase block (e.g. in storage element SSS 0.0 216a) instead of all erase blocks in the row (e.g. in storage elements SSS 0.0, 1.0, . . . N.0 216a, 218a, 220a), one bank (in this case Bank 0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 0.1 216b, . . . , and to storage element 0.M 216m, virtual erase block 2 may be mapped to erase block 2 of storage element SSS 1.0 218a, to erase block 2 of storage element SSS 1.1 218b, . . . , and to storage element 1.M 218m, etc. Alternatively, virtual erase block 1 may be mapped to one erase block from each storage element in an array such that virtual erase block 1 includes erase block 1 of storage element SSS 0.0 216a to erase block 1 of storage element SSS 0.1 216b to storage element 0.M 216m, and erase block 1 of storage element SSS 1.0 218a to erase block 1 of storage element SSS 1.1 218b, . . . , and to storage element 1.M 218m, for each storage element in the array up to erase block 1 of storage element N.M 220m.

If erase block 1 of a storage element SSS 0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 0.1 216b, erase block 1 of storage element SSS 0.2 (not shown) . . . , and to storage element 0.M 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Power Failure Management

Figure 5A:
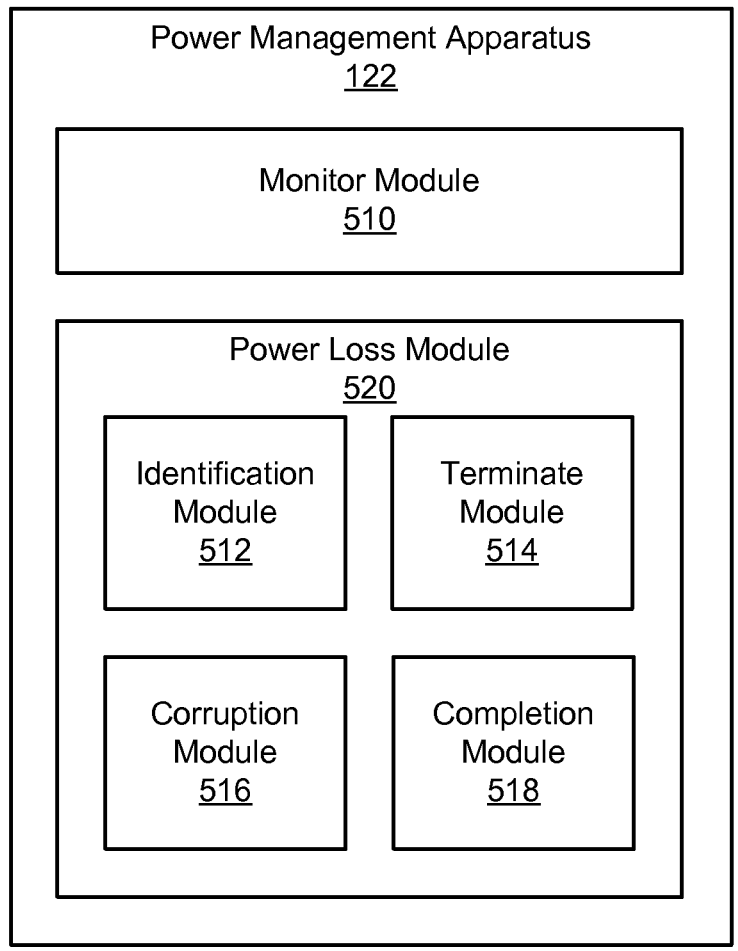
FIG. 5A is a schematic block diagram illustrating one embodiment of a power management apparatus.

FIG. 5A shows one embodiment of a power management apparatus 122. In one embodiment, the power management apparatus 122 may include a monitor module 510 and a power loss module 520. In a further embodiment, the power loss module 520 includes an identification module 512, a terminate module 514, a corruption module 516, and a completion module 518.

The monitor module 510, in one embodiment, initiates a power loss mode in the nonvolatile storage device 102 in response to a primary power source failing to supply electric power above a predefined threshold through the primary power connection 130. The power loss mode, in one embodiment, is a mode of operation in which the power management apparatus 122 prepares the storage device 102 for shutting down within a power hold-up time provided by the secondary power supply 124. The power loss module 520, in one embodiment, adjusts execution of in-process operations on the nonvolatile storage device 102 during the power loss mode, to allow essential in-process operations to execute.

In one embodiment, power above the predefined threshold is sufficient for the storage device 102. Sufficient power, in one embodiment, is power that meets the requirements for the storage device 102 to operate properly. The predefined threshold, in a further embodiment, is set at or above an insufficient power level for the storage device 102. Insufficient power is power that does not meet the requirements for the storage device 102. Power with a high AC or harmonic component when DC is expected and a voltage or current level that is too low are examples of insufficient power. As described above, in one embodiment, the storage device 102 is configured to automatically accept or otherwise draw power from the secondary power supply 124 when power from the primary power source falls below the predefined threshold. The predefined threshold, in one embodiment, is an engineered threshold determined by characteristics of the secondary power supply 124 and corresponding circuits.

The primary power source, in one embodiment, is a source of power that the nonvolatile storage device 102 uses during normal operation and which provides a substantially continuous supply of power that is not unexpectedly interrupted during normal operation. For example, in typical embodiments, the computer system (i.e. the host 114 or the like) to which the storage device 102 is attached is the primary power source and provides power through the motherboard, such as through a bus or slot connection such as PCI, PCIe, AGP, or the like, or through an external port such as a USB port, a FireWire port, an eSATAp port, or the like. In another embodiment, the primary power source is a standard electrical outlet.

In one embodiment, the monitor module 510 monitors the primary power connection 130 directly to determine when electric power from the primary power source falls below the predefined threshold. For example, the monitor module 510 may include a power sensor, a current sensor, and/or another appropriate sensor to use to determine whether the nonvolatile storage device 102 is receiving sufficient external power. In other embodiments, the monitor module 510 may be notified by another component in the nonvolatile storage device 102 in the event the nonvolatile storage device 102 loses external power.

In one embodiment, the monitor module 510 includes an analog circuit that responds to a loss of power from the primary power connection 130. For example, the primary power connection 130 and the secondary power supply 124 may be placed in parallel such that the primary power connection 130 keeps the secondary power supply 124 fully charged (for example, when the secondary power supply 124 is made up of capacitors) and also supplies power to the storage device 102. In the parallel configuration, the secondary power supply 124 naturally begins providing power in the event of a failure of the primary power connection 130, and the storage device 102 naturally accepts the power from the secondary power supply 124. The monitor module 510 circuit may also provide proper isolation to ensure that power from the secondary power supply 124 is sent to the storage device 102; for example, a diode may be used to ensure that, in the event of a failure in the primary power supply, power flows from the secondary power supply 124 to the storage device 102, and not to the failed primary power supply. Approaches to proper isolation will be appreciated by those of skill in the art in light of this disclosure.

The monitor module 510, in such an embodiment, may still include detection components (such as current sensors, voltage sensors, or the like) to sense the power disruption and to initiate the power loss mode to trigger the operations of other modules in the power management apparatus 122 in response. In another embodiment, monitor module 510 may sense a power disruption signal and activate a switch that changes the power draw for the storage device 102 from the primary power connection 130 to the secondary power supply 124, or the like.

The monitor module 510, in one embodiment, may initiate the power loss mode by directly or indirectly communicating to the power loss module 520 and/or another module that the storage device 102 has entered the power loss mode. For example, in various embodiments, the monitor module 122 may set a status register, send a power loss mode command, send a power loss signal, send a power loss interrupt, initiate a power loss mode function or procedure, place the storage device in a power loss state, and/or otherwise notify the power loss module 520 of the power loss mode.

The power loss module 520, in one embodiment, adjusts execution of in-process operations on the storage device 102 during the power loss mode, to ensure that essential operations, such as operations acknowledged to the host 114 or the like, are executed during the power hold-up time. In-process operations, in one embodiment, include operations that the storage device 102 is currently executing. In a further embodiment, in-process operations include operations that are queued for execution on the storage device 102, that are in-flight in the write data pipeline 106 and/or the read data pipeline 108, or the like. In the depicted embodiment, the power loss module 520 includes the identification module 512, the terminate module 514, and the corruption module 516.

The identification module 512, in one embodiment, identifies one or more non-essential operations on the nonvolatile storage device 102 in response to the monitor module 510 determining that external power has been lost, is below the predefined threshold, or is otherwise insufficient and entering the power loss mode. Non-essential operations are those operations that can be terminated, stopped, or paused, without causing data corruption or data loss on the storage device 102. Essential operations are those operations that must be executed in order to avoid data corruption, data loss on the storage device 102, or inconsistent communications between the storage device 102 and the host 114 (i.e. sending an acknowledgement to the host 114 for data that later is not properly handled consistent with the acknowledgement). The identification module 512 may further determine whether the non-essential operations are executing, or whether they are queued and awaiting execution.

The terminate module 514, in one embodiment, terminates the non-essential operations identified by the identification module 512. The terminate module 514, in various embodiments, may terminate non-essential operations by erasing the non-essential operations, commands, and instructions that are queued and/or by interrupting non-essential operations that are currently executing on the storage device 102. In one embodiment, the terminate module 514 allows the storage device 102 to power off (i.e. once the power hold-up time has expired and the secondary power supply 124 is depleted) without executing the non-essential operations. In a further embodiment, the terminate module 514 terminates the non-essential operations in a way that the non-essential operations are not executed or resumed once the storage device 102 is again powered on after a power loss. For example, in one embodiment, the terminate module 514 terminates the non-essential operations without leaving a record of the terminated non-essential operations, so that the storage device 102 powers on without executing or resuming the terminated non-essential operations.

In one embodiment, the identification module 512 also manages a power budget for the storage device 102 while the storage device 102 is operating on the secondary power supply 124. The identification module 512 may determine, for example, how much power is available, how much power all pending operations on the storage device 102 will require, and prioritize the pending operations. The operations may thus be reordered and executed in order of priority, to execute at least the essential in-process operations within the power hold-up time. In one embodiment, if the identification module 512 determines that there is insufficient power to execute all write operations (i.e. program operations on a nonvolatile solid-state storage device), possibly due to an error or failure, the identification module 512 may log this information to provide notification, possibly after power is restored, to a user or system that some or all of the write operations have been lost.

In one embodiment, the non-essential operations include erase operations that are erasing nonvolatile memory 110 on the nonvolatile storage device 102 and/or read operations that are reading data on the nonvolatile storage device 102. The erase operations may have been generated, for example, as part of a garbage collection operation that is reclaiming space on a solid state storage device such as a Flash memory device. Non-essential operations may also include operations such as generating a hash key for data in the nonvolatile storage device 102, decompressing data read from storage, or other operations. Non-essential operations, in a further embodiment, may include write (or program) operations for which the nonvolatile storage device 102 has not sent an acknowledgement to the host 114. In one embodiment, a user or system designer specifies which operations are essential and which operations are non-essential.

In certain embodiments, the terminate module 514 terminates the non-essential operations based on how much power they require. For example, erase operations in solid state storage devices tend to consume considerable amounts of power. The terminate module 514 may quickly terminate the erase operations in order to conserve power. In contrast, read operations require relatively little power. The terminate module 514 may begin terminating read operations only after the erase operations are terminated, or the like.

In one embodiment, the identification module 512 prioritizes operations, with the priorities based on the importance of executing the operation. For example, program operations for data that has been acknowledged may be given the highest priority, while an erase operation is given the lowest priority. The terminate module 514 may begin terminating the lowest priority operations and move up a prioritized list of operations, and not terminate any essential operations. Thus, the terminate module 514, beginning with the lowest priority operation, determines if the operation is essential. If not, that operation is terminated. If the operation is essential, the operation is not terminated and the terminate module 514 moves to the next operation for consideration.

In certain embodiments, the identification module 512 may also prioritize non-essential operations that are in the process of executing based on the amount of energy required to complete the non-essential operation. For example, an erase operation that is 90% complete may be given a lower priority for termination than an erase operation that is 5% complete; thus, the erase operation that is 90% may be allowed to complete, while the erase operation that is 5% complete when the power disruption is detected is stopped. In one embodiment, the amount of energy required for an operation may vary over the time during which the operation is executed.

The terminate module 514, in one embodiment, terminates non-essential operations identified by the identification module 512. As noted above, the terminate module 514 may terminate certain classes of operations (such as power-intensive erase operations or autonomous grooming operations), as prioritized by the identification module 512, for termination before other operations. In one embodiment, the terminate module 514 terminates the non-essential operation by identifying the memory area or component on which the operation is working/executing and resetting the memory area or component, as discussed in greater detail in connection with FIG. 6. As used herein, a memory area or component refers to a physical section of the nonvolatile memory 110 for which operations executing on that physical section can be reset, terminated, halted, suspended, or paused with a command or signal.

By terminating the non-essential operations, the power management apparatus 122 can ensure that power is used for essential write operations and other essential operations so that the essential operations can execute within the power hold-up time. In addition, the power management apparatus 122 can thus reduce the total amount of power that the secondary power supply 124 needs to provide. Thus a designer is permitted to choose, for example, to use smaller capacitors to provide power, which may save space in the storage device 102, reduce cost, and improve reliability while maintaining the ability to ensure that all received and acknowledged data is preserved and protected from unexpected power disruptions.

In one embodiment, the terminate module 514 determines whether the particular non-essential operation is either queued or executing. The terminate module 514 may delete queued non-essential operations by removing them from the queue to ensure that they do not execute. Alternatively, or in addition, the terminate module 514 may cancel operations that are executing to prevent the executing operations from consuming additional power. In certain embodiments, as mentioned above, the terminate module 514 terminates some non-essential operations that are in process while allowing others to complete.

The corruption module 516, in one embodiment, identifies data received by the storage device 102 that is to be written to the nonvolatile memory 110 that is presumed to be corrupt, or must be presumed to be corrupt. Such data may, for example, be data in the write data pipeline 106. The corruption module 516 ensures that the data that is presumed to be corrupt is not stored to the nonvolatile memory 110 and also ensures that the host 114 is either made aware that the data was not stored, or ensures that the host 114 is not told that the corrupt data was successfully stored.

In certain embodiments, the corruption module 516 and the terminate module 514 log the actions taken once the monitor module 510 detects the power disruption. For example, the terminate module 514 may log which non-essential operations were canceled before they began execution and which non-essential operations were terminated during execution. The corruption module 516 may log information concerning what data it determined to be corrupt. Other modules in the power management apparatus 122 may similarly log their activity, or a subset thereof, to help the storage device 102, the host 114, or other interested entity determine what occurred during the unexpected shutdown.

In one embodiment, the corruption module 516 expects that all data received by the storage device 102 beginning at some specified time in the past (for example, 5 microseconds) before the power disruption signal was received by the monitor module 510 is corrupt and should not be stored in the nonvolatile storage 110. This specification may be dictated by a standard such as PCI, PCI-e, or the like or by the host 114, storage device 102, vendor, manufacturer, etc. In a further embodiment, the corruption module 516 regards data that is in-flight in the write data pipeline 106 before a predefined stage as corrupted.

Figure 5B:
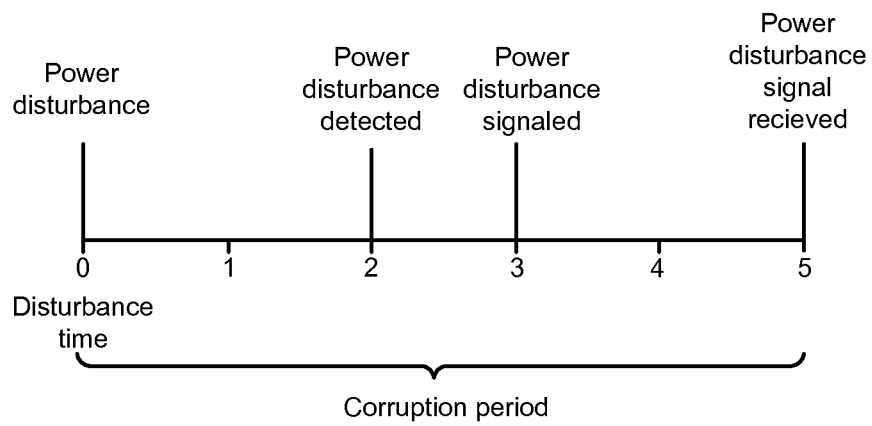
FIG. 5B is a one example of a timeline relevant to data corruption.

FIG. 5B shows one example of a timeline relevant to data corruption. At time 0, a power disturbance occurs. This point in time is referred to as the disturbance time. There is a resulting period of time that passes between the power disturbance occurring and when the power disturbance signal is received by the monitor module 510, when the monitor module 510 detects the power disturbance, or the like. This period of time is referred to herein as the corruption period. While the specification may provide example corruption periods (such as the 5 microseconds mentioned above), the corruption period is not limited to such, and may vary based on the standards and the assumptions of the developer, manufacturer, designer, and the like.

The corruption period is a result of the time necessary to detect the power disturbance (shown occurring at 5 microseconds), generate a signal indicating that there has been a power disturbance (shown occurring at 3 microseconds), and the monitor module 510 receiving the power disturbance signal (shown occurring at 5 microseconds). Generally, the corruption module 516 prevents new data from entering the write data pipeline 106 once it is determined that there has been a power disturbance as this new data is presumed corrupt. However, corrupt data may have moved into the write data pipeline 106 during the corruption period.

Thus, all data received after the corruption time is presumed to be corrupt and should not be stored. For example, the corruption module 516 may determine that the monitor module 510 received a power disruption signal at time t, and the corruption module 516 may always set the corruption time to t−5 microseconds. The corruption module 516 may therefore conclude that all data received after the corruption time of t−5 microseconds is corrupt. In such an embodiment, the corruption module 516 identifies all write operations (i.e. program operations for Flash memory and the like) received after t−5 microseconds, determines where they are in the write data pipeline 106, and skips the write operations. The corruption module 516, in various embodiments, may skip the write operations by canceling them, skipping them, clearing them, interrupting them, or otherwise failing to execute them.

In one embodiment, the power management apparatus 122 also includes a completion module 518. In some implementations, certain operations associated with stages in a write data pipeline 106 will not execute or permit continued flow of data through the pipeline until a buffer associated with that stage is filled. For example, an ECC stage, such as the ECC generator 304 of FIG. 3, may require a full buffer before generating the ECC value. Similarly, an output buffer, such as the write buffer 320, the write synchronization buffer 308, or the like may have to be filled before the data is moved out of the output buffer and onto the nonvolatile storage 110. In one embodiment, if a buffer is partially filled, under normal conditions, the stage associated with the buffer will wait until the buffer is filled before operations associated with that buffer are executed. The buffers referred to herein may be physical buffers, or may simply be temporary storage locations such as registers, DRAM locations, or others. In a further embodiment, the packetizer 302 may not pass a packet to a further stage in the write data pipeline 106 until the packet is complete, until a group of packets are complete, or the like. Similarly, the write buffer 320, in certain embodiments, may not send data to the storage device 102 until a page, a logical page, a group of pages or logical pages, or the like is complete.

In the event of a power disruption, it may be useful to move data through the write data pipeline 106 even if a buffer, packet, or page at one or more stages is not filled, to flush the data to the nonvolatile memory 110, or the like. The completion module 518 flushes data in a partially filled data buffer through the write data pipeline 106 and onto the nonvolatile memory 110. In one embodiment, the completion module 518 identifies the partially filled buffers, packets, and/or pages that will not fill and pads the buffers with pad data such that the data is moved out of the buffers and through the write data pipeline 106.

The completion module 518, in one embodiment, ensures that the padding is identifiable as pad data to ensure that the storage device 102 and/or the host 114 can identify the padding and know that the pad data is not part of the actual data. In one embodiment, the completion module 518 uses a unique header, token, marker, pattern, or other identifier to identify the padding data. In a further embodiment, the completion module 518 flushes a buffer, packet, and/or page without adding padding data, using existing data in the unfilled space in the buffer to complete the partially filled buffer, packet, and/or page. For example, a buffer, in an unfilled or empty state, may store all binary ones, all binary zeroes, junk or garbage data, data from a previous transaction, or the like. The completion module 518, in one embodiment, identifies the existing data in the unfilled area of the buffer as padding data. The completion module 518 may use a unique pattern, a flag or other indicator, or other approaches known to those in the art, in light of this disclosure.

The completion module 518, in one embodiment, uses a unique header, footer, token, marker, pattern, or other identifier to identify that the power management apparatus 122 has successfully completed the essential operations in the power loss mode. In one embodiment, successfully completing the essential operations means that the completion module 518 successfully flushed write data from write operations through the write data pipeline 106 and to the nonvolatile memory 110, or the like. The indicator, in one embodiment, is the same indicator described above to identify the padding data. In a further embodiment, the completion module 518 uses a separate indicator to identify successful execution of essential operations during the power loss mode.

Figure 6:
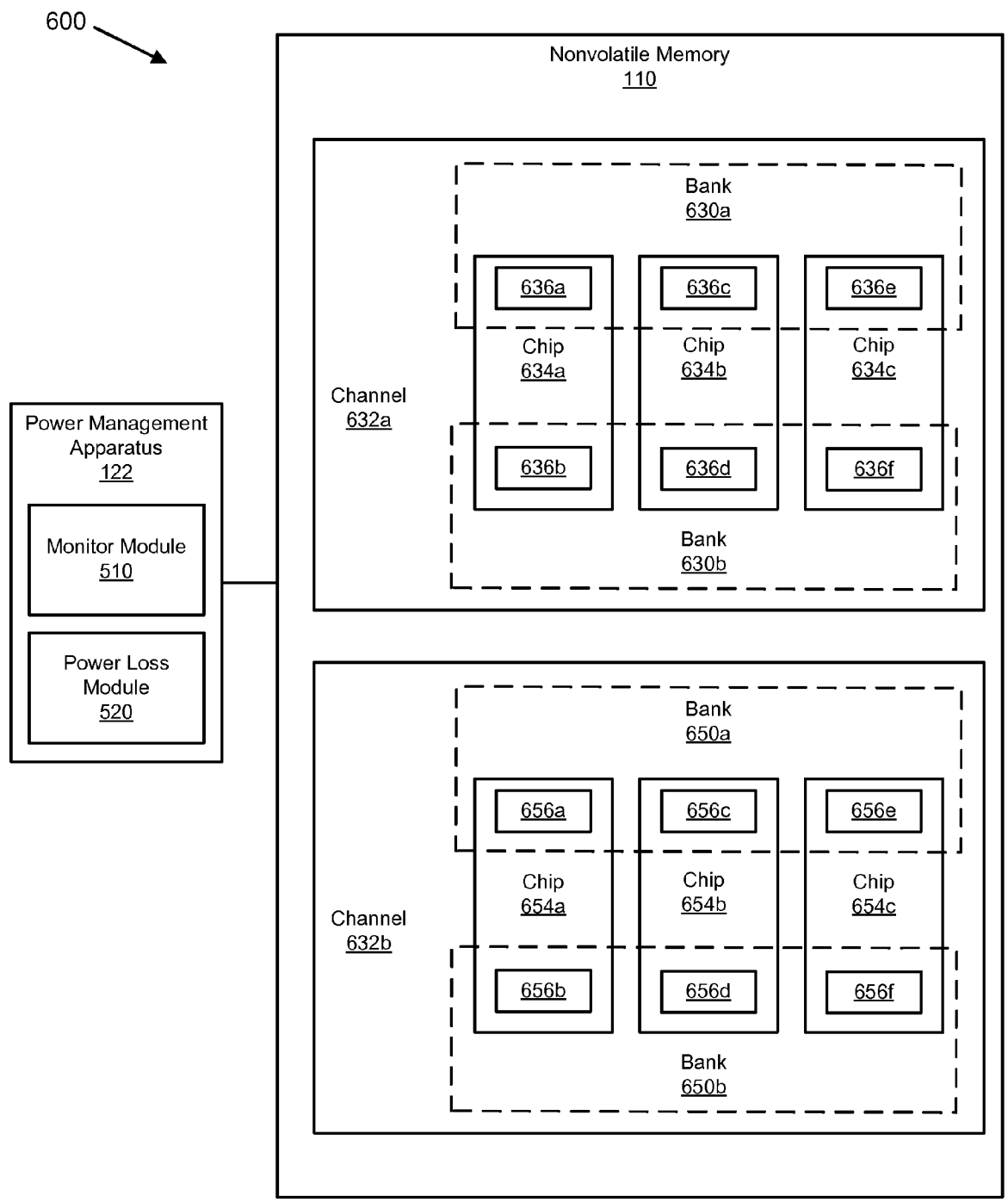
FIG. 6 is a schematic block diagram illustrating one embodiment of a power management apparatus and nonvolatile memory with which the power management apparatus interacts.

FIG. 6 shows one embodiment 600 of a power management apparatus 122 and a nonvolatile memory 110. As mentioned above, the power management apparatus 122 may be part of a storage controller 104. The power management apparatus 122 and the nonvolatile memory 110 may be physically part of the same storage device 102. The power management apparatus 122 may perform the operations described in connection with FIG. 5A. In the depicted embodiment, the power management apparatus 122 includes the monitor module 510 and the power loss module 520. The power loss module 520, in a further embodiment, may include the identification module 512, the terminate module 514, the corruption module 516, and/or the completion module 518. The power management apparatus 122 is also in communication with the nonvolatile memory 110 such that the power management apparatus 122 communicates signals to the nonvolatile memory 110, either directly or indirectly. The power management apparatus 122 may, for example, be able to send control signals to the nonvolatile memory 110.

FIG. 6 shows one embodiment of an architecture for the nonvolatile memory 110. The nonvolatile memory 110 may include channels 632a and 632b. The channels may include multiple banks; for example, the channel 632a includes banks 630a and 630b, and the channel 632b includes banks 650a and 650b. In certain embodiments, the chips 634a-c and 654a-c include multiple die 636a-f and 656a-f. In certain embodiments, one die on each chip 634a-c and 654a-c is used to form a bank. As shown, bank 630a encompasses dies 636a, 636c, and 636e. Bank 630b includes dies 636b, 636d, and 636f. Banks 650a and 650b are similarly made up of one die on the chips 654a-c. In one embodiment, the nonvolatile memory 110 of FIG. 6 is substantially similar to the solid-state storage media 110 of FIG. 2, described above.

Those of skill in the art will appreciate that the embodiment shown in FIG. 6 is simply one example of an architecture for nonvolatile memory 110 such as flash, and that numerous other architectures are also possible. FIG. 6 shows a simplified version of nonvolatile memory 110 in order to focus on features of the nonvolatile memory 110 in a manner helpful to understanding the present invention. Greater detail on a nonvolatile memory 110 implementation may be found in U.S. patent application Ser. No. 11/952,095 to David Flynn, et al., filed Dec. 6, 2007, entitled "Apparatus, System, and Method for Managing Commands of Solid-State Storage Using Bank Interleave," which is incorporated herein by reference (referred to hereinafter as "The Bank Interleave Application").

As noted above, the terminate module 514 may terminate a non-essential operation identified by the identification module 512 by determining the memory area or component on which the operation is executing, and resetting the memory area or component. As used herein, a memory area or component refers to a physical section of the nonvolatile memory 110 that can be reset with a reset command. A reset command is a command that causes all operations that are executing for the memory area, such as write, erase, and read, to terminate. In one embodiment, each die 636a-f and 656a-f can be independently reset such that each individual die 636a-f and 656a-f constitutes a unique memory area or component. The reset operation causes the operation on the particular die that is the subject of the reset operation to terminate the process.

In certain embodiments, as described herein, the operations occur on a bank basis. For example, an erase operation, in one embodiment, is executed on a logical erase block that spans multiple die that make up a bank. In such embodiments, the memory area or component may be the bank, and the reset operation is sent to all die in the bank at substantially the same time. The reset operation itself may be one command or multiple commands; in such embodiments, each die in the bank is reset, which stops the erase operations for each of the physical erase blocks in each die of the logical erase block.

In another embodiment, the terminate module 514 may reset substantially all of the nonvolatile memory 110 at the same time. For example, in one embodiment, the storage device 102 may schedule erase operations on each bank 630a, 630b, 650a, 650b simultaneously and the terminate module 514 may send reset commands to each bank 630a, 630b, 650a, 650b in the nonvolatile memory 110 to terminate those scheduled erase operations.

In such an embodiment, the terminate module 514 may send a reset command over a bus to a specific die 636a-f or 656a-f. This allows the terminate module 514 to reset the memory areas that are performing non-essential operations (such as an erase) while allowing programming operations (i.e., data storage write operations) on other memory areas to continue. In one embodiment, the terminate module 514 terminates executing operations by issuing a reset signal and terminates pending operations (i.e., those operations in a command queue that have not yet started) by removing the operation from the command queue or otherwise skipping the operations.

Certain non-essential operations may be terminated without the use of a reset command. For example, as noted above, non-essential operations that are in a command queue may simply be skipped by deleting, clearing, marking to prevent execution, or removing the non-essential operations without ever starting them. Since these operations have never started, no die 636a-f or 656a-f needs to be reset to terminate the operation. Other non-essential operations that are not executed on the die 636a-f and 656a-f may similarly be terminated without a reset command even when they are executing; for example, if a stage in the write data pipeline 106 is generating a hash key for the data when the power disruption is detected, the hash generation operation may be terminated without a reset operation being sent to the die 636a-f and 656a-f. In certain embodiments, only program/write, read, and erase operations that are in the process of executing on a particular die 636a-f and 656a-f are terminated with the reset command.

In certain embodiments, the terminate module 514 may quiesce or otherwise shut down particular areas/sections/modules/subcomponents of the storage device 102. For example, the terminate module 514 may shut down all physical devices/components and/or logical modules that implement the read data pipeline 108. In a further embodiment, the terminate module 514 may quiesce or otherwise shut down a read DMA engine, or other subcomponents associated with non-essential operations. The terminate module 514 may also shut down one or more CPUs operating on the storage device 102; for example, the storage device 102 may have a multi-core CPU. In such an embodiment, the terminate module 514 may shut down one or more cores on the CPU that the power management apparatus 122 is not using.

The terminate module 514 may also monitor and ensure that no activity unrelated to the operations of the power management apparatus 122 is occurring on the core that is supporting the power management apparatus 122. In certain embodiments, the power management apparatus 122 may be implemented in hardware separate from the CPU such that the terminate module 514 may simply shut down the CPU (or CPUs) to preserve power. The terminate module 514 may shut down the read data pipeline 108 and the CPU by stopping the respective clocks. Those of skill in the art will appreciate other approaches to shutting down the read data pipeline 108, the read DMA engine, the CPU, and/or other subcomponents of the storage device 102.

In certain embodiments, as described in the Bank Interleave Application, certain operations may occur on a bank level; for example, data is programmed (i.e. written or stored) to the die 636a, 636c, and 636e during a program operation that affects the bank 630a. The banks 630a-b and 650a-b may be organized such that they provide logical erase blocks (made up of n number of physical erase blocks when there are n die in the banks), logical pages (made up of N number of physical erase blocks when there are N die in the banks), and so on. Thus, in FIG. 6, the bank 630a may present a logical erase block that is made up of three physical erase blocks (from die 636a, 636c, and 636e), and logical pages of data made up of three physical pages from die 636a, 636c, and 636e.

In such an embodiment, the terminate module 514 may send the reset command over the bus to the die (such as die 636a, 636c, and 636e) that are running in parallel in the bank 630a. In such an embodiment, the group of die 636a, 636c, and 636e would be reset simultaneously, effectively halting the operations occurring on each of the die 636a, 636c, and 636e. Thus, since an erase operation occurs on a logical erase block that includes physical erase blocks on the three physical die 636a, 636c, and 636e, the reset operation may be physically sent to the three physical erase blocks on the die 636a, 636c, and 636e simultaneously to halt the erase operation that is in process for the logical erase block. Similarly, in a further embodiment, the terminate module 514 may send the reset operation to all the dies 636a-f, 656a-f to reset the entire nonvolatile memory 110 simultaneously.

In one possible example, the monitor module 510 may determine that the storage device 102 has lost power. The identification module 512 determines that there is an erase operation occurring on the nonvolatile memory 110 against a logical erase block on bank 650a. The terminate module 514 sends a reset command to the bank 650a, which causes the die 656a, 656c, and 656e to reset and thus terminates the erase operation. A similar pattern may occur for other erase operations and read operations pending for the nonvolatile memory 110 after the storage device 102 loses power. In addition, the banks may be independent of one another such that operations occurring on one bank can be terminated or paused without affecting the operations on the other banks in the storage device 102.

In certain embodiments, the program, erase, and read operations do not occur on a bank level as described above; in certain architectures, the program, erase, and read operations occur individually on each die 636a-f and 656a-f. In such embodiments, the reset operation may be sent to the affected die; for example, an erase of a physical erase block on die 636b may be terminated by the terminate module 514 sending a reset command to the die 636b.

Other approaches may be taken to terminate non-essential operations that are executing as identified by the identification module 512. In one embodiment, the terminate module 514 terminates the non-essential operations that are executing or are queued to execute by pausing the non-essential operation. Certain nonvolatile memory devices 110 may allow executing operations to be paused. In such embodiments, the terminate module 514 may send a command to pause the non-essential operations without sending a subsequent command to resume the non-essential operations, effectively causing the operation to cancel. In other embodiments, the terminate module 514 may send a command to pause the non-essential operations, wait until all essential program operations are complete, and then send one or more resume commands to the various paused operations.

Figure 7:
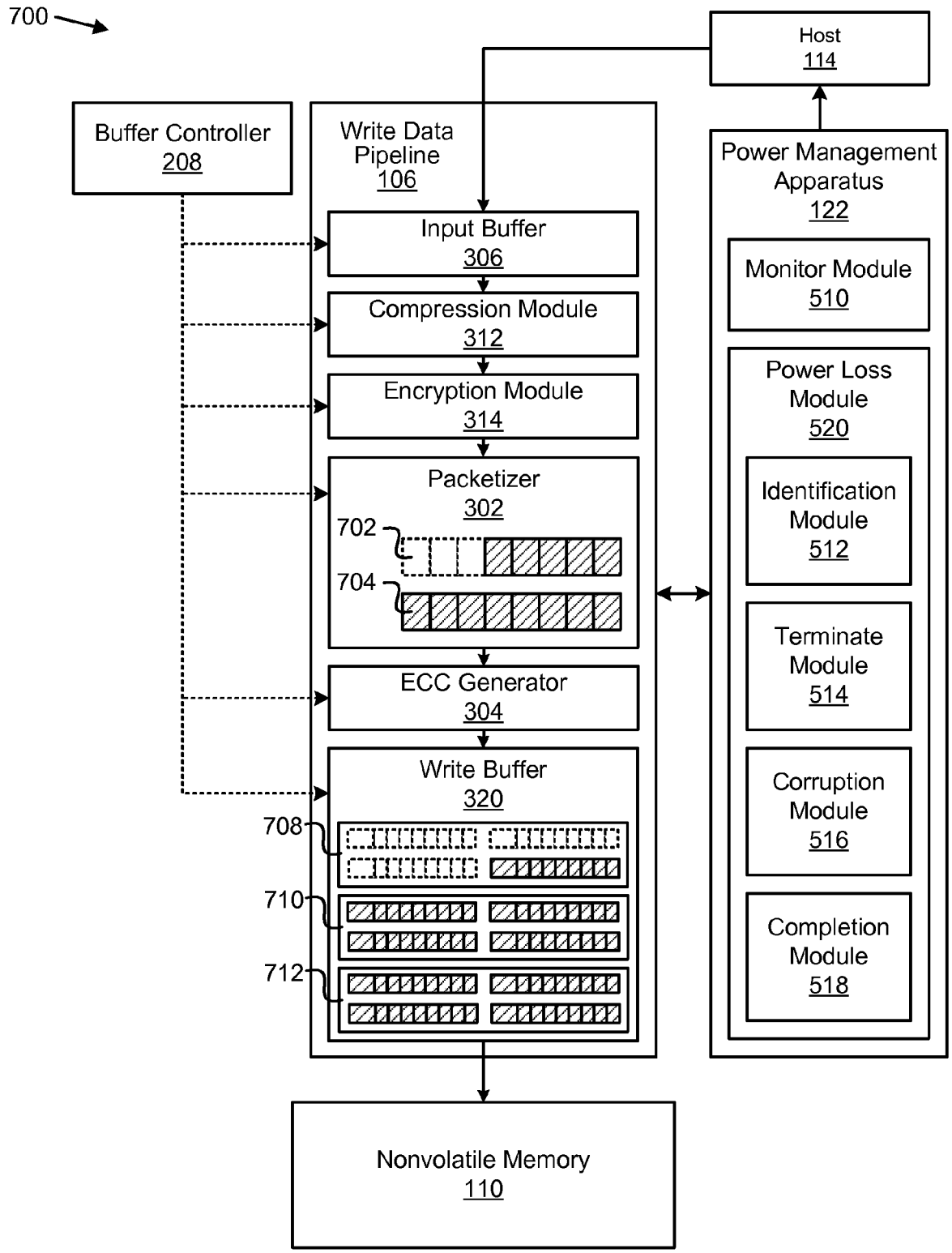
FIG. 7 is a schematic block diagram illustrating one embodiment of a write data pipeline.

FIG. 7 shows one embodiment 700 of a power management apparatus 122 and a write data pipeline 106 for a storage device 102. In one embodiment, the write data pipeline 106 is substantially similar to the write data pipeline 106 described above with regard to FIG. 3. In the depicted embodiment 700, the write data pipeline 106 includes an input buffer 306, a compression module 312, an encryption module 314, a packetizer 302, an ECC generator 304, and a write buffer 320. In other embodiments, the write data pipeline 106 may include other stages or modules, such as a write program module 310, a garbage collector bypass 316, a media encryption module 318, a write synchronization buffer 308, and/or other stages.

As shown in FIG. 3, the write data pipeline 106 may be implemented as part of a solid state storage (SSS) controller 104. The power management apparatus 122, in one embodiment, may also be implemented as part of the SSS controller 104. In one embodiment, the power management apparatus 122 may be implemented separately, but be in communication with the SSS controller 104. The power management apparatus 122, in a further embodiment, may be integrated with the SSS controller 104.

As discussed above, the corruption module 516, in certain embodiments, identifies data received over the PCI-e connection (or other connection, depending on the implementation) that was received after the power disruption and that is presumed corrupted (generally referred to hereafter as corrupt data). The corruption module 516, in one embodiment, also ensures that the host 114 can or should know that the data presumed corrupted was not saved in the storage device 102. In one embodiment, the corruption module 516 determines the location of the oldest piece of corrupt data in the write data pipeline 106. The oldest piece of corrupt data is at the start of the data received after the corruption period begins. All data from the oldest piece of corrupt data back to the beginning of the write data pipeline 106 (for example, the input buffer 306) is presumed to be corrupt and is removed from the write data pipeline 106.

In one embodiment, the corruption module 516 may cause the storage device 102 to delay sending the acknowledgment back to the host 114 until after the period of time used to calculate the corruption time has passed. As discussed above, in certain embodiments depending on the architecture of the storage device 102 and of the write data pipeline 106, the corruption module 516 may assume that all data received 5 microseconds or later after the monitor module 510 detects the power disruption is corrupt. Thus, the 5 microseconds is the period of time used to calculate the corruption time. Thus, the corruption module 516 may specify that the acknowledgement is not to be sent to the host 114 until 5 microseconds after the data was received by the storage device 102. As a result, in certain embodiments, data is never acknowledged as having been stored until the storage device 102 can guarantee that the data was not corrupted by a power disruption that has not yet been detected and/or communicated to the storage device 102.

In one embodiment, the corruption module 516 sends the acknowledgement once data leaves a buffer that is managed by the buffer controller 208, but prior to the data entering the write data pipeline 106. For example, data may be transferred by a direct memory access ("DMA") engine into buffers on the storage device 102, and that data is then moved by one or more buffer controllers 208 into the write data pipeline 106.

In one embodiment, the buffer controller 208 allows the buffer receiving the data from the DMA engine to fill, waits for expiration of the corruption time, and then sends an acknowledgement to the host 114. Once the period of time passes after the buffer is filled, it is known whether or not a power disruption has corrupted all or part of the data in the buffer and the data may be safely acknowledged. If a power disruption has occurred, the data can be removed from the buffer without being sent to the write data pipeline 106. In addition, no acknowledgement may be sent to the host 114 acknowledging that the data was stored, if a power disruption has occurred. According to best practices, the host 114 should therefore assume that the data was not stored. In another embodiment, the potential risk of data corruption in the write data pipeline 106 is acceptable and so the buffer controller 208 allows the buffer to fill, no delay is imposed for the corruption time, and then the storage device 102 sends an acknowledgement to the host 114. In certain embodiments, the storage device 102 inserts the corruption avoidance delay by default and is configurable to allow for not inserting the corruption avoidance delay.

As a result, in such an embodiment, the corruption module 516 can prevent data corrupted by a power disruption from entering the write data pipeline 106 and further prevent the storage device 102 from sending an acknowledgement until after the storage device 102 can assure that the data was not corrupted during a power disruption.

In another embodiment, the corruption module 516 stops corrupted data within the write data pipeline 106 at a choke point. The choke point is the location in the write data pipeline 106 where, in the event a power disruption is detected, any data above the choke point (i.e., between the choke point and the input buffer 306, including data in the input buffer 306) is presumed to be corrupted. The location of the choke point may be determined by the rate at which data travels through the write data pipeline 106 and also on the period of time used to determine the corruption time. For example, the corruption module 516 may assume that, in the 5 microseconds since the corruption time, the farthest data may have moved into the write data pipeline 106 is to the ECC generator 304. Thus, the ECC generator 304, in the example embodiment, is the choke point in the write data pipeline 106. In the event that a power disruption is detected, the corruption module 516 may prevent data within the ECC generator 304 and any data farther up the write data pipeline (i.e., in the media encryption module 314, the packetizer 302, and so on up the write data pipeline 106) from moving through the write data pipeline 106 and into the nonvolatile memory 110. In certain embodiments, the corruption module 516 aborts the operations occurring in the write data pipeline 106 above the choke point.

In a further embodiment, the location of the choke point may be determined by the location at which the write data pipeline 106 has enough information to write data to the nonvolatile memory 110. For example, in one embodiment, once the packetizer 302 has added header metadata to a complete packet, the write data pipeline 106 has enough information to further process the packet (i.e. pass the packet to the ECC generator 304, etc.) and to write the packet to the nonvolatile memory 110. A packet, in one embodiment, is the smallest writable unit of data in the write data pipeline 106. In this example embodiment, the packetizer 302 is the choke point. In a further embodiment, an ECC chunk or codeword is the smallest writable unit of data in the write data pipeline 106, and the ECC generator 304 may be the choke point. In one embodiment, characteristics of the secondary power supply 124 are selected to provide a power hold-up time sufficiently long enough for data to pass through the write data pipeline 106 from the choke point on and to be written to the nonvolatile memory 110.

In certain embodiments, the corruption module 516 sends an acknowledgement for the data once the data has moved completely through the choke point in the write data pipeline 106. Thus, the corrupt data may be stopped, and the operations working on the corrupt data aborted, before the acknowledgement is sent. As a result, the host 114 is not given an acknowledgement until the data that is stored or in the pipeline to be stored is good, uncorrupt data.

In certain embodiments, the data may be organized into atomic data units. For example, the atomic data unit may be a packet, a page, a logical page, a logical packet, a block, a logical block, a set of data associated with one or more logical block addresses (the logical block addresses may be contiguous or noncontiguous), a file, a document, or other grouping of related data. In such embodiments, the corruption module 516 may delay sending the acknowledgement until the entire atomic data unit has passed through the choke point. For example, part of a file may have passed through the choke point and is thus known to be uncorrupt data; however, the last half of the file has not yet passed through the choke point and thus may include corrupt data. The corruption module 516 may wait until the entire atomic data unit has passed through the choke point before sending the acknowledgement, as opposed to sending an acknowledgment when only a portion of the atomic data unit has moved through. In one embodiment, the corruption module 516 discards partially corrupted atomic data units. In a further embodiment, the corruption module 516 allows an uncorrupted portion of an atomic data unit, or both an uncorrupted portion and a corrupted portion of an atomic data unit, to pass through the write data pipeline 106 and to be written to the nonvolatile memory 110. In certain embodiments, where an atomic data unit may include partial data or data that is corrupted, the power management apparatus 122 may include an indicator with the stored data to indicate the proper state of the atomic data unit.

The corruption module 516 may further be responsible for halting the flow of data into the write data pipeline 106 after a power disruption is detected. Thus, regardless of whether the corrupted data is handled outside the write data pipeline 106 or within the write data pipeline 106, the corruption module 516 may prevent any data from entering the write data pipeline 106 after the power disruption is detected.

The completion module 518 may also work in conjunction with the write data pipeline 106 to ensure that data that is not corrupt and has been acknowledged is moved through the write data pipeline 106 and stored in the nonvolatile memory 110. The modules/stages in the write data pipeline 106 may use buffers to support their operations. In certain embodiments, the modules (such as modules 302-314) only perform the operations once the relevant buffer is filled. For example, the ECC generator 304 may wait until the buffer is full and then generate an ECC value for the entire buffer. In one embodiment, the buffer controller 208 manages the flow of data through buffers in the write data pipeline 106. Similarly, the write data pipeline 106 may include one or more control queues 342 for stages in the write data pipeline 106, as described above with regard to FIG. 3.

During normal operation, the write data pipeline 106 continually streams data through the write data pipeline 106 such that the buffers will always be filled. However, in the event of a power disruption, data flow into the write data pipeline 106 may be stopped when one or more buffers in the write data pipeline 106 are only partially full. For example, as noted above, the corruption module 516 may remove corrupt data from the write data pipeline 106 and prevent new data from flowing into the storage device 102. As a result, one or more buffers in the write data pipeline 106 may be left partially full. If the data is not moved through the write data pipeline 106, the data will be lost at the end of the power hold-up time once the secondary power supply 124 is exhausted.

In certain embodiments, the completion module 518 flushes data through partially filled buffers in the write data pipeline 106 during the power loss mode. The completion module 518, in one embodiment, fills the partially filled buffers with padding data. In other embodiments, as described above, the completion module 518 may flush data without adding padding data by using existing values stored in the unfilled portion of the buffer as padding data, or the like. As a result, the data and the padding are operated on, moved out of the buffer, and moved through the write data pipeline 106. The buffers used in the write data pipeline 106 may not all be the same size; in such embodiments, the completion module 518 may monitor the data as the data moves through the write data pipeline 106 and flush additional buffers at any point where a buffer is partially filled.

In certain embodiments, the completion module 518 uses a unique marker, indicator, or header, to identify the padding data to prevent the padding data from being mistaken for actual data in the future. In certain embodiments, the pad sequence is made up of 1 values as the value "1" is the state the nonvolatile memory 110 cells are in prior to the program of the cells occurring. For example, in Flash memory, the program operations convert 1s to 0s. By using a pad sequence made up of 1s, the power necessary to convert 1s to 0s may be conserved. In a related embodiment, the 1s making up the pad data do not need to be transferred prior to initiating a program operation as the cells will already be in the 1 state.

In certain embodiments, as data is moved out of the write data pipeline 106, over the storage I/O bus 210, and into nonvolatile memory 110, an indicator is inserted in the packet indicating whether or not the data was properly written. In certain embodiments, the indicator is inserted in the header of a packet for the data and indicates whether the data in the packet that preceded the packet with the indicator was properly written. Thus, if a packet is successfully programmed, the header of the subsequent packet is programmed with an indicator stating that the last packet programmed was successfully programmed.

In other embodiments, the indicator is placed at the end of the packet in a footer and indicates whether the packet in which the indicator is contained was properly written. In one embodiment, this is done by shifting the data forward one bit such that the data encroaches into the header space. Thus, if the header is a 64-bit header, the shift reduces the header space to 63-bits and adds one bit to the footer. This leaves one bit at the end of the packet which may be used as the indicator. This approach allows each packet to indicate its own status while maintaining proper alignment, in embodiments that may be sensitive to boundary alignment.

The indicator may be used to identify that the packet includes padding and that the data is therefore incomplete and may not be usable by the system. In certain embodiments, when the storage device 102 is powered on again after the failure, the indicator is used to aid in reconstruction of the indexes and the validity map for the nonvolatile memory 110.

In certain embodiments, one indicator is inserted for each atomic data unit. As noted above, the indicator may be placed as a footer at the end of the last packet in the atomic data unit. The indicator may thus indicate whether the data for the entire atomic data unit was properly written. If, for example, the power disruption causes only a portion of the atomic data unit to be written, and the last packet was padded as described above, the indicator would indicate that the entire atomic data unit was not properly written. In addition, as discussed above, in certain embodiments, no acknowledgement would have been sent to the host 114, in certain embodiments.

In one embodiment, corrupt data is allowed to progress through the write data pipeline 106 in order to flush acknowledged good data in progress to the nonvolatile memory 110. The corrupt data may be identified by setting the indicator as described above, which indicator flags the data as invalid/corrupt. In related embodiments, other forms of indicators such as specialized packets, headers, unique character streams, markers and similar methods known to those skilled in the art may be substituted for the indicator described above to invalidate the corrupt data stored in the nonvolatile memory 110. In all such cases, the corrupt data should never be acknowledged to the host 114.

As described above with regard to FIG. 5, the completion module 518, in one embodiment, uses a unique header, footer, token, marker, pattern, or other identifier to identify that the power management apparatus 122 has successfully completed the essential operations in the power loss mode, such as successfully flushing write data through the write data pipeline 106 or the like and successfully storing the data on the nonvolatile memory 110 during the power hold-up time. The indicator, in one embodiment, is the same indicator described above to identify corrupt data, padding data, or the like. In a further embodiment, the completion module 518 uses a separate indicator to identify successful execution of essential operations during the power loss mode.

In one embodiment, an atomic data unit is associated with a plurality of noncontiguous and/or out of order logical block addresses or other identifiers that the write data pipeline 106 handles as a single atomic data unit. As used herein, writing noncontiguous and/or out of order logical blocks in a single write operation is referred to as an atomic write. In one embodiment, a hardware controller processes operations in the order received and a software driver of the host 114 sends the operations to the hardware controller for a single atomic write together so that the write data pipeline 106 can process the atomic write operation as normal. Because the hardware processes operations in order, this guarantees that the different logical block addresses or other identifiers for a given atomic write travel through the write data pipeline 106 together to the nonvolatile memory 110. In one embodiment, because the terminate module 514 does not terminate acknowledged write operations, acknowledged atomic writes are successfully stored in the nonvolatile memory 110 and the host 114 can detect that an atomic write has failed, due to a power loss or the like, if the host 114 does not receive an acknowledgment. The host 114, in one embodiment, can back out, reprocess, or otherwise handle failed atomic writes and/or other failed or terminated operations upon recovery once power has been restored.

In one embodiment, a software driver on the host 114 may mark blocks of an atomic write with a metadata flag indicating whether a particular block is part of an atomic write. One example metadata marking is to rely on the log write/append only protocol of the nonvolatile memory 110 together with a metadata flag, or the like. The use of an append only log for storing data and prevention of any interleaving blocks enables the atomic write membership metadata to be a single bit. In one embodiment, the flag bit may be a 0, unless the block is a member of an atomic write, and then the bit may be a 1, or vice versa. If the block is a member of an atomic write and is the last block of the atomic write, in one embodiment, the metadata flag may be a 0 to indicate that the block is the last block of the atomic write. In another embodiment, different hardware commands may be sent to mark different headers for an atomic write, such as first block in an atomic write, middle member blocks of an atomic write, tail of an atomic write, or the like.

On recovery from a power loss or other failure of the host 114 or of the storage device 102, in one embodiment, the storage controller 104, the power management apparatus 122, or the like scans the log on the nonvolatile memory 110 in a deterministic direction (for example, in one embodiment the start of the log is the tail and the end of the log is the head and data is always added at the head). In one embodiment, the power management apparatus 122 scans from the head of the log toward the tail of the log. In other embodiments, the power management apparatus 122 may scan from the tail of the log toward the head of the log, scan once from tail to head and once from head to tail, or otherwise scan the log for recovery purposes. For atomic write recovery, in one embodiment, when scanning head to tail, if the metadata flag bit is a 0, then the block is either a single block atomic write or a non-atomic write block. In one embodiment, once the metadata flag bit changes from 0 to 1, the previous block scanned and potentially the current block scanned are members of an atomic write. The power management apparatus 122, in one embodiment, continues scanning the log until the metadata flag changes back to a 0, at that point in the log, the previous block scanned is the last member of the atomic write and the first block stored for the atomic write.

In one embodiment, the nonvolatile memory 110 uses a log-based, append only write structured writing system where new writes go on the front of the log (i.e. at the head of the log). In a further embodiment, the storage controller 104 reclaims deleted, stale, and/or invalid blocks of the log using a garbage collection system, a groomer, a cleaner agent, or the like. The storage controller 104, in a further embodiment, uses a forward map to map logical block addresses to physical addresses to facilitate use of the append only write structure and garbage collection.

The storage controller 104, in a further embodiment, tracks write operations in process during normal operation of the storage device 102 using a data structure such as an in-flight tree, or the like. An inflight tree, in one embodiment, is a data structure that maintains a record of block storage requests (in particular write requests) that have been received by the storage device 102 but have not yet been completed. The power management apparatus 122, in one embodiment, ensures that for a single block write, the write is guaranteed to complete even if power is lost.

In the depicted embodiment 700, the packetizer 302 includes an incomplete packet 702 and a complete packet 704. In one embodiment, if the incomplete packet 702 is at the end of an atomic data unit, the corruption module 516 may send an acknowledgment for the data in the incomplete packet 702 and the complete packet 704 to the host 114. During power loss mode, in one embodiment, the completion module 518 flushes the incomplete packet 702 from the packetizer 302. As described above, in certain embodiments, the completion module 518 may add a marker indicating the end of valid data in the incomplete packet 702, add padding data to the packet 702, and/or otherwise flush the incomplete packet 702 from the packetizer 302.

In another embodiment, if the complete packet 704 is at the end of an atomic data unit and the incomplete packet 702 is from an incomplete different atomic data unit, the corruption module 516 sends an acknowledgment to the host 114 for the data in the complete packet 704, but does not acknowledge the data of the incomplete packet 702 to the host 114. During power loss mode, in one embodiment, the terminate module 514 may discard the incomplete packet 702 as unacknowledged data, skip one or more operations relating to the incomplete packet 702 as non-essential operations, or the like.

In the depicted embodiment, the write buffer 320 includes one incomplete page 708 and two complete pages 710, 712. In one embodiment, the pages 708, 710, 712 comprise logical pages, as described above. The completion module 518, in one embodiment, flushes one or both of the packets 702, 704 from the packetizer 302, through the ECC generator 304, and to the write buffer 320 during the power loss mode.

In one embodiment, the write buffer 320 writes the complete pages 710, 712 to the nonvolatile memory 110 substantially as normal, even during the power loss mode. In a further embodiment, the terminate module 514 may terminate and/or reset one or more non-essential operations on the nonvolatile memory 110 so that the write buffer 320 can write the complete pages 710, 712 to the nonvolatile memory 110. The completion module 518, in one embodiment, flushes the incomplete page 708 from the write buffer 320 to the nonvolatile memory 110 so that the nonvolatile memory 110 stores the incomplete page 708 within the power hold-up time. As described above, in various embodiments, the completion module 518 may add a marker indicating the end of valid data in the incomplete page 708, add padding data to the incomplete page 708, and/or otherwise flush the incomplete page 708 from the write buffer 320.

Figure 8:
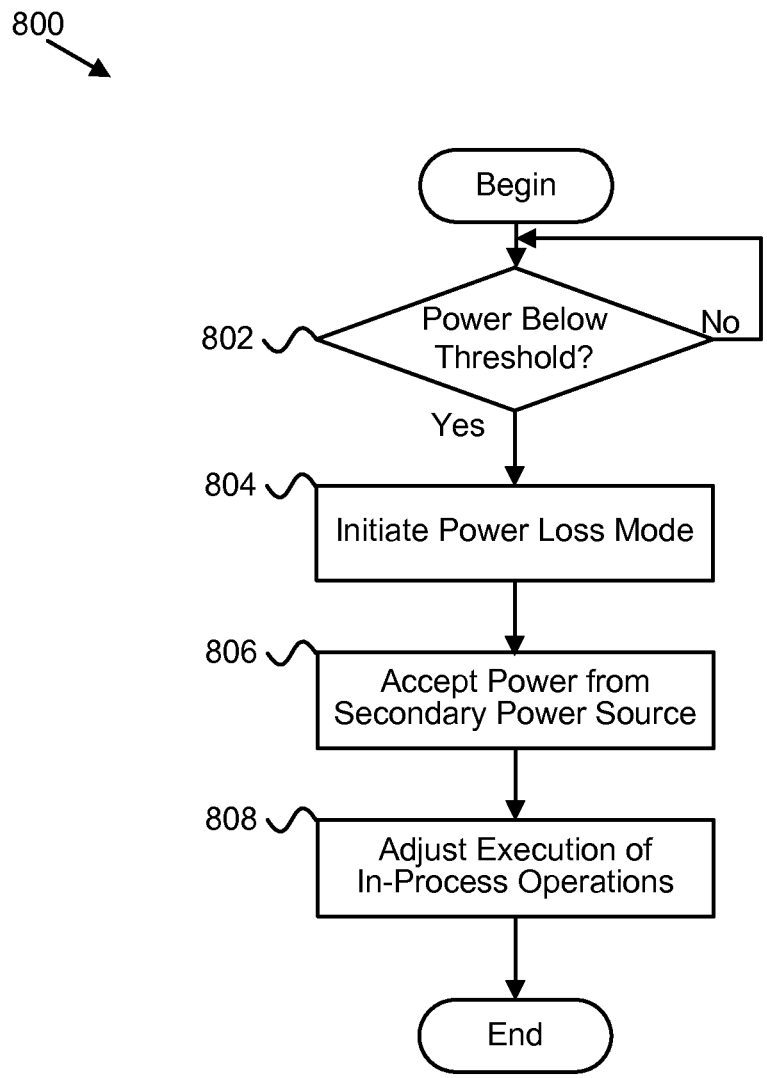
FIG. 8 is a schematic flow chart diagram illustrating one embodiment of a method for improved data handling in the event of an unexpected power failure.

FIG. 8 depicts one embodiment of a method 800 for power loss management in a storage device 102. The method 800 begins, and the monitor module 510 determines 802 whether power from the primary power connection 130 is below the predefined threshold. In the depicted embodiment, if the monitor module 510 determines 802 that power from the primary power connection 130 is not below the predefined threshold, the monitor module 510 continues to monitor 802 the amount of power from the primary power connection 130.

In the depicted embodiment, if the monitor module 510 determines 802 that power from the primary power connection 130 is below the predefined threshold, the monitor module 510 initiates 804 a power loss mode in the storage device 102. The storage device 102 accepts 806 power from the secondary power source 124 for at least a power hold-up time during the power loss mode. The power loss module 520, in the depicted embodiment, adjusts 808 execution of in-process operations on the storage device 102 during the power loss mode so that essential in-process operations execute within the power hold-up time, and the method 800 ends.

Figure 9:
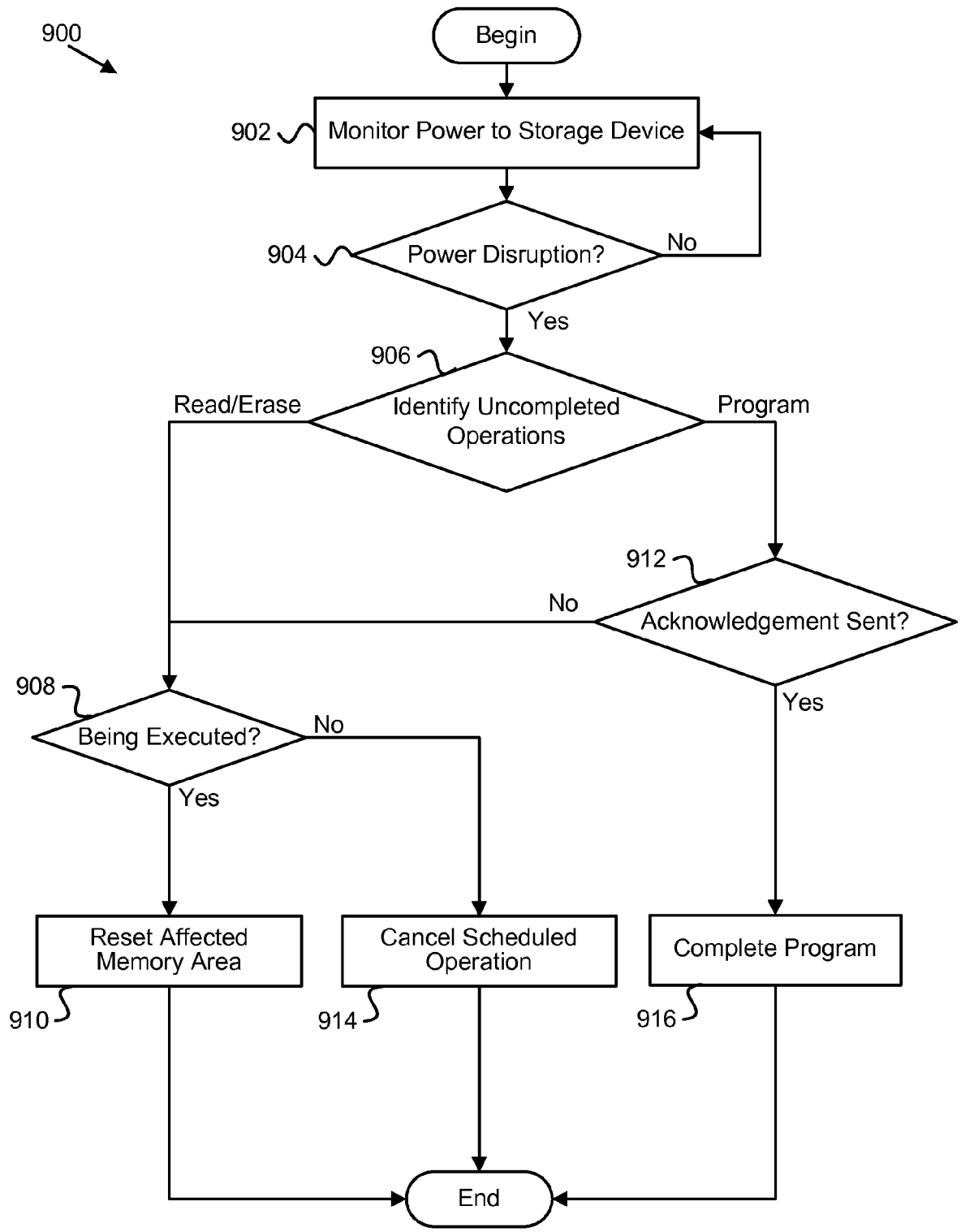
FIG. 9 is a schematic flow chart diagram illustrating another embodiment of a method for improved data handling in the event of an unexpected power failure.

FIG. 9 shows one embodiment of a method 900 for improved storage device operation during a power failure. The method 900 begins with monitoring 902 the power to the storage device 102. In one embodiment, the monitor module 510 monitors the power to the storage device 102. The method 900 also includes determining 904 whether the power to the storage device 102 has been interrupted, falls below a predefined threshold, or the like.

If the power to the storage device 102 has not been interrupted, the monitor module 510 continues monitoring the power to the storage device 102 for interruptions. In the event of an interruption, the method includes identifying 906 the uncompleted operations on the storage device 102. In one embodiment, the identification module 512 identifies 906 the uncompleted operations. In certain embodiments, the identification module 512 deals with only erase operations, read operations, and program operations. In certain embodiments, other types of operations are also identified.

In the embodiment shown, if the uncompleted operations are read or erase operations, the identification module 512 may determine 908 which read operations and erase operations are currently being executed (i.e., those that are currently occurring on the nonvolatile memory 110) and those that are pending. For those read and erase operations that are currently being executed, in one embodiment, the terminate module 514 sends a reset command to reset 910 the affected memory area and cancel the relevant operation. As discussed above, the terminate module 514 may perform these actions according to a priority system, and may also alternatively choose to allow certain operations that are near completion to complete.

If the uncompleted read/erase operations are not currently being executed, the terminate module 514 may simply cause the operations to be canceled 914 or otherwise skipped. For example, the operations may be queued in one or more command queues and awaiting execution. The terminate module 514 may remove read and erase operations from the queue such that they are not executed. The terminate module 514 may alternatively cause the operations to be ignored or skipped; that is, the operations may be left in the queue but not selected for execution. In a further embodiment, the terminate module 514 may ignore one or more non-essential command queues that hold non-essential operations, and select operations for execution from one or more essential command queues that hold essential operations, or the like.

If the uncompleted operation is a program operation, the identification module 512 may determine 912 whether or not an acknowledgement has been sent to the host 114. If the acknowledgement has not been sent, the terminate module 514 may choose to cancel the queued operation or reset the affect memory area as described above. In other embodiments, program operations may be allowed to complete if they are in the storage device 102 regardless of whether or not an acknowledgement has been sent.

If an acknowledgement has been sent, the program operation is allowed 916 to complete. As a result, the data associated with the program operation is moved into nonvolatile memory 110 as reported to the host 114. As discussed above, the corruption module 516 may purge corrupt data from the data write pipeline 106 as part of the method 900. Similarly, the completion module 518 may flush partially filled buffers to ensure that data to be programmed is moved through the data write pipeline 106. As discussed above, the corruption module 516 and/or the completion module 518 may cause an indicator to be set which identifies the corrupt data to the storage device 102.

By reducing the number of operations to be executed by a nonvolatile storage device 102 during a power failure, the size, cost, and complexity of the secondary power supply 124 can be reduced. In certain embodiments, the focus is placed on particularly power hungry/expensive operations such as erases that are less critical but consume considerable power. The system 100 may further distinguish between essential programs (those for which an acknowledgement has been sent to the host 114) and non-essential programs (those for which no acknowledgement has been sent).

Auto-Commit Memory

The systems, methods, and apparatus for power reduction management described above may be leveraged to implement an auto-commit memory capable of implementing memory semantic write operations (e.g., persistent writes) at CPU memory write granularity and speed. As used herein, the term "memory semantic operations," or more generally, "memory operations," refers to operations having a granularity, synchronicity, and access semantics of volatile memory accesses. Memory semantic operations may include, but are not limited to: load, store, peek, poke, write, read, set, clear, and so on. Memory semantic operations may operate at a CPU-level of granularity (e.g., single bytes, words, cache lines, or the like), and may return as soon as the operation is complete (e.g., these are synchronous operations that do not require a completion acknowledgement, or the like). The ACM may be available to computing devices and/or applications (both local and remote) using a PCI-e Base Address Register (BAR), or other suitable mechanism. Accordingly, the ACM may be accessible using memory access semantics, such as CPU load/store, DMA, $3^{rd}$ party DMA, RDMA, atomic test and set, and so on. The direct, memory semantic access to the ACM disclosed herein allows many of the system and/or virtualization layer calls typically required to implement committed operations to be bypassed. (e.g., call backs via asynchronous Input/Output interfaces are bypassed). In some embodiments, an ACM may be mapped to one or more virtual ranges (e.g., virtual BAR ranges, virtual memory addresses, or the like). The virtual mapping may allow multiple computing devices and/or applications to share a single ACM address range 1021 (e.g., access the same ACM simultaneously, within different virtual address ranges).

The ACM may be pre-configured to commit its contents upon detection of a failure condition (or other pre-determined triggering event) and, as such, operations performed on the ACM may be viewed as being "instantly committed." For example, an application may perform a "write-commit" operation on the ACM using memory semantic writes that operate at CPU memory granularity and speed, without the need for corresponding "commit" commands, which may significantly increase the performance of applications affected by write-commit latencies. As used herein, a write-commit operation is an operation in which an application writes data to a memory location (e.g., using a memory semantic access), and then issues a subsequent commit command to commit the operation (e.g., to persistent storage or other commit mechanism). Applications whose performance is based on write-commit latency typically attempt to reduce this latency by leveraging a virtual memory system (e.g., using a memory backed file). In this case, the application performs high-performance memory semantic write operations in system RAM, but, in order to commit the operations, must perform subsequent "commit" commands to persist each write operation to the backing file (or other persistent storage). Accordingly, each write-commit operation may comprise its own separate commit command. For example, in a database logging application, each log transaction must be written and committed before a next transaction is logged. Similarly, messaging systems (e.g., store and forward systems) must write and commit each incoming message, before receipt of the message can be acknowledged. The write-commit latency, therefore, comprises a relatively fast memory semantic write followed by a much slower operation to commit the data to persistent storage. Write commit latency may include several factors including, access times to persistent storage, system call overhead (e.g., translations between RAM addresses, backing store LBA, etc.), and so on. Examples of applications that may benefit from reduced write-commit latency including, but are not limited to: database logging applications, filesystem logging, messaging applications (e.g., store and forward), semaphore primitives, and so on.

The systems, apparatus, and methods for auto-commit memory disclosed herein may be used to significantly increase the performance of write-latency bound applications by providing direct access to a memory region that is guaranteed to be committed in the event of system failure. Accordingly, the write-commit latency of an application may be reduced to the latency of a memory semantic access (a single write over a system bus).

Figure 10:
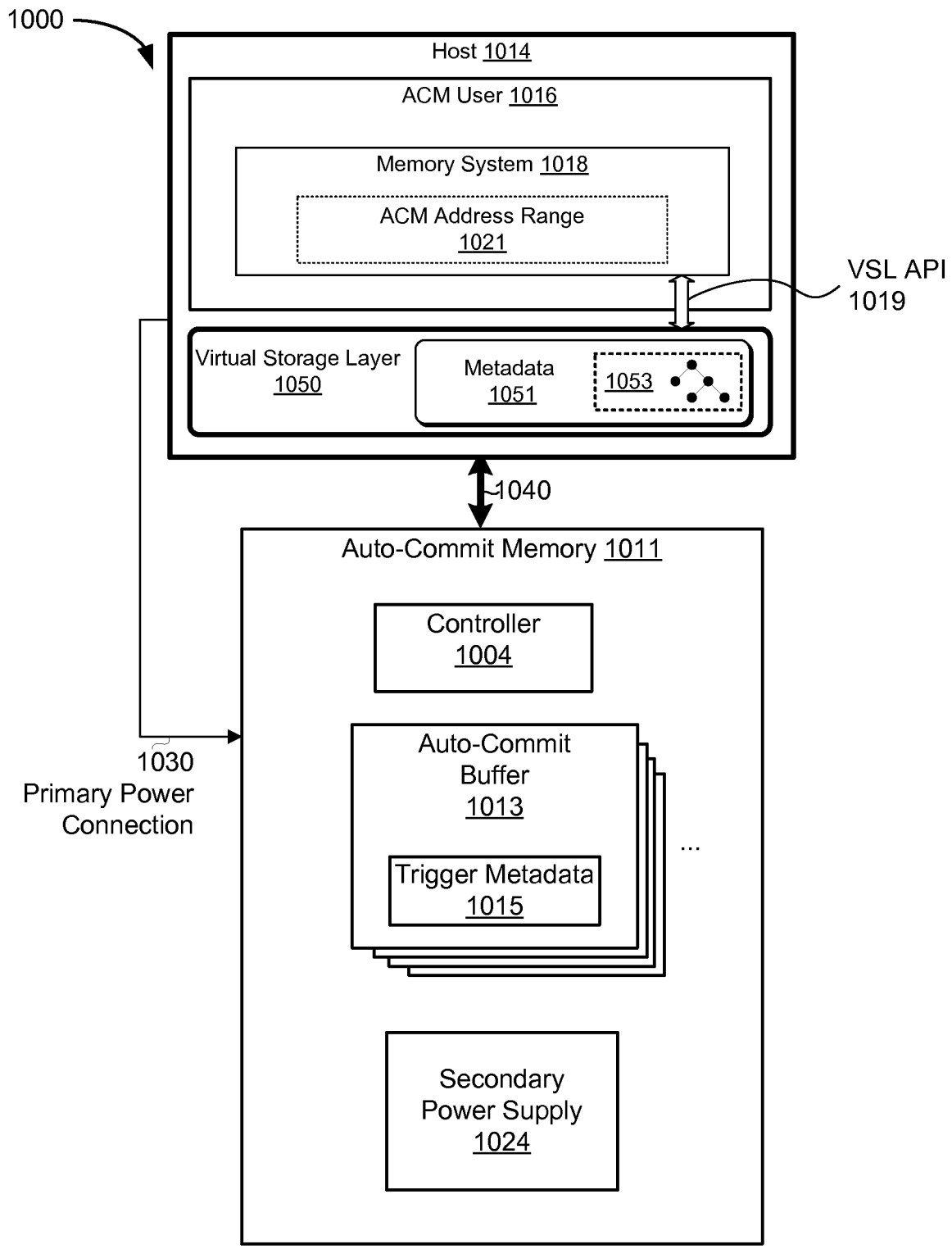
FIG. 10 is a block diagram of one embodiment of an auto-commit memory.

FIG. 10 is a block diagram of a system 1000 comprising one embodiment of an auto-commit memory (ACM) 1011. As used herein, an auto-commit memory refers to fast, volatile memory that is pre-configured to perform one or more automatic, triggered commit actions under certain circumstances (e.g., trigger events, such as failure conditions or other pre-determined events). Accordingly, when data is written to the ACM 1011, it is not "committed" per se; rather, a pre-configured commit of the data is armed, and will be performed if needed. The ACM 1011 may be capable of performing the pre-configured commit action autonomously and with a high degree of assurance, despite the system 1000 experiencing failure conditions. As such, an entity that stores data on the ACM 1011 may consider the data to be "instantaneously committed."

The ACM 1011 may be accessible to one or more computing devices, such as the host 1014. As used herein a computing device (such as the host 1014) refers to a computing device capable of accessing an ACM. The host 1014 may be a computing device that houses the ACM 1011 as a peripheral; the ACM 1011 may be attached to a system bus 1040 of the host 1014. Alternatively, or in addition, the host 1014 may access the ACM 1011 hosted by another computing device. The access may be implemented using any suitable communication mechanism, including, but not limited to: CPU programmed IO (CPIO), port-mapped IO (PMIO), memory-mapped IO (MMIO), a Block interface, a PCI-e bus, Infiniband, RDMA, or the like. The host 1014 may comprise one or more ACM users 1016. As used herein, an ACM user 1016 refers to any operating system (OS), virtual operating platform (e.g., an OS with a hypervisor), a guest OS, application, process, thread, entity, utility, or the like, that is configured to access the ACM 1011.

Since the ACM 1011 is guaranteed to auto-commit the data stored thereon in the event of a failure condition, the host 1014 (or ACM user 1016) may view data written to the ACM 1011 as being instantaneously "committed." The host 1014 may, therefore, write to the ACM 1011 using memory write semantics (and at CPU speeds and granularity), without the need for explicit commit commands by relying on the preconfigured trigger of the ACM 1011 to commit the data in the event of failure (or other condition).

The ACM 1011 may comprise a plurality of auto-commit buffers 1013, each comprising respective trigger metadata 1015. As discussed below, the trigger metadata 1015 may comprise a triggering event of the auto-commit buffer 1013 and/or a logical identifier of data in the ACM buffer 1013. The auto-commit buffers 1013 may be of any suitable size, from a single sector, page, byte, or the like, to a virtual or logical page size (e.g., 80 to 400 kb). The size of the auto-commit buffers 1013 may be adapted according to the storage capacity of the underlying non-volatile storage media, and or hold-up time available from the secondary power supply 1024.

The ACM 1011 is pre-configured or "armed" to implement one or more "triggered commit actions" in response to a failure condition (or other, pre-determined condition). As used herein, a failure condition may include, but is not limited to a failure in a host 1014 computing device, a failure of a component of the host 1014 (e.g., failure of the bus 1040), a software fault (e.g., an fault in software running on the host 1014 or other computing device), a loss of the primary power connection 1030, an invalid shutdown, or the like. As used herein, a triggered commit action is a pre-configured commit action that is armed to be performed by the ACM 1011 in the event of a triggering event (e.g., a failure event, or other pre-determined event). A triggered commit action may be "armed" when the ACM 1011 is requested and/or a particular ACM buffer 1013 is allocated for use by a host 1014. In some embodiments, an ACM 1011 may be configured to implement a triggered commit action in response to other, non-failure conditions. For example, an operation directed to a particular logical address (e.g., a poke), may trigger the ACM 1011. This type of triggering may be used to commit the data of the ACM 1011 during normal operation (e.g., non-failure).

The arming may occur when an auto-commit buffer 1013 is mapped into the memory system 1018 of the host 1014. Alternatively, arming may occur as a separate operation. As used herein, arming an auto-commit buffer 1013 comprises performing the necessary configuration steps needed to complete the triggered action when the action is triggered. In certain embodiments, arming further includes verifying the arming data (e.g., verifying that the contents of the auto-commit buffer 1013, or portion thereof, can be committed as specified in the arming metadata) and verifying that the ACM 1011 is capable and configured to properly perform the triggered action without error or interruption. The verification may ensure that once armed, the ACM 1011 can implement the triggered commit action when required. If the arming metadata cannot be verified (e.g., the logical identifier or other metadata is invalid, corrupt, unavailable, or the like), the arming operation may fail; memory semantic operations on the auto-commit buffer 1013 may not be allowed unit the auto-commit buffer 1013 is successfully armed with valid metadata 1015. For example, an auto-commit buffer 1013 that is backed by a hard disk having a one-to-one mapping between LBA and physical address, may fail to arm if the LBA provided for the arming operation does not map to a valid (and operational) physical address on the disk. Verification in this case may comprise querying the disk to determine whether the LBA has a valid, corresponding physical address and/or using the physical address as the arming metadata 1015 of the auto-commit buffer 1013.

The armed triggered commit actions are implemented in response to the ACM 1011 (or other entity) detecting a triggering event, such as a failure condition. In some embodiments, an armed commit action is a commit action that can be performed by the ACM 1011, and that requires no further communication with the host 1014 or other devices external to the "isolation zone" of the ACM 1011 (discussed below). Accordingly, the ACM 1011 may be configured to implement triggered commit actions autonomously of the host 1014 and/or other components thereof. The ACM 1011 may "guarantee" that triggered commit actions can be committed without errors and/or despite external error conditions. Accordingly, in some embodiments, the triggered commit actions of the ACM 1011 do not comprise and/or require potentially error-introducing logic, computations, and/or calculations. In some embodiments, a triggered commit action comprises committing data stored on the volatile ACM 1011 to a persistent storage location. The ACM 1011 may be capable of implementing pre-configured triggered commit actions autonomously; the ACM 1011 may be capable of implementing triggered commit actions despite failure conditions in the host 1014, loss of primary power, or the like. The ACM 1011 can implement triggered commit actions independently due to arming the ACM 1011 as described above.

The ACM 1011 is communicatively coupled to a host 1014, which, like the host 114 described above, may comprise operating systems, virtual machines, applications, a processor, a central processing unit (CPU), and the like. In the FIG. 10 example, these entities are referred to generally as ACM users 1016. Accordingly, as used herein, an ACM user may refer to an operating system, a virtual operating system (e.g., hypervisor), an application, a library, a CPU fetch-execute algorithm, or other program or process. The ACM 1011 may be communicatively coupled to the host 1014 (as well as the ACM users 1016) via a bus 1040, such as a system bus, a processor's memory exchange bus, or the like (e.g., Hyper-Transport, QuickPath Interconnect (QPI), PCI bus, PCI-e bus, or the like). In some embodiments, the bus 1040 comprises the primary power connection 1030 (e.g., the solid-state storage device 1102 may be powered through the bus 1040). Although some embodiments described herein comprise solid-state storage devices, such as solid-state storage device 1102, the disclosure is not limited in this regard, and could be adapted to use any suitable non-volatile storage device and/or non-volatile storage media. As used herein, "non-volatile storage medium" refers to any suitable persistent storage medium including, but not limited to: solid-state storage media, magnetic storage media, optical storage media, or the like.

The ACM 1011 may be tightly coupled to the device used to perform the triggered commit actions. For example, the ACM 1011 may be implemented on the same device, peripheral, card, or within the same "isolation zone" as the controller 1004 and/or secondary power source 1024. The tight coupling of the ACM 1011 to the components used to implement the triggered commit actions defines an "isolation zone," which may provide an acceptable level of assurance (based on industry standards or other metric) that the ACM 1011 is capable of implementing the triggered auto-commit actions in the event of a failure condition. In the FIG. 10 example, the isolation zone of the ACM 1011 is provided by the tight coupling of the ACM 1011 with the autonomous controller 1004 and secondary power supply 1024 (discussed below).

The controller 1004 may comprise an I/O controller, such as a network controller (e.g., a network interface controller), storage controller, dedicated failure condition controller, or the like. The controller 1004 may comprise firmware, hardware, a combination of firmware and hardware, or the like. In the FIG. 10 example, the controller 1004 comprises a storage controller, such as the storage controller 104 and/or solid-state storage device controller 202 described above. The controller 1004 may be configured to operate independently of the host 1014. As such, the controller 1004 may be used to implement the triggered commit action(s) of the ACM 1011 despite the failure conditions discussed above, such as failures in the host 1014 (and/or ACM users 1016) and/or loss of the primary power connection 1030.

The ACM 1011 is powered by a primary power connection 1030, which, like the primary power connection 130 described above, may be provided by a system bus (bus 1040), external power supply, the host 1014, or the like. The ACM 1011 also includes and/or is coupled to a secondary power source 1024. The secondary power source 1024 may power the ACM 1011 in the event of a failure to the primary power connection 1030. The secondary power source 1024 may be capable of providing at least enough power to enable the ACM 1011 and/or controller 1004 to autonomously implement pre-configured triggered commit action(s) when the primary power connection 1030 has failed.

The ACM 1011 may comprise volatile memory storage. In the FIG. 10 example, the ACM 1011 includes one or more auto-commit buffers 1013. The auto-commit buffers 1013 may be implemented using a volatile Random Access Memory (RAM). In some embodiments, the auto-commit buffers 1013 may be embodied as independent components of the ACM 1011 (e.g., in separate RAM modules). Alternatively, the auto-commit buffers 1013 may be implemented on embedded volatile memory available within the controller 1004, a processor, an FPGA, or other component of the ACM 1011.

Each of the auto-commit buffers 1013 may be pre-configured (armed) with a respective triggered commit action. In some embodiments, each auto-commit buffer 1013 may comprise its own, respective trigger commit action metadata 1015. The metadata 1015, in some embodiments, identifies how and/or where the data stored on the auto-commit buffer 1013 is to be committed. In some examples, the trigger metadata 1015 may comprise a logical identifier (e.g., an object identifier, logical block address, file name, or the like) associated with the data in the auto-commit buffer 1013. When an auto-commit buffer 1013 is committed, the data therein may be committed with the metadata 1015 (e.g., the data may be stored at a physical storage location corresponding to the logical identifier and/or in association with the logical identifier). In some embodiments, the metadata 1015 may comprise a network address or other identifier of a commit location for the data.

As described above, the ACM 1011 may be tightly coupled with the components used to implement the triggered commit actions (e.g., the ACM 1011 is implemented within an "isolation zone"), which ensures that the data on the ACM 1011 will be committed in the event of a failure condition. As used herein, a "tight coupling" refers to a configuration wherein the components used to implement the triggered commit actions of the ACM 1011 are within the same "isolation zone" and are configured to operate despite external failure conditions, such as the loss of power, invalid shutdown, host 1014 failures, or the like. FIG. 10 illustrates a tight coupling between the ACM 1011, the controller 1004, which is configured to operate independently of the host 1014, and the secondary power source 1024, which is configured to power the controller 1004 and the ACM 1011 (including the auto-commit buffers 1013) while the triggered commit actions are completed. Examples of a tight coupling include but are not limited to including the controller 1004, the secondary power source 1024, and the auto-commit buffers 1013 on a single printed circuit board (PCB), within a separate peripheral in electronic communication with the host 1014, and the like. In other embodiments, the ACM 1011 may be tightly coupled to other a different set of components (e.g., redundant host devices, redundant communication buses, redundant controllers, alternative power supplies, and so on).

The ACM 1011 may be accessible by the host 1014 and/or ACM users 1016 running thereon. Access to the ACM 1011 may be provided using memory access semantics, such as CPU load/store commands, DMA commands, 3rd party DMA commands, RDMA commands, atomic test and set commands, and so on. In some embodiments, memory semantic access to the ACM 1011 is implemented over the bus 1040 (e.g., using a PCI-e BAR as described below).

In a memory semantic paradigm, ACM users 1016 running on the host 1014 may access the ACM 1011 via a memory system 1018 of the host 1014. The memory system 1018 may comprise a virtual memory system, virtual memory manager, virtual memory subsystem (or similar memory address space) implemented by an operating system, a virtualization system (e.g., hypervisor), an application, or the like. A portion of the ACM 1011 (e.g., one or more auto-commit buffers 1013) may be mapped into the memory system 1018, such that memory semantic operations implemented within the mapped memory address range (ACM address range 1021) are implemented performed on the ACM 1011.

In some embodiments, establishing an association between an ACM address range 1021 within the memory system 1018 and the ACM 1011 may comprise pre-configuring (arming) the corresponding auto-commit buffer(s) 1013 with a triggered commit action. As described above, this pre-configuration may comprise associating the auto-commit buffer 1013 with a logical identifier, which may be stored in the trigger metadata 1015 of the buffer 1013. As described above, the ACM 1011 may be configured to commit the buffer data to the specified logical identifier in the event of a failure condition.

Memory semantic access to the ACM 1011 may be implemented using any suitable address and/or device association mechanism. In some embodiments, memory semantic access is implemented by mapping one or more auto-commit buffers 1013 of the ACM 1011 into the memory system 1018 of the host 1014. In some embodiments, this mapping may be implemented using the bus 1040. For example, the bus 1040 may comprise a PCI-e (or similar) communication bus, and the mapping may comprise associating a Base Address Register (BAR) of an auto-commit buffer 1013 of the ACM 1011 on the bus 1040 with the ACM address range 1021 in the memory system 1018 (e.g., the host 1014 mapping a BAR into the memory system 1018). The association may be implemented by an ACM user 1016 (e.g., by a virtual memory system of an operating system or the like), through an API of a storage layer, such as the virtual storage layer (VSL) 1050. The VSL 1050 may be configured to provide access to the auto-commit memory 1011 to ACM users 1016. The virtual storage layer 1050 may comprise a driver, kernel-level application, user-level application, library, or the like. The VSL 1050 may provide a VSL API 1019 comprising, inter alia, an API for mapping portions of the auto-commit memory 1011 into the memory system 1018 of the host 1014. The VSL 1050 may be configured to maintain metadata 1051, which may include a forward index 1053 comprising associations between logical identifiers of a logical address space and physical storage locations on the auto-commit memory 1011 and/or persistent storage media. In some embodiments, ACM 1011 may be associated with one or more virtual ranges that map to different address ranges of a BAR (or other addressing mechanism). The virtual ranges may be accessed (e.g., mapped) by different ACM users 1016. Mapping or exposing a PCIe ACM BAR to the host memory 1018 may be enabled on demand by way of a VSL API 1019 call.

The VSL API 1019 may comprise interfaces for mapping an auto-commit buffer 1013 into the memory system 1018. In some embodiments, the VSL API 1019 may extend existing memory management interfaces, such as malloc, calloc, or the like, to map auto-commit buffers 1013 into the virtual memory range of ACM user applications 1016 (e.g., a malloc call through the VSL API 1019 may map one or more auto-commit buffers 1013 into the memory system 1018). Alternatively, or in addition, the VSL API 1019 may comprise one or more explicit auto-commit mapping functions, such as "ACM_alloc," "ACM_free," or the like. Mapping an auto-commit buffer 1013 may further comprise configuring a memory system 1018 of the host to ensure that memory operations are implemented directly on the auto-commit buffer 1013 (e.g., prevent caching memory operations within a mapped ACM address range 1021).

The association between the ACM address range 1021 within the host memory system 1018 and the ACM 1011 may be such that memory semantic operations performed within a mapped ACM address range 1021 are implemented directly on the ACM 1011 (without intervening system RAM, or other intermediate memory, in a typical write commit operation, additional layers of system calls, or the like). For example, a memory semantic write operation implemented within the ACM address range 1021 may cause data to be written to the ACM 1011 (on one or more of the auto-commit buffers 1013). Accordingly, in some embodiments, mapping the ACM address range 1021 may comprise disabling caching of memory operations within the ACM address range 1021, such that memory operations are performed on an ACM 1011 and are not cached by the host (e.g., cached in a CPU cache, in host volatile memory, or the like). Disabling caching within the ACM address range 1021 may comprise setting a "non-cacheable" flag attribute associated with the ACM range 1021, when the ACM range 1021 is defined.

As discussed above, establishing an association between the host memory system 1018 and the ACM 1011 may comprise "arming" the ACM 1011 to implement a pre-determined triggered commit action. The arming may comprise providing the ACM 1011 with a logical identifier (e.g. a logical block address, a file name, a network address, a stripe or mirroring pattern, or the like). The ACM 1011 may use the logical identifier to arm the triggered commit action. For example, the ACM 1011 may be triggered to commit data to a persistent storage medium using the logical identifier (e.g., the data may be stored at a physical address corresponding to the logical identifier and/or the logical identifier may be stored with the data in a log-based data structure). Arming the ACM 1011 allows the host 1014 to view subsequent operations performed within the ACM address range 1021 (and on the ACM 1011) as being "instantly committed," enabling memory semantic write granularity (e.g., byte level operations) and speed with instant commit semantics.

Memory semantic writes such as a "store" operation for a CPU are typically synchronous operations such that the CPU completes the operation before handling a subsequent operation. Accordingly, memory semantic write operations performed in the ACM memory range 1021 can be viewed as "instantly committed," obviating the need for a corresponding "commit" operation in the write-commit operation, which may significantly increase the performance of ACM users 1016 affected by write-commit latency. The memory semantic operations performed within the ACM memory range 1021 may be synchronous. Accordingly, ACM 1011 may be configured to prevent the memory semantic operations from blocking (e.g., waiting for an acknowledgement from other layers, such as the bus 1040, or the like). Moreover, the association between ACM address range 1021 and the ACM 1011 allow memory semantic operations to bypass system calls (e.g., separate write and commit commands and their corresponding system calls) that are typically included in write-commit operations.

Data transfer between the host 1014 and the ACM 1011 may be implemented using any suitable data transfer mechanism including, but not limited to: the host 1014 performing processor IO operations (PIO) with the ACM 1011 via the bus 1040; the ACM 1011 (or other device) providing one or more DMA engines or agents (data movers) to transfer data between the host 1014 and the ACM 1011; the host 1014 performing processor cache write/flush operations; or the like.

Figure 11:
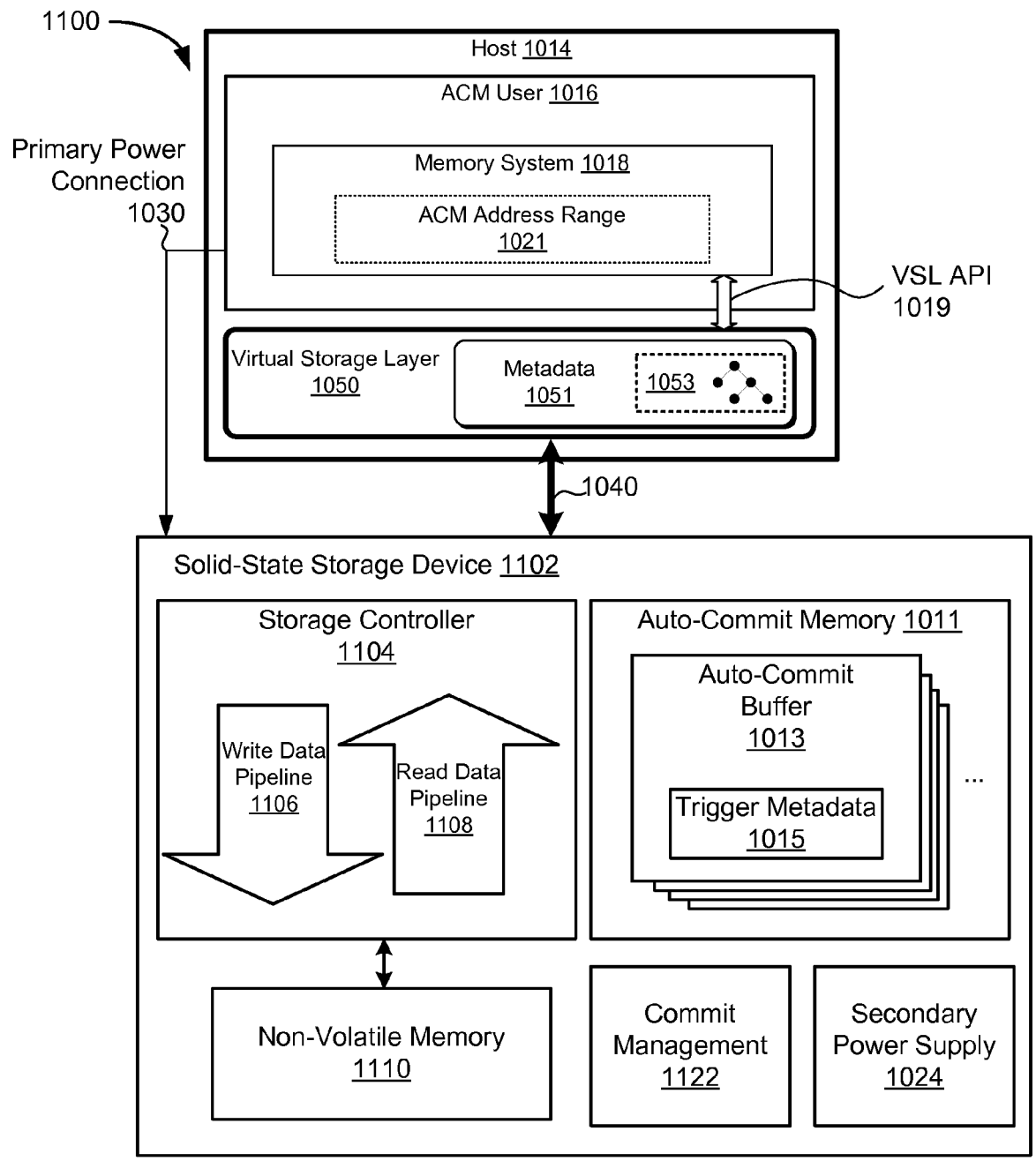
FIG. 11 is a block diagram of another embodiment of an auto-commit memory.

As discussed above, an ACM may be configured to automatically perform a pre-configured triggered commit action in response to detecting certain conditions (e.g., failure conditions). In some embodiments, the triggered commit action may comprise committing data stored on the ACM 1014 to a persistent storage media. Accordingly, in some embodiments, an ACM, such as the ACM 1011 described above, may be comprise persistent storage media. FIG. 11 is a block diagram of a system 1100 depicting an embodiment of an ACM configured to implement triggered commit actions, which may include committing data to a persistent solid-state storage.

The ACM 1111 of the FIG. 11 example may be tightly coupled to the solid-state storage device 1102, which comprises a controller 1104. The controller 1104 may comprise a write data pipeline 1106 and a read data pipeline 1108, which may operate as described above. The solid-state storage device 1102 may be capable of persisting data on a non-volatile memory 1110, such as solid-state storage media.

A commit management apparatus 1122 is used to commit data to the non-volatile memory 1110 in response to a trigger event, such as loss of primary power connection, or other pre-determined trigger event. Accordingly, the commit management apparatus 1122 may comprise and/or be configured to perform the functions of the power management apparatus 122 described above. The commit management apparatus 1122 may be further configured to commit data on the ACM 1111 (e.g., the contents of the auto-commit buffers 1013) to the non-volatile memory 1110 in response to a failure condition (or on request from the host 1014 and/or ACM users 1016) and in accordance with the trigger metadata 1015. The data on the ACM 1111 may be committed to the persistent storage 1110 in accordance with the logical identifier (e.g., logical block address) specified by the trigger metadata 1015. If the non-volatile memory 1110 is sequential storage device, this may comprise storing the logical identifier with the contents of the auto-commit buffer 1013 (e.g., in a packet or container header). If the non-volatile memory 1110 comprises a hard disk having a 1:1 mapping between logical identifier and physical address, the contents of the auto-commit buffer 1013 are committed to the storage location to which the logical identifier maps. Since the logical identifier associated with the data is pre-configured (e.g., armed) in the metadata 1015, the ACM 1111 implements the triggered commit action independently of the host 1014. The secondary power supply 1024 supplies power to the volatile auto-commit buffers 1013 of the ACM 1111 until the triggered commit actions are completed (and/or confirmed to be completed).

In some embodiments, the ACM 1111 commits data in a way that maintains an association between the data and its corresponding logical identifier (per the metadata 1015). If the non-volatile memory 1110 comprises a hard disk, the data may be committed to a storage location corresponding to the logical identifier, which may be outside of the isolation zone 1301 (e.g., using a logical identifier to physical address conversion). In other embodiments in which the non-volatile memory 1110 comprises a sequential media, such as solid-state storage media, the data may be stored sequentially and/or in a log-based format as described in above and/or in U.S. Provisional Patent Application Publication No. 61/373,271, entitled "APPARATUS, SYSTEM, AND METHOD FOR CACHING DATA," and filed 12 Aug. 2010, which is hereby incorporated by reference in its entirety. The sequential storage operation may comprise storing the contents of an auto-commit buffer 1013 with a corresponding logical identifier (as indicated by the trigger metadata 1015). In one embodiment, the data of the auto-commit buffer 1013 and the corresponding logical identifier are stored together on the media according to a predetermined pattern. In certain embodiments, the logical identifier is stored before the contents of the auto-commit buffer 1013. The logical identifier may be included in a header of a packet comprising the data, or in another sequential and/or log-based format. The association between the data and logical identifier may allow a data index to be reconstructed as described above.

As described above, the auto-commit buffers 1013 of the ACM 1011 may be mapped into the memory system 1018 of the host 1014, enabling the ACM users 1016 of access these buffers 1013 using memory access semantics. In some embodiments, the mappings between logical identifiers and auto-commit buffers 1013 may leverage a virtual memory system of the host 1014.

For example, an address range within the memory system 1018 may be associated with a "memory mapped file." As discussed above, a memory mapped file is a virtual memory abstraction in which a file, portion of a file, or block device is mapped into the memory system 1018 address space for more efficient memory semantic operations on data of the solid-state storage device 1102. An auto-commit buffer 1013 may be mapped into the host memory system 1018 using a similar abstraction. The ACM memory range 1021 may, therefore, be represented by a memory mapped file. The backing file must be stored on the non-volatile memory 1110 within the isolation zone 1301 (See FIG. 13 below) or another network attached solid-state storage device 1102 also protected by an isolation zone 1301. The auto-commit buffers 1013 may correspond to only a portion of the file (the file itself may be very large, exceeding the capacity of the auto-commit buffers 1031 and/or the non-volatile memory 1110). When a portion of a file is mapped to an auto-commit buffer, the ACM user 1016 (or other entity) may identify a desired offset within the file and the range of blocks in the file that will operate with ACM characteristics (e.g. have ACM semantics). This offset will have a predefined logical identifier and the logical identifier and range may be used to trigger committing the auto-commit buffer(s) 1013 mapped within the file. Alternatively, a separate offset for a block (or range of blocks) into the file may serve as a trigger for committing the auto-commit buffer(s) 1013 mapped to the file. For example, anytime a memory operation (load, store, poke, etc.) is performed on data in the separate offset or range of blocks may result in a trigger event that causes the auto-commit buffer(s) 1013 mapped to the file to be committed.

The underlying logical identifier may change, however (e.g., due to changes to other portions of the file, file size changes, etc.). When a change occurs, the VSL 1050 (via the VSL API 1019, an ACM user 1016, or other entity) may update the trigger metadata 1015 of the corresponding auto-commit buffers 1013. In some embodiments, the VSL 1050 may be configured to query the host 1014 (operating system, hypervisor, or other application) for updates to the logical identifier of files associated with auto-commit buffers 1013. The queries may be initiated by the VSL API 1019 and/or may be provided as a hook (callback mechanism) into the host 1014. When the ACM user 1016 no longer needs the auto-commit buffer 1013, the VSL 1050 may de-allocate the buffer 1013 as described above. De-allocation may further comprise informing the host 1014 that updates to the logical identifier are no longer needed.

In some embodiments, a file may be mapped across multiple storage devices (e.g., the storage devices may be formed into a RAID group, may comprise a virtual storage device, or the like). Associations between auto-commit buffers 1013 and the file may be updated to reflect the file mapping. This allows the auto-commit buffers 1013 to commit the data to the proper storage device. The trigger metadata of the auto-commit buffers may be updated in response to changes to the underlying file mapping and/or partitioning as described above. Alternatively, the file may be "locked" to a particular mapping or partition while the auto-commit buffers are in use 1013. For example, if a remapping/repartitioning of a file is required, the corresponding auto-commit buffers 1013 may commit data to the file, and then be re-associated with the file under the new mapping/partitioning scheme. The VSL API 1019 may comprise interfaces and/or commands for using the VSL 1050 to lock a file, release a file, and/or update trigger metadata 1015 in accordance with changes to a file.

Committing the data to solid-state, non-volatile storage 1110 may comprise the storage controller 1104 accessing data from the ACM 1111 auto-commit buffers 1013, associating the data with the corresponding logical identifier (e.g., labeling the data), and injecting the labeled data into the write data pipeline 1106 as described above. In some embodiments, to ensure there is a page program command capable of persisting the ACM data, the storage controller 1104 maintains two or more pending page programs during operation. The ACM data may be committed to the solid-state non-volatile memory 1110 before writing the power loss identifier (power-cut fill pattern) described above.

Figure 12:
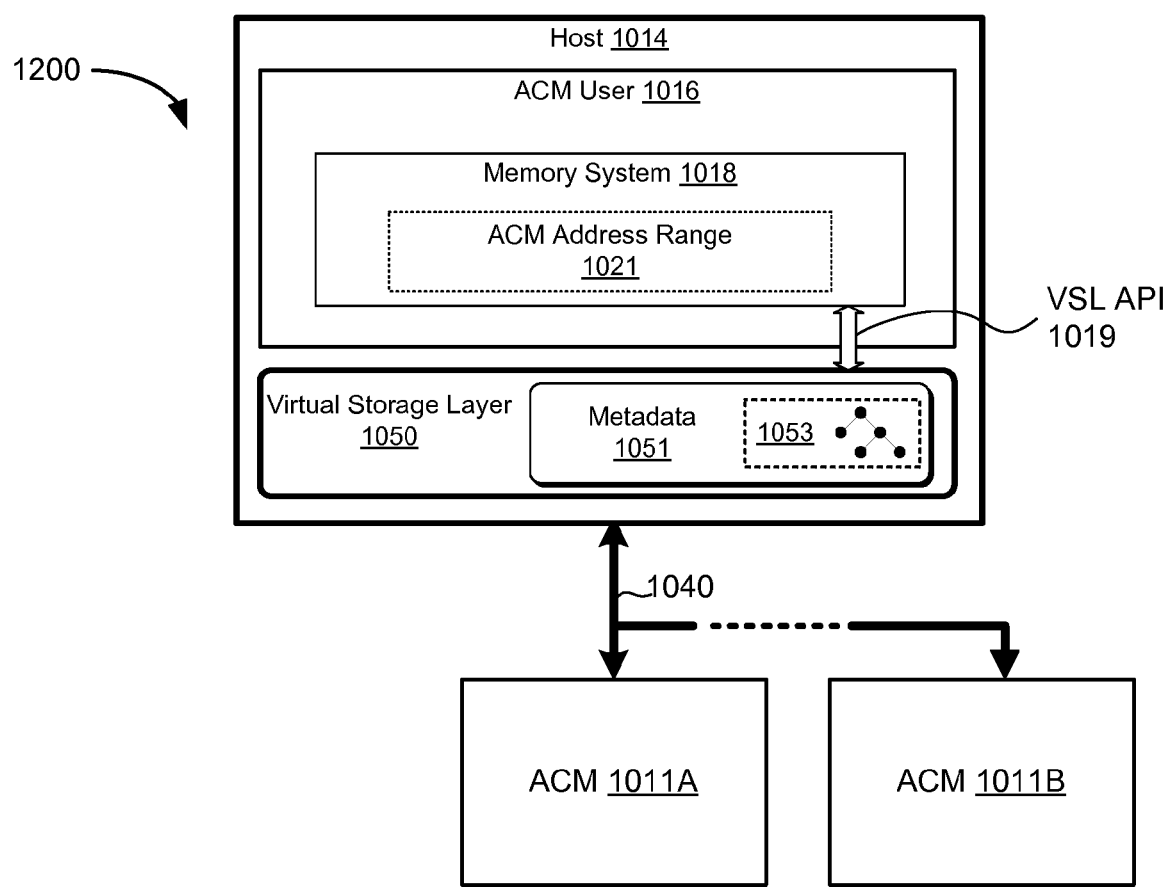
FIG. 12 is a block diagram of a system comprising a plurality of auto-commit memories.

FIG. 12 depicts one embodiment of a system 1200 comprising a plurality of auto-commit memories. In the FIG. 12 example, memory semantic accesses implemented by the host 1014 may be stored on a plurality of ACMs, including 1011A and 1011B. In some embodiments, host data may be mirrored between the ACMs 1011A and 1011B. The mirroring may be implemented using a multi-cast bus 1040. Alternatively, or in addition, one of the ACMs (AM 1011A) may be configured to rebroadcast data to the ACM 1011B. The ACMs 1011A and 1011B may be local to one another (e.g., on the same local bus). Alternatively, the ACMs 1011A and 1011B may located on different systems, and may be communicatively coupled via a bus that supports remove data access, such as Infiniband, a remote PCI bus, RDMA, or the like.

In some embodiments, the ACMs 1011A and 1011B may implement a striping scheme (e.g., a RAID scheme). In this case, different portions of the host data may be sent to different ACMs 1011A and/or 1011B. Driver level software, such as a volume manager implemented by the VSL 1050 and/or operating system 1018 may map host data to the proper ACM per the striping pattern.

In some configurations, the memory access semantics provided by the ACMs may be adapted according to a particular storage striping pattern. For example, if host data is mirrored from the ACM 1011A to the ACM 1011B, a memory semantic write may not complete (and/or an acknowledgement may not be returned) until the ACM 1011A verifies that the data was sent to the ACM 1011B (under the "instant commit" semantic). Similar adaptations may be implemented when ACMs are used in a striping pattern (e.g., a memory semantic write may be not return and/or be acknowledged, until the striping pattern for a particular operation is complete). For example, in a copy on write operation, the ACM 1011A may store the data of an auto-commit buffer, and then cause the data to be copied to the ACM 1011B. The ACM 1011A may not return an acknowledgment for the write operation (or allow the data to be read) until the data is copied to the ACM 1011B.

The use of mirrored ACM devices 1011A and 1011B may be used in a high-availability configuration. For example, the ACM devices 1011A and 1011B may be implemented in separate host computing devices. Memory semantic accesses to the devices 1011A and 1011B are mirrored between the devices as described above (e.g., using PCI-e access). The devices may be configured to operate in high-availability mode, such that device proxying may not be required. Accordingly, trigger operations (as well as other memory semantic accesses) may be mirrored across both devices 1011A and 1011B, but the devices 1011A and 1011B may not have to wait for a "acknowledge" from the other before proceeding, which removes the other device from the write-commit latency path.

Figure 13:
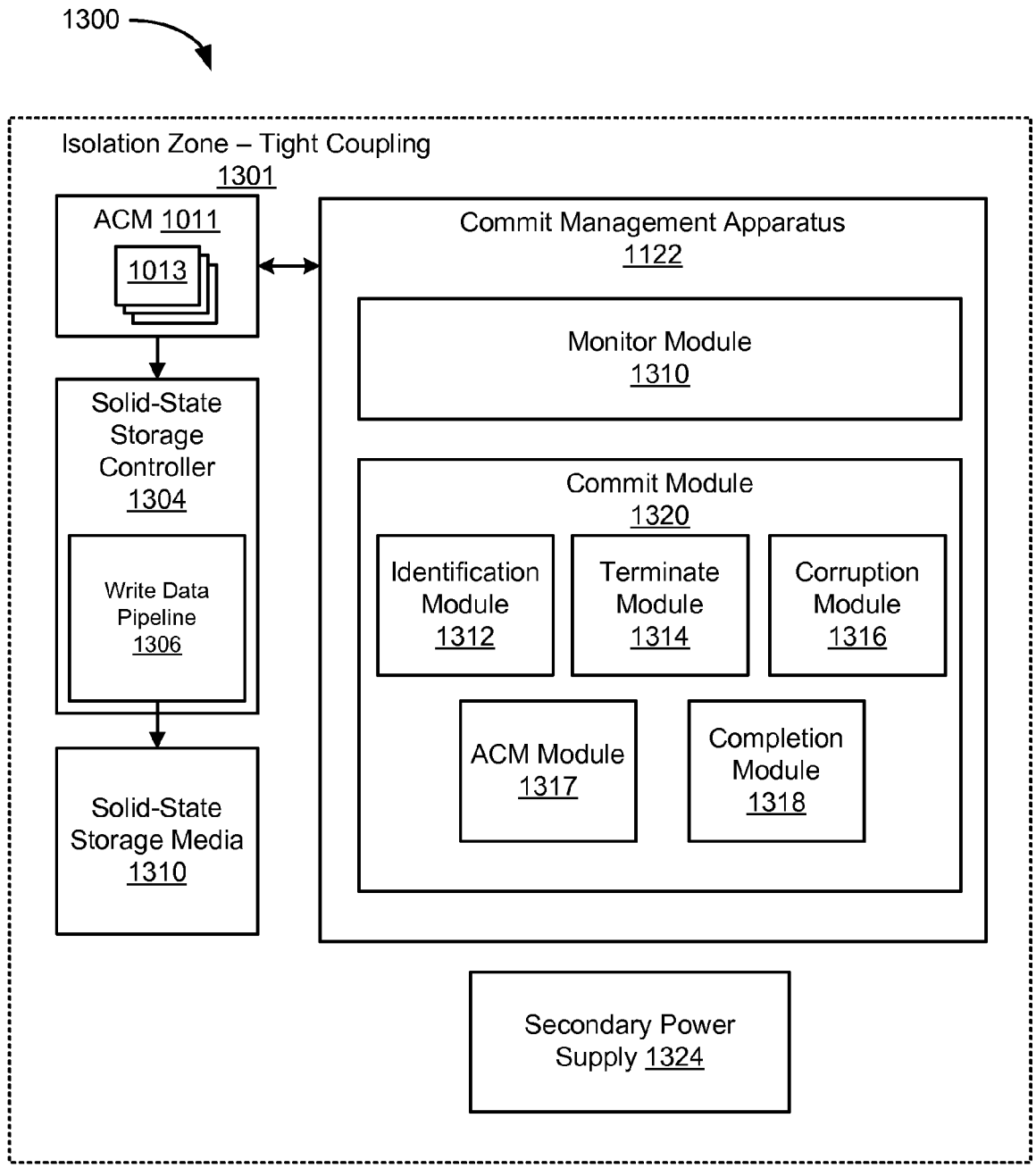
FIG. 13 is a block diagram of an auto-commit memory implemented with a commit management apparatus.

FIG. 13 is a block diagram of a one embodiment 1300 of a commit management apparatus 1122. The commit management apparatus 1122 may be tightly coupled (e.g., within an isolation zone 1301) to the auto-commit memory 1011, the solid-state storage controller 1304, the solid-state storage media 1310, and/or the secondary power supply 1324. The tight coupling may comprise implementing these components 132, 1011, 1304, 1310, and/or 1324 on the same die, the same peripheral device, on the same card (e.g., the same PCB), within a pre-defined isolation zone, or the like. The tight coupling may ensure that the triggered commit actions of the ACM buffers 1013 are committed in the event of a failure condition.

The commit management apparatus 1122 includes a monitor module 1310, which may be configured to detect failure conditions, such as power loss or the like. The monitor module 1310 may be configured to sense triggering events, such as failure conditions (e.g., power failures, communication failures, host or application failures, and so on) and, in response, to initiate the commit module 1320 to initiate the commit loss mode of the apparatus 1122 (failure loss mode) and/or to trigger the operations of other modules, such as modules 1312, 1314, 1316, 1317, and/or 1318. The commit module 1320 includes an identification module 1312, terminate module 1314, corruption module 516, and completion module 1318, which may operate as described above.

The identification module 1312 may be further configured to identify triggered commit actions to be performed for each ACM buffer 1013 of the ACM 1011. As discussed above, the identification module 1312 may prioritize operations based on relative importance, with acknowledged operations being given a higher priority than non-acknowledged operations. The contents of auto-commit buffers 1013 that are armed to be committed may be assigned a high priority due to the "instant commit" semantics supported thereby. In some embodiments, the ACM triggered commit actions may be given a higher priority than the acknowledged contents of the write data pipeline 1306. Alternatively, the contents of armed auto-commit buffers 1013 may be assigned the "next-highest" priority. The priority assignment may be user configurable (via an API, IO control (IOCTRL), or the like).

The termination module 1314 terminates non-essential operations to allow "essential" to continue as described above. The termination module 1314 may be configured to hold up portions of the ACM 1011 that are "armed" to be committed (e.g., armed auto-commit buffers), and may terminate power to non-armed (unused) portions of the auto-commit memory 1011. The termination module 1314 may be further configured to terminate power to portions of the ACM 1011 (individual auto-commit buffers 1013) as the contents of those buffers are committed.

The corruption module 1316 identifies corrupt (or potentially corrupt) data in the write data pipeline 1306 as described above. The module 1316 may be further configured to identify corrupt ACM data 1011 (data that was written to the ACM 1011 during a power disturbance or other failure condition per FIG. 5B above). The corruption module 1316 may be configured to prevent corrupt data on the ACM 1011 from being committed in a triggered commit action.

An ACM module 1317 is configured to access armed auto-commit buffers in the auto-commit memory 1011, identify the trigger metadata associated therewith (e.g., label the data with the corresponding logical identifier per the trigger metadata), and inject the data (and metadata) into the write data pipeline of the solid-state storage controller 1304. In some embodiments, the logical identifier (or other metadata) of the auto-commit buffer 1013 may be stored in the buffer 1013 itself. In this case, the contents of the auto-commit buffer 1013 may be streamed directly into a sequential and/or log-based storage device without first identifying and/or labeling the data. The ACM module 1317 may inject data before or after data currently in the write data pipeline 1306. In some embodiments, data committed from the ACM 1011 is used to "fill out" the remainder of a write buffer of the write data pipeline 1306 (after removing potentially corrupt data). If the remaining capacity of the write buffer is insufficient, the write buffer is written to the solid-state storage 1310, and a next write buffer is filled with the remaining ACM data.

As discussed above, in some embodiments, the solid-state storage controller 1304 may maintain an armed write operation (logical page write) to store the contents of the write data pipeline 1306 in the event of power loss. When used with an ACM 1011, two (or more) armed write operations (logical page writes) may be maintained to ensure the contents of both the write data pipeline 1306, and all the armed buffers 1013 of the ACM 1011 can be committed in the event of a failure condition. Because a logical page in the write buffer 320 may be partially filled when a trigger event occurs, the write buffer 320 is sized to hold at least one more logical page of data than the total of all the data stored in all ACM buffers 1013 of the ACM 1011 and the capacity of data in the write data pipeline that has been acknowledged as persisted. In this manner, there will be sufficient capacity in the write buffer 320 to complete the persistence of the ACM 1011 in response to a trigger event. Accordingly, the auto-commit buffers 1013 may be sized according to the amount of data the ACM 1011 is capable of committing. Once this threshold is met, the VSL 430 may reject requests to use ACM buffers 1013 until more become available.

Figure 14:
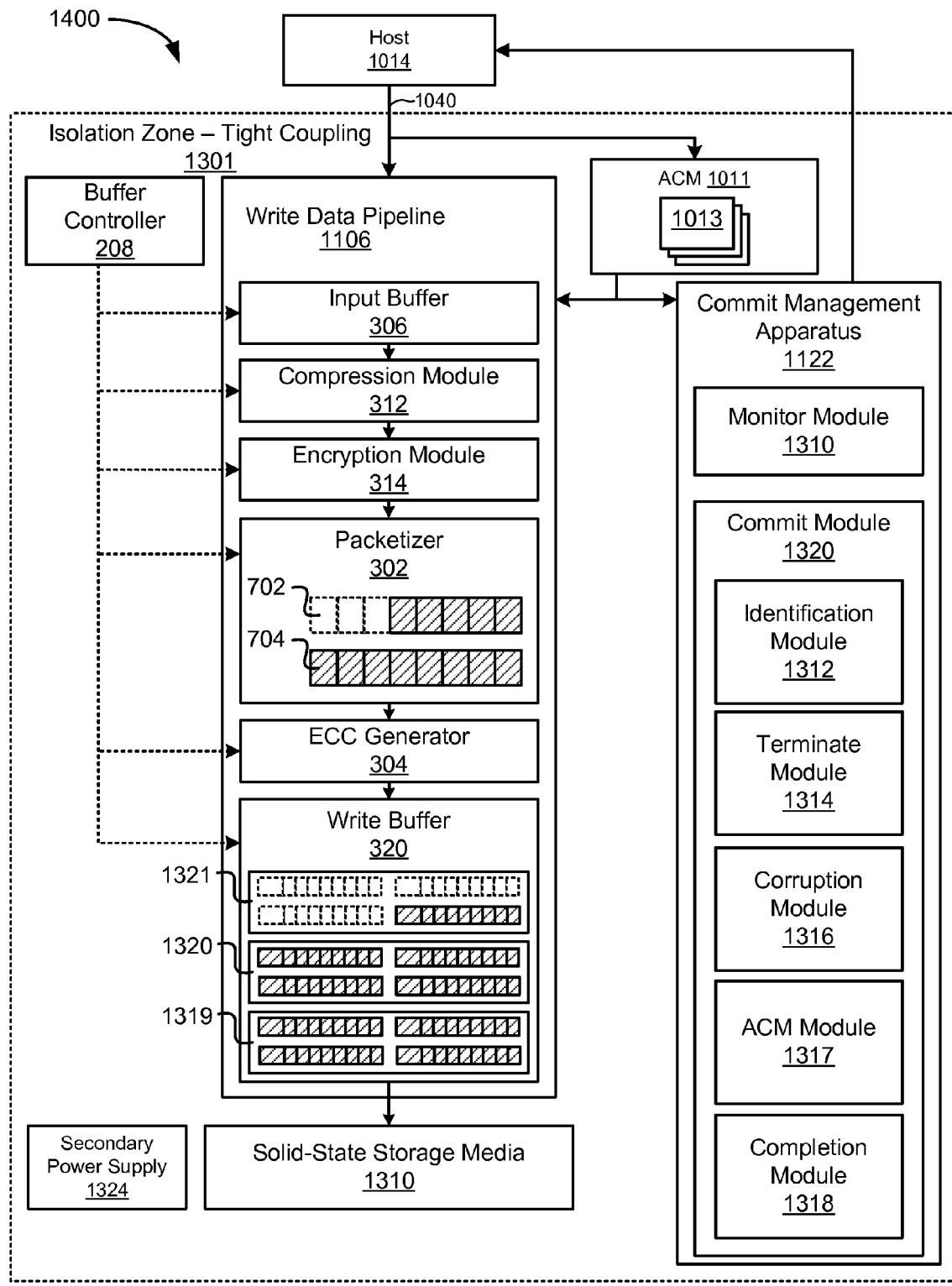
FIG. 14 is a block diagram of another embodiment of an auto-commit memory with a write data pipeline.

In the depicted embodiment of FIG. 14, the write buffer 320 includes one incomplete page 1321 and two complete pages 1320, 1319. In one embodiment, the pages 1321, 1320, 1319 comprise logical pages, as described above. The armed write operations may each correspond to one of the pages 1321, 1320, 1319. The two full pages 1319, 1320 may correspond to two separate auto-commit buffers. The armed write operations/commands are configured to write the pages 1320 and 1319 to the non-volatile storage media 1310 autonomously (without any further need for addressing information or calculations). In some embodiments, the pages 1320 and 1319 may be written using only components within the isolation zone 1301 of the ACM 1011. The partially filled page 1321 may comprise data in the pipeline at the time the failure condition occurred.

The completion module 1318 is configured to flush the write data pipeline regardless of whether the certain buffers, packets, and/or pages are completely filled. The completion module 1318 is configured to perform the flush (and insert the related padding data) after data on the ACM 1011 (if any) has been injected into the write data pipeline 1306. The completion module 1318 may be further configured to inject completion indicator into the write data pipeline, which may be used to indicate that a failure condition occurred (e.g., a failure condition fill pattern). This fill pattern may be included in the write data pipeline 1306 after injecting the triggered data from the ACM 1011.

As discussed above, the secondary power supply 1324 may be configured to provide sufficient power to store the contents of the ACM 1011 as well as data in the write data pipeline 1306. Storing this data may comprise one or more write operations (e.g., page program operations), in which data is persistently stored on the solid-state storage media 1310. In the event a write operation fails, another write operation, on a different storage location, may be attempted. The attempts may continue until the data is successfully persisted on the solid-state storage media 1310. The secondary power supply 1324 may be configured to provide sufficient power for each of a plurality of such page program operations to complete. Accordingly, the secondary power supply 1324 may be configured to provide sufficient power to complete double (or more) page program write operations as required to store the data of the ACM 1011 and/or write data pipeline 1306.

FIG. 14 is a block diagram depicting a system 1400 comprising an auto-commit memory. The host 1014 may perform storage operations (write data) to the solid-state storage media 1310 via the storage bus 1040 and through the write data pipeline 1106 of a solid-state storage controller. The host 1014 also writes data to ACM buffers 1013 of the ACM 1011 using memory access semantics (and also through the storage bus 1040, by e.g., mapping a BAR of the bus 1040 into the address space of the host 1014). The commit management apparatus 1122 (and monitor module 1310) monitor the host 1014 (and other system components, not shown) for failure conditions. When a failure condition is detected, the monitor module 1310 implements the commit module 1320 as described above.

The ACM module 1317 identifies triggered auto-commit buffers 1013 of the ACM 1011, labels the data with a corresponding logical identifier (per trigger metadata), and injects the labeled data into the write data pipeline 1106 as described above. The data of the armed ACM buffers 1013 may be injected according to a relative priority determined by the identification module 1312.

As discussed above, the completion module 1318 flushes data through partially filled buffers in the write data pipeline 1106 during a failure mode. The completion module 1318 may fill-out the partially filled buffers with padding data, which may include a failure-mode indicator. The padding data and/or indicator may be included after triggered data in the ACM 1011 has been streamed into the write data pipeline 1106. The ACM data may be used to fill-out incomplete packets (e.g., 702) in the write data pipeline.

If the remaining capacity of the write buffer 320 is insufficient to store the triggered ACM data, the write buffer 320 is committed to the solid-state storage media 1310, and a next write buffer 320 is filled with the ACM data. Accordingly, whereas the solid-state storage controller of the write data pipeline 1106 may comprise a continuously armed write operation (sufficient to commit the write buffer 320), when used with the ACM 1011, two or more write operations may be continuously armed. The number of continuously armed write operations may be adapted according to the capacity of the ACM 1011 (e.g., if the ACM 1011 could include enough triggered data to fill two (2) additional write operations, three (or more) write operations may be continuously armed). As discussed above, the secondary power supply 1324 may be configured to provide sufficient power to complete the required write operations. In some embodiments, the secondary power supply 1324 may be capable of supplying power for additional write operations to allow for one or more "retries," of failed write operations to the solid-state storage media 1310. In some embodiments, two or more write operations may occur simultaneously (e.g., concurrently on separate banks of the solid-state storage media 1310, as described above). The simultaneous write operations may reduce the hold-up time required to commit data of the ACM 1011 to the solid-state storage media 1310. Alternatively, or in addition, certain write operations may occur in parallel. For example, while a first write operation is taking place, a second write operation may be in progress (e.g., data of a second write operation may be streaming to write or programming buffers of the solid-state storage media 1310, while a first write operation is in progress), which may similarly reduce hold-up time requirements. As depicted in FIG. 14, the ACM 1011, commit management apparatus 1122, write data pipeline 1106, solid-state storage media 1310, and secondary power supply 1324 are tightly coupled in a "isolation zone" 1401. The tight coupling within isolation zone 1401 may isolate the ACM 1011 (and related components) from external failure conditions, which may ensure that the triggered data on the ACM buffers 1013 is committed to the solid-state storage media 1310 in the event of a failure. This assurance may be relied upon by the host 1014 (and/or applications implemented thereon) to treat memory semantic operations performed on the ACM buffers 1013 as "instantly committed."

Figure 15:
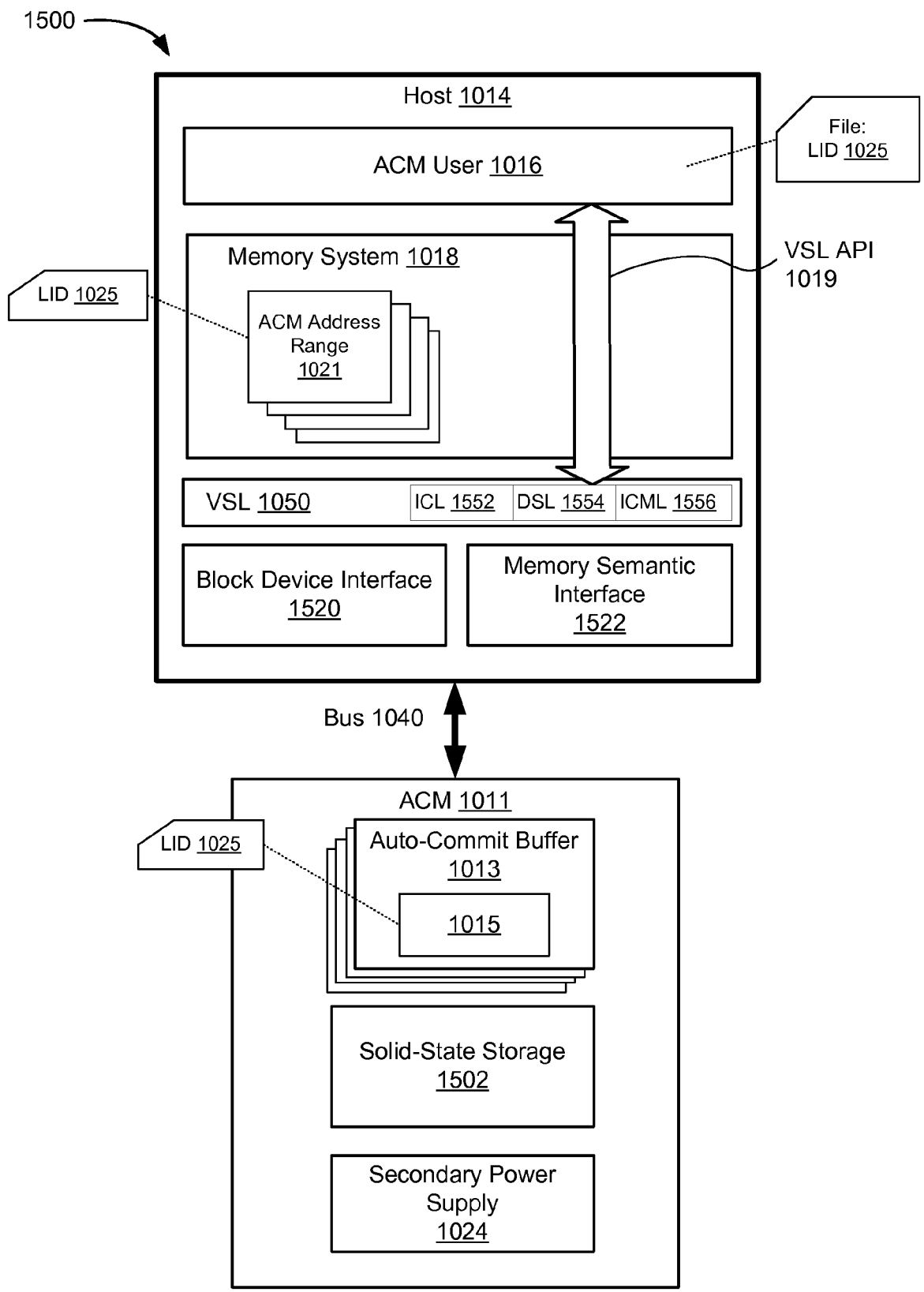
FIG. 15 is a block diagram of another embodiment of a system comprising an auto-commit memory.

FIG. 15 is a block diagram 1500 depicting a host computing device 1014 accessing an ACM using memory access semantics. The host computing device 1014 may comprise a processor (CPU 1013), which may include, but is not limited to, a general purpose processor, an application-specific processor, a reconfigurable processor (FPGA), a combination of processors, or the like. One or more ACM users 1016 (e.g., operating systems, applications, and so on) operate on the host 1014.

The host 1014 may be communicatively coupled to the ACM 1011 via a bus 1040, which may comprise a PCI-e bus, or the like. Portions of the ACM 1011 are made accessible to the host 1014 may mapping in auto-commit buffers 1013 into the host 1014. In some embodiments, mapping comprises associating an address range within the host memory system 1018 with an auto-commit buffer 1013 of the ACM 1011. These associations may be enabled using the VSL API 1019 and/or VSL 1050 available on the host 1014.

The VSL 1050 may comprise libraries and/or provide interfaces (e.g., VSL API 1019) to implement the memory access semantics described above. The API 1019 may be used to access the ACM 1011 using memory access semantics via a memory semantic access module 1522. Other types of access, such as access to the solid-state storage 1502, may be provided via a block device interface 1520.

The VSL 1050 may be configured to memory map auto-commit buffers 1013 of the ACM 1011 into the memory system 1018 (via the VSL API 1019). The memory map may use a virtual memory abstraction of the memory system 1018. For example, a memory map may be implemented using a memory mapped file abstraction. In this example, the operating system (or application) 1016 designates a file to be mapped into the memory system 1018. The file is associated with a logical identifier 1025 (e.g., logical block address), which may be maintained by a file system, an operating system 1016, or the like.

The memory mapped file may be associated with an auto-commit buffer 1013 of the ACM 1013. The association may be implemented by the VSL 1050 using the bus 1040. The VSL 1050 associates the address range of the memory mapped file (in the memory system 1018) with a device address of an auto-commit buffer 1013 on the ACM 1011. The association may comprise mapping a PCI-e BAR into the memory system 1018. In the FIG. 15 example, the ACM address range 1021 in the memory system 1018 is associated with the auto-commit buffer 1013.

As discussed above, providing memory access semantics to the ACM 1011 may comprise "arming" the ACM 1011 to commit data stored thereon in the event of failure. The pre-configured arming ensures that, in the event of failure, data stored on the ACM 1011 will be committed to the proper logical identifier. The pre-configuration of the trigger condition enables applications 1016 to access the auto-commit buffer 1013 using "instant-commit" memory access semantics. The logical identifier used to arm the auto-commit buffer may be obtained from an operating system, the memory system 1018 (e.g., virtual memory system), or the like.

The VSL 1050 may be configured to arm the auto-commit buffers 1013 with a logical identifier (e.g., automatically, by callback, and/or via the VSL API 1019). Each auto-commit buffer 1013 may be armed to commit data to a different logical identifier (different LBA, persistent identifier, or the like), which may allow the ACM 1011 to provide memory semantic access to a number of different, concurrent ACM users 1016. In some embodiments, arming an auto-commit buffer 1013 comprises setting the trigger metadata 1015 with a logical identifier. In the FIG. 15 example, the ACM address range 1021 is associated with the logical identifier 1025, and the trigger metadata 1015 of the associated auto-commit buffer is armed with the corresponding logical identifier 1025.

The VSL 1050 may arm an auto-commit buffer using an I/O control (IOCTL) command comprising the ACM address range 1021, the logical identifier 1025, and/or an indicator of which auto-commit buffer 1013 is to be armed. The VSL 1050 (through the VSL API 1019) may provide an interface to disarm or "detach" the auto-commit buffer 1013. The disarm command may cause the contents of the auto-commit buffer 1013 to be committed as described above (e.g., committed to the solid-state storage device 1502). The detach may further comprise "disarming" the auto-commit buffer 1013 (e.g., clearing the metadata 1015). The VSL 1050 may be configured to track mappings between address ranges in the memory system 1018 and auto-commit buffers 1013 so that a detach command is performed automatically.

Alternatively, or in addition, the VSL 1050 may be integrated into the operating system (or virtual operating system, e.g., hypervisor) of the host 1014. This may allow the auto-commit buffers 1013 to be used by a virtual memory demand paging system. The operating system may (through the VSL API 1019 or other integration technique) map/arm auto-commit buffers for use by ACM users 1016. The operating system may issue commit commands when requested by an ACM user 1016 and/or its internal demand paging system. Accordingly, the operating system may use the ACM 1011 as another, generally available virtual memory resource.

Once an ACM user 1016 has mapped the ACM address range 1021 to an auto-commit buffer 1013 and as armed the buffer 1013, the ACM user 1016 may access the resource using memory access semantics, and may consider the memory accesses to be "logically" committed as soon as the memory access has completed. The ACM user 1016 may view the memory semantic accesses to the ACM address range 1021 to be "instantly committed" because the ACM 1011 is configured to commit the contents of the auto-commit buffer (to the logical identifier 1025) regardless experiencing of failure conditions. Accordingly, the ACM user 1016 may not be required to perform separate write and commit commands (e.g., a single memory semantic write is sufficient to implement a write-commit). Moreover, the mapping between the auto-commit buffer 1013 and the ACM 1011 disclosed herein removes overhead due to function calls, system calls, and even a hypervisor (if the ACM user 1016 is running in a virtual machine) that typically introduce latency into the write-commit path. The write-commit latency time of the ACM user 1016 may therefore be reduced to the time required to access the ACM 1011 itself.

As described above, the ACM 1011 may be used in a virtual machine environment, in which one or more ACM users 1016 operates within a virtual machine maintained by a hypervisor. The hypervisor may be configured to provide ACM users 1016 operating within a virtual machine with access to the VSL API 1019 and/or VSL 1050. The hypervisor may access the VSL API 1019 to associate logical identifiers with auto-commit buffers 1013 of the ACM 1011, as described above. The hypervisor may then provide one or more armed auto-commit buffers 1013 to the ACM users 1016 (e.g., by mapping an ACM address range 1021 within the virtual machine memory system to the one or more auto-commit buffers 1013). The ACM user 1016 may then access the ACM 1011 using memory access semantics (e.g., efficient write-commit operations), without incurring overheads due to, inter alia, hypervisor and other system calls. The hypervisor may be further configured to maintain the ACM address range 1021 in association with the auto-commit buffers 1013 until explicitly released by the ACM user 1016 (e.g., the keep the mapping from changing during use).

In some embodiments, the ACM user 1016 may be adapted to operate with the "instant commit" memory access semantics provided by the ACM 1013. For example, since the armed auto-commit buffers 1013 are triggered to commit in the event of a failure (without an explicit commit command), the order in which the ACM user 1016 performs memory access to the ACM 1011 may become a consideration. The ACM user 1016 may employ memory barriers, complier flags, and the like to ensure the proper ordering of memory access operations.

For example, read before write hazards may occur where an ACM user 1016 attempts to read data through the block device interface 1520 that is stored on the ACM 1011 (via the memory semantic interface 1522). In some embodiments, the VSL 1050 may maintain metadata tracking the associations between logical identifiers and/or address ranges in the memory system 1018 and auto-commit buffers 1013. When an ACM user 1016 (or other entity) attempts to access a logical identifier that is mapped to an auto-commit buffer 1013 (e.g., through the block device interface 1520), the VSL 1050 directs the request to the ACM 1011 (via the memory semantic interface 1522), preventing a read before write hazard.

The VSL 1050 may be configured to provide a "consistency" mechanism for obtaining a consistent state of the ACM 1011 (e.g., a barrier, snapshot, or logical copy). The consistency mechanism may be implemented using metadata maintained by the VSL 1050, which, as described above, may track the triggered auto-commit buffers 1013 in the ACM 1011. A consistency mechanism may comprise the VSL 1050 committing the contents of all triggered auto-commit buffers 1013, such that the state of the persistent storage is maintained (e.g., store the contents of the auto-commit buffers 1013 on the solid-state storage 1502, or other persistent storage).

As described above, ACM users 1016 may access the ACM 1011 using memory access semantics, at RAM granularity, with the assurance that the operations will be committed if necessary (in the event of failure, power loss, or the like). This is enabled by, inter alia, a mapping between the memory system 1018 of the host 1014 and corresponding auto-commit buffers 1013; memory semantic operations implemented within an ACM memory range 1021 mapped to an auto-commit buffer 1013 are implemented directly on the buffer 1013. As discussed above, data transfer between the host 1041 and the ACM 1011 may be implemented using any suitable data transfer mechanism including, but not limited to: the host 1014 performing processor IO operations (PIO) with the ACM 1011 via the bus 1040 (e.g., MMIO, PMIO, and the like); the ACM 1011 (or other device) providing one or more DMA engines or agents (data movers) to transfer data between the host 1014 and the ACM 1011; the host 1014 performing processor cache write/flush operations; or the like. Transferring data on the bus 1040 may comprise issuing a bus "write" operation followed by a "read." The subsequent "read" may be required where the bus 1040 (e.g., PCI bus) does not provide an explicit write acknowledgement.

In some embodiments, an ACM user may wish to transfer data to the ACM 1011 in bulk as opposed to a plurality of small transactions. Bulk transfers may be implemented using any suitable bulk transfer mechanism. The bulk transfer mechanism may be predicated on the features of the bus 1040. For example, in embodiments comprising a PCI-e bus 1040, bulk transfer operations may be implemented using bulk register store CPU instructions.

Similarly, certain data intended for the ACM 1011 may be cached in processor cache. Data that is cached in a processor cache may be explicitly flushed to the ACM 1011 (to particular auto-commit buffers 1013) using a CPU cache flush instructions, or the like.

The DMA engines described above may also be used to perform bulk data transfers between an ACM user 1016 and the ACM 1011. In some embodiments, the ACM 1011 may implement one or more of the DMA engines, which may be allocated and/or accessed by ACM users 1016 using the VSL 1050 (through the VSL API 1019). The DMA engines may comprise local DMA transfer engines for transferring data on a local, system bus as well as RDMA transfer engines for transferring data using a network bus, network interface, or the like.

In some embodiments, the ACM 1011 may be used in caching applications. For example, the solid-state storage device 1502 may be used as cache for other backing store, such as a hard disk, network-attached storage, or the like (not shown). One or more of the ACM 1011 auto-commit buffers 1013 may be used as a front-end to the solid-state storage 1502 cache (a write-back cache) by configuring one or more of the auto-commit buffers 1013 of the ACM 1011 to commit data to the appropriate logical identifiers in the solid-state storage 1502. The triggered buffers 1013 are accessible to ACM users 1016 as described above (e.g., by mapping the buffers 1013 into the memory system 1018 of the host 1014). A failure condition causes the contents of the buffers 1013 to be committed to the solid-state storage 1502 cache. When the failure condition is cleared, the cached data in the solid-state storage 1502 (committed by the auto-commit buffers 1013 on the failure condition) will be viewed as "dirty" in the write cache and available for use and/or migration to the backing store. The use of the ACM 1011 as a cache front-end may increase performance and/or reduce wear on the cache device.

In some embodiments, auto-commit buffers 1013 of the ACM 1011 may be leveraged as a memory write-back cache by an operating system, virtual memory system, and/or one or more CPUs of the host 1014. Data cached in the auto-commit buffers 1013 as part of a CPU write-back cache may be armed to commit as a group. When committed, the auto-commit buffers 1013 may commit both data and the associated cache tags. In some embodiments, the write-back cache auto-commit buffers 1013 may be armed with an ACM address (or armed with a predetermined write-back cache address). When the data is restored, logical identifier information, such as LBA and the like, may be determined from a log or other data.

In some embodiments, the VSL 1050 may comprise libraries and/or publish APIs adapted to a particular set of ACM users 1016. For example, the VSL 1050 may provide an Instant Committed Log Library (ICL) 1552 adapted for applications whose performance is tied to write-commit latency, such as transaction logs (database, file system, and other transaction logs), store and forward messaging systems, persistent object caching, storage device metadata, and the like.

The ICL 1552 provides mechanisms for mapping auto-commit buffers 1013 of the ACM 1011 into the memory system 1018 of an ACM user 1016 as described above. ACM users 1016 (or the ICL 1552 itself) may implement an efficient "supplier/consumer" paradigm for auto-commit buffer 1013 allocation, arming, and access. For example, a "supplier" thread or process (in the application space of the ACM users 1016) may be used to allocate and/or arm auto-commit buffers 1013 for the ACM user 1016 (e.g., map auto-commit buffers 1013 to address ranges within the memory system 1018 of the host 1014, arm the auto-commit buffers 1013 with a logical identifier, and so on). A "consumer" thread or process of the ACM user 1016 may then accesses the pre-allocated auto-commit buffers 1013. In this approach, allocation and/or arming steps are taken out of the write-commit latency path of the consumer thread. The consumer thread of the ACM user 1016 may consider memory semantic accesses to the memory range mapped to the triggered auto-commit buffers (the ACM memory range 1021) as being "instantly committed" as described above.

Performance of the consumer thread(s) of the ACM user 1016 may enhanced by configuring the supplier threads of an Instant Committed Log Library (ICL) 1552 (or ACM user 1016) to allocate and/or arm auto-commit buffers 1013 in advance. When a next auto-commit buffer 1013 is needed, the ACM user 1016 have access a pre-allocated/armed buffer from a pool maintained by the supplier. The supplier may also perform cleanup and/or commit operations when needed. For example, if data written to an auto-commit buffer is to be committed to persistent storage, a supplier thread (or another thread outside of the write-commit path) may cause the data to be committed (using the VSL API 1019). Committing the data may comprise re-allocating and/or re-arming the auto-commit buffer 1013 for a consumer thread of the ACM user 1016 as described above.

The "supplier/consumer" approach described above may be used to implement a "rolling buffer." An ACM user 1016 may implement an application that uses a pre-determined amount of "rolling" data. For example, an ACM user 1016 may implement a message queue that stores the "last 20 inbound messages" and/or the ACM user 1016 may manage directives for a solid-state storage device (e.g., persistent trim directives or the like). A supplier thread may allocate auto-commit buffers 1013 having at least enough capacity to hold the "rolling data" needed by the ACM user 1016 (e.g., enough capacity to hold the last 20 inbound messages). A consumer thread may access the buffers using memory access semantics (load and store calls) as described above. The VSL API 1019 (or supplier thread of the ACM user 1016) may monitor the use of the auto-commit buffers 1013. When the consumer thread nears the end of its auto-commit buffers 1013, the supplier thread may re-initialize the "head" of the buffers 1013, by causing the data to be committed (if necessary), mapping the data to another range within the memory system 1018, and arming the auto-commit buffer 1013 with a corresponding logical identifier. As the consumer continues to access the buffers 1013, the consumer stores new data at a new location that "rolls over" to the auto-commit buffer 1013 that was re-initialized by the supplier thread, and continues to operate. In some cases, data written to the rolling buffers described above may never be committed to persistent storage (unless a failure condition or other triggering condition occurs). Moreover, if the capacity of the auto-commit buffers 1013 is sufficient to hold the rolling data of the ACM user, the supplier threads may not have to perform re-initialize/re-arming described above. Instead, the supplier threads may simply re-map auto-commit buffers 1013 that comprise data that has "rolled over" (and/or discard the "rolled over" data therein).

In another example, a supplier thread may maintain four (4) or more ACM buffers 1013. A first ACM buffer 1013 may be armed and ready to accept data from the consumer, as described above. A second ACM buffer 1013 may be actively accessed (e.g., filled) by a consumer thread, as described above. A third ACM buffer 1013 may be in a pre-arming process (e.g., re-initializing, as described above), and a fourth ACM buffer 1013 may be "emptying" (e.g., committing to persistent storage, as described above).

In some embodiments, the ICL 1552 and/or rolling log mechanisms described above may be used to implement an Intent Log for Synchronous Writes for a filesystem (e.g., the ZFS file system). The log data (ZIL) may be fairly small (1 to 4 gigabytes) and is typically "write only." Reads may only be performed for file system recovery. One or more auto-commit buffers 1013 may be used to store filesystem data using a rolling log and/or demand paging mechanism as described above.

The ICL library 1552 may be configured to operate in a high-availability mode as described above in conjunction with FIG. 12. In a high-availability mode, the VSL 1050 and/or bus 1040 sends commands pertaining to memory semantic accesses to two or more ACM 1011, each of which may implement the requested operations and/or be triggered to commit data in the event of a failure condition.

The ACM 1011 disclosed herein may be used to enable other types of applications, such as durable synchronization primitives. A synchronization primitive may include, but is not limited to: a semaphore, mutex, atomic counter, test and set, or the like.

A synchronization primitive may be implemented on an auto-commit buffer 1013. ACM users 1016 (or other entities) that wish to access the synchronization primitive may map the auto-commit buffer 1013 into the memory system 1018. In some embodiments, each ACM user 1016 may map the synchronization primitive auto-commit buffer 1013 into its own, respective address range in the memory system 1018. Since the different address ranges are all mapped to the same auto-commit buffer 1013, all will show the same state of the synchronization primitive. ACM users 1016 on remote computing devices may map the synchronization primitive auto-commit buffer 1013 into their memory system using an RDMA network or other remote access mechanism (e.g., Infiniband, remote PCI, etc.).

In some embodiments, the VSL 1050 may comprise a Durable Synchronization Primitive Library (DSL) 1554 to facilitate the creation of and/or access to synchronization primitives on the ACM 1011. The DSL 1554 may be configured to facilitate one-to-many mappings as described above (one auto-commit buffer 1030-to-many address ranges in the memory system 1018).

The ACM users 1016 accessing the semaphore primitive may consider their accesses to be "durable," since if a failure condition occurs while the synchronization primitive is in use, the state of the synchronization primitive will be persisted as described above (the auto-commit buffer 1013 of the synchronization primitive will be committed to the solid-state storage 1502, or other persistent storage).

As described above, the VSL 1050 may be used to map a file into the memory system 1018 (virtual address space) of the host 1014. The file may be mapped in an "Instant Committed Memory" (ICM) mode. In this mode, all changes made to the memory mapped file are guaranteed to be reflected in the file, even if a failure condition occurs. This guarantee may be made by configuring the demand paging system to use an auto-commit buffer 1013 of the ACM 1011 for all "dirty" pages of the ICM file. Accordingly, when a failure condition occurs, the dirty page will be committed to the file, and no data will be lost.

In some embodiments, the VSL 1050 may comprise an ICM Library (ICML) 1556 to implement these features. The ICML 1556 may be integrated with an operating system and/or virtual memory system of the host 1014. When a page of an ICM memory mapped file is to become dirty, the ICML 1556 prepares an auto-commit buffer 1013 to hold the dirty page. The auto-commit buffer 1013 is mapped into the memory system 1018 of the host 1014, and is triggered to commit to a logical identifier associated with the memory mapped file. As described above, changes to the pages in the memory system 1018 are implemented on the auto-commit buffer 1013 (via the memory semantic access module 1522).

The ICML 1556 may be configured to commit the auto-commit buffers 1013 of the memory mapped file when failure conditions occur and/or when the demand paging system of the host 1014 needs to use the auto-commit buffer 1013 for another purpose. The determination of whether to "detach" the auto-commit buffer 1013 from a dirty page may be made by the demand paging system, by the VSL 1050 (e.g., using a least recently used (LRU) metric, or the like), or by some other entity (e.g., an ACM user 1016). When the auto-commit buffer is detached, the VSL 1050 may cause its contents to be committed. Alternatively, the contents of the auto-commit buffer 1013 may be transferred to system RAM at which point the virtual memory mapping of the file may transition to use a RAM mapping mechanisms.

In some embodiments, the VSL 1050 (or ICML 1556) may be configured to provide a mechanism to notify the operating system (virtual memory system or the like) that a page of a memory mapped file is about to become dirty in advance of an ACM user 1016 writing the data. This notification may allow the operating system to prepare an auto-commit buffer 1013 for the dirty page in advance, and prevent stalling when the write actually occurs (while the auto-commit buffer is mapped and armed). The notification and preparation of the auto-commit buffer 1013 may implemented in a separate thread (e.g., a supplier thread as described above).

The VSL 1050 and/or ICML 1556 may provide an API to notify the operating system that a particular page that is about to be written has no useful contents and should be zero filled. This notification may help the operating system to avoid unnecessary read operations.

The mechanisms for memory mapping a file to the ACM 1011 may be used in log-type applications. For example, the ICL library 1552 may be implemented to memory map a log file to one or more auto-commit buffers 1013 as described above. A supplier thread may provide notifications to the operating system regarding which pages are about to become dirty and/or to identify pages that do not comprise valid data.

Alternatively, or in addition, the ICML 1556 may be implemented without integration into an operating system of the host 1014. In these embodiments, the ICML 1556 may be configured to monitor and/or trap system signals, such as mprotect, mmap, and manual segment fault signals to emulate the demand paging operations typically performed by an operating system.

Figure 16:
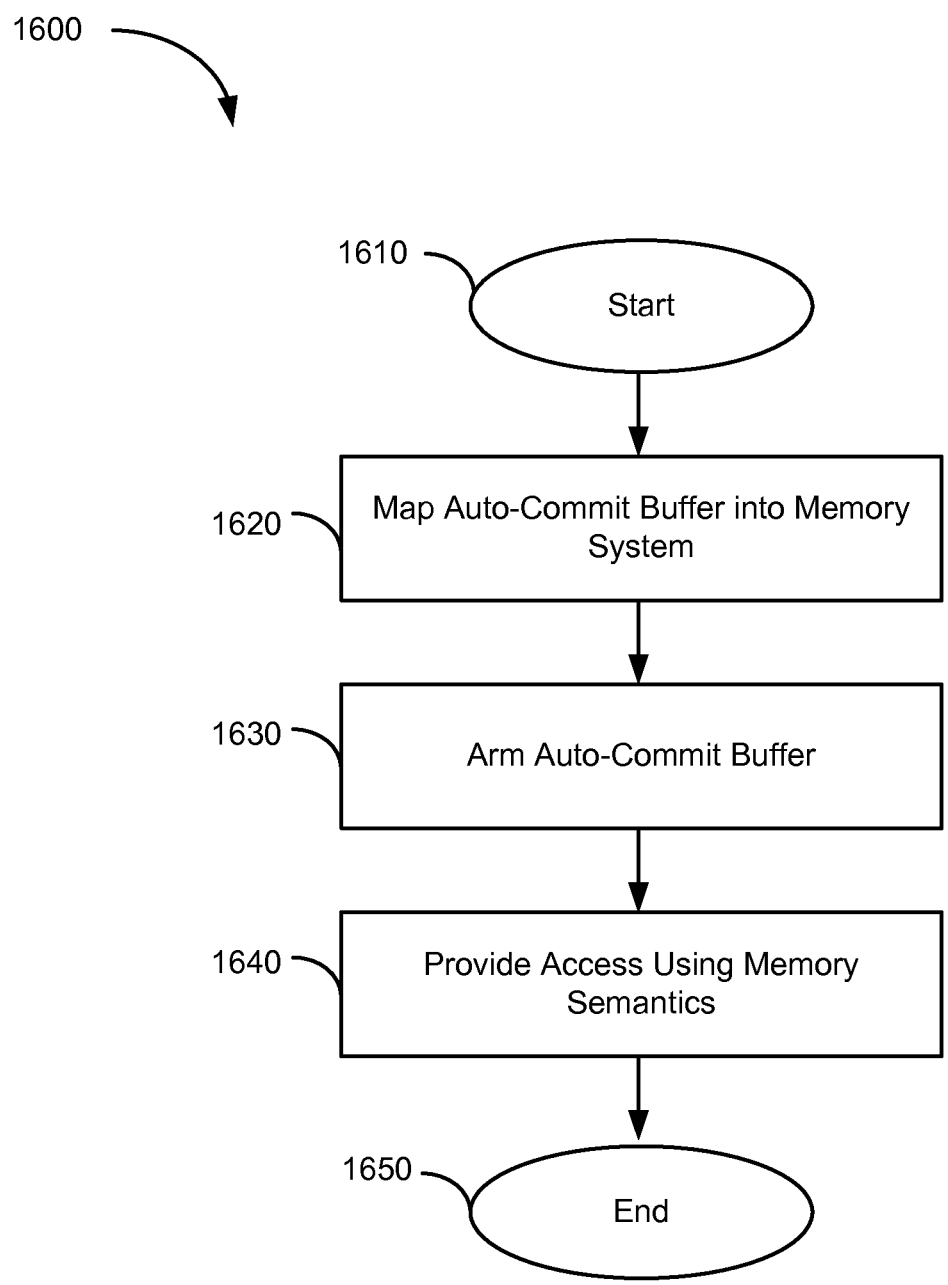
FIG. 16 is a flow diagram of one embodiment of a method for providing an auto-commit memory.

FIG. 16 is a flow diagram of one embodiment of a method 1600 for providing an auto-commit memory. At step 1610 the method 1600 may start and be initialized. Step 1610 may comprise the method 1600 initiating communication with an ACM over a bus (e.g., initiating communication with ACM 1011 via bus 1040).

At step 1620, an auto-commit buffer of the ACM may be mapped into the memory system of a computing device (e.g., the host 1014). The mapping may comprise associating a BAR address of the auto-commit buffer with an address range in the memory system.

At step 1630, the auto-commit buffer may be armed with metadata configured to cause the auto-commit buffer to be committed to a particular persistent storage and/or at a particular location in the persistent storage in the event of a failure condition. In some embodiments, the metadata may comprise a logical identifier such as a LBA, object identifier, or the like. Step 1630 may comprise verifying that the metadata is valid and/or can be used to commit the contents of the auto-commit buffer.

At step 1640, an ACM user, such as an operating system, application, or the like, may access the armed auto-commit buffer using memory access semantics. The ACM user may consider the accesses to be "instantly committed" due to the arming of step 1630. Accordingly, the ACM user may implement "instant committed" writes that omit a separate and/or explicit commit command. Moreover, since the memory semantic accesses are directly mapped to the auto-commit buffer (via the mapping of step 620), the memory semantic accesses may bypass systems calls typically required in virtual memory systems.

At step 1650 the method 1600 ends until a next auto-commit buffer is mapped and/or armed.

Figure 17:
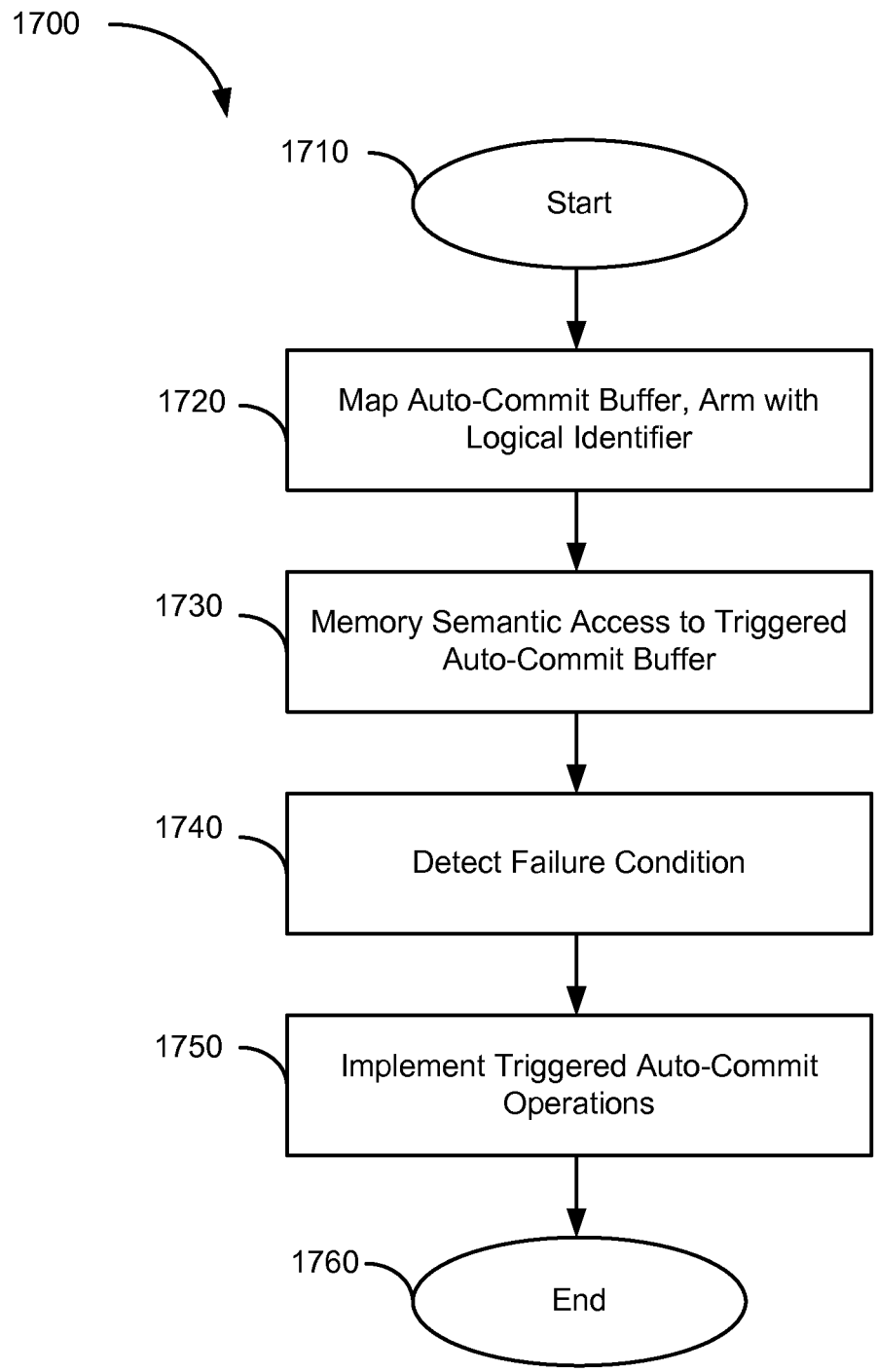
FIG. 17 is a flow diagram of another embodiment of a method for providing an auto-commit memory.

FIG. 17 is a flow diagram of another embodiment of a method 1700 for providing an auto-commit memory. At step 1710 the method 1700 starts and is initialized as described above.

At step 1720, an auto-commit buffer of an ACM is mapped into the memory system of a computing device (e.g., the host 1014), and is armed as described above.

At step 1730, an ACM user accesses the auto-commit buffer using memory access semantics (e.g., by implementing memory semantic operations within the memory range mapped to the auto-commit buffer at step 1720).

At step 1740, a failure condition is detected. As described above, the failure condition may be a loss of power, a loss of communication between the ACM and the host computing device, a software fault, or any other failure condition that precludes normal operation of the ACM and/or the host computing device.

At step 1750, the ACM implements the armed triggered commit actions on the auto-commit buffer. The triggered commit action may comprise committing the contents of the auto-commit buffer to persistent storage, such as a solid-state storage or the like.

At step 1760, the method 1700 ends until a next auto-commit buffer is mapped and/or armed or a failure condition is detected.

Figure 18:
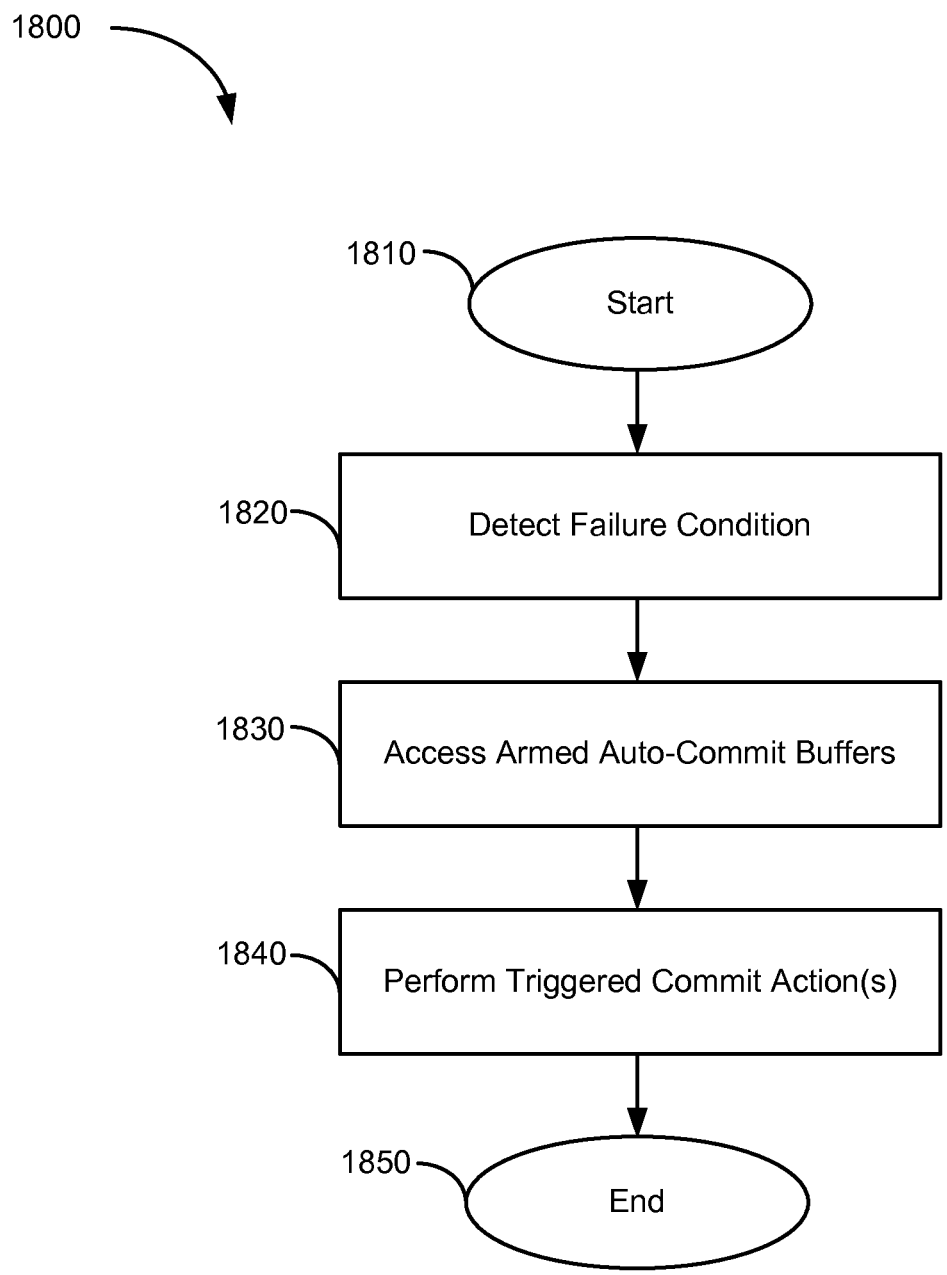
FIG. 18 is a flow diagram of another embodiment of a method for providing an auto-commit memory.

FIG. 18 is a flow diagram of another embodiment for providing an auto-commit memory. At step 1810, the method 1800 starts and is initialized as described above. At step 1820, a failure condition is detected.

At step 1830, the method 1800 accesses armed auto-commit buffers on the ACM (if any). Accessing the armed auto-commit buffer may comprise the method 1800 determining whether an auto-commit buffer has been armed by inspecting the triggered commit action metadata thereof. If no triggered action metadata exists, or the metadata is invalid, the method 1800 may determine that the auto-commit buffer is not armed. If valid triggered action metadata does exist for a particular auto-commit buffer, the method 1800 identifies the auto-commit buffer as an armed buffer and continues to step 1840.

At step 1840, the triggered commit action for the armed auto-commit buffers is performed. Performing the triggered commit action may comprise persisting the contents of the auto-commit buffer to a sequential and/or log-based storage media, such as a solid-state storage media. Accordingly, the triggered commit action may comprise accessing a logical identifier of the auto-commit buffer, labeling the data with the logical identifier, and injecting the labeled data into a write data pipeline. Alternatively, the triggered commit action may comprise storing the data on a persistent storage having a one-to-one mapping between logical identifier and physical storage address (e.g., a hard disk). The triggered commit action may comprise storing the contents of the armed auto-commit buffer to the specified physical address.

Performing the triggered commit action at step 1840 may comprise using a secondary power supply to power the ACM, solid-state storage medium, and/or other persistent storage medium, until the triggered commit actions are completed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for instant-commit, memory semantic operations within a volatile memory address space of a computing device, the method comprising:
    mapping a memory address range of a host to a volatile auto-commit buffer within an isolation zone of a non-volatile storage device comprising a storage controller configured to store data of the auto-commit buffer on non-volatile storage media of the non-volatile storage device independent of a host computing device;
    arming the auto-commit buffer to store data on the non-volatile storage media in association with a logical identifier in response to a trigger event, the logical identifier associated with a user of the auto-commit buffer; and
    servicing memory operations from the user in the mapped memory address range.

2. The method of claim 1, wherein the memory address range of the host is mapped to a bus address range corresponding to the volatile auto-commit buffer within the isolation zone.

3. The method of claim 1, wherein arming the auto-commit buffer comprises storing the logical identifier in the auto-commit buffer.

4. The method of claim 1, further comprising executing instantly committed, memory semantic operations on the auto-commit buffer in response to mapping the memory address range of the host to the volatile auto-commit buffer within the isolation zone.

5. The method of claim 1, wherein the host comprises a guest operating system of a virtual machine, the method further comprising providing instantly committed, memory semantic access to the auto-commit buffer through a mapped memory address range of the guest operating system.

6. The method of claim 1, further comprising storing contents of the auto-commit buffer on the non-volatile storage media in response to the trigger event, wherein the trigger event comprises one of a power failure, a host hardware failure, and a host software fault.

7. The method of claim 1, further comprising:
    reserving space in a write buffer of the non-volatile storage device, wherein the write buffer is within the isolation zone and comprises sufficient capacity to store contents of the auto-commit buffer on the non-volatile storage device independent of the host computing device; and
    storing the contents of the auto-commit buffer on the non-volatile storage media through the write buffer in response to the trigger event.

8. The method of claim 1, further comprising:
    maintaining two or more pending non-volatile media write operations configured to store data of the auto-commit buffer on respective storage locations on the non-volatile storage media; and
    executing the two or more pending non-volatile media write operations in response to the trigger event to store data of the auto-commit buffer.

9. The method of claim 1, further comprising determining a priority of the data of the auto-commit buffer relative to other data pending storage on the non-volatile storage device, wherein the priority determines an order in which the data of the auto-commit buffer is stored relative to the other data pending storage, in response to the triggering event.

10. The method of claim 9, wherein the priority determines that the data of the auto-commit buffer is stored on the non-volatile storage device before data of non-acknowledged storage operations and after acknowledged storage operations.

11. The method of claim 9, wherein the priority determines that the data of the auto-commit buffer is stored on the non-volatile storage device before data of acknowledged storage operations.

12. The method of claim 1, further comprising in response to the trigger event, storing contents of the auto-commit buffer on the non-volatile storage media in a log-based format, the log-based format comprising data packets having the logical identifier and a sequence identifier that preserves an ordered sequence of storage operations on the non-volatile storage media.

13. The method of claim 1, further comprising updating the logical identifier in response to one of renaming a memory mapped file, moving a memory mapped file, a notification from an operating system, an mprotect operation, an mmap operation, and a segment fault.

14. The method of claim 1, further comprising configuring the host to bypass a memory cache such that memory operations are serviced directly by the volatile auto-commit buffer, wherein mapping the memory address range of the host to the volatile auto-commit buffer comprises configuring the host to service memory operations directly on the volatile auto-commit buffer.

15. The method of claim 1, further comprising arming the auto-commit buffer concurrently with mapping the memory address range to the volatile auto-commit buffer.

16. An apparatus for instant-commit, memory semantic operations within a volatile memory address space of a computing device, comprising:
    an isolation zone comprising;
        a volatile auto-commit buffer mapped to a memory address range of a host,
        a commit module configured to store data of the volatile auto-commit buffer to a non-volatile storage medium of a non-volatile storage device together with a logical identifier associated with a user of the auto-commit buffer in response to a trigger event, and
        a secondary power supply configured to power the volatile auto-commit buffer, commit module, and non-volatile storage device independent of the host.

17. The apparatus of claim 16, wherein the non-volatile storage device comprises a non-volatile storage controller configured to store the data of the volatile auto-commit buffer on the non-volatile storage medium independent of the host.

18. The apparatus of claim 17, wherein the non-volatile storage controller comprises a write data pipeline configured to store contents of the auto-commit buffer in a packet format comprising the logical identifier associated with the user and in association with a sequence identifier that preserves an ordered sequence of storage operations on the non-volatile storage medium.

19. The apparatus of claim 16, wherein the volatile auto-commit buffer is communicatively coupled to the host by a bus, and wherein the memory address range of the host is mapped to an address of the bus.

20. A system for instant-commit, memory semantic operations within a volatile memory address space of a computing device, comprising:
- an auto-commit memory, comprising:
    - a volatile auto-commit buffer mapped into a memory address range of a host,
    - a non-volatile storage device comprising non-volatile storage media, and a commit module configured to store data of the volatile auto-commit buffer to a non-volatile storage medium of the non-volatile storage device together with a logical identifier associated with a user of the auto-commit buffer in response to a trigger event, and
    - a secondary power supply configured to power the volatile auto-commit buffer, commit module, and non-volatile storage device independent of the host.

* * * * *